(12) United States Patent
Woo et al.

(10) Patent No.: US 10,908,763 B2
(45) Date of Patent: Feb. 2, 2021

(54) ELECTRONIC APPARATUS FOR PROCESSING USER UTTERANCE AND CONTROLLING METHOD THEREOF

(71) Applicant: Samsung Electronics Co., Ltd., Gyeonggi-do (KR)

(72) Inventors: Kyoung Gu Woo, Seoul (KR); Kyu Young Kim, Gyeonggi-do (KR); Jun Seong Kim, Gyeonggi-do (KR); Jung Hoe Kim, Gyeonggi-do (KR); Ji Min Lee, Gyeonggi-do (KR); Ho Jun Jaygarl, Gyeonggi-do (KR); In Chul Hwang, Seoul (KR); Ji Hyun Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 214 days.

(21) Appl. No.: 15/966,160

(22) Filed: Apr. 30, 2018

(65) Prior Publication Data
US 2018/0314389 A1    Nov. 1, 2018

(30) Foreign Application Priority Data

Apr. 30, 2017  (KR) .................. 10-2017-0055831

(51) Int. Cl.
| | | |
|---|---|---|
| G06F 3/0481 | (2013.01) | |
| G06F 3/16 | (2006.01) | |
| G06F 3/0484 | (2013.01) | |
| G06F 3/0488 | (2013.01) | |

(Continued)

(52) U.S. Cl.
CPC .......... *G06F 3/0481* (2013.01); *G06F 3/0482* (2013.01); *G06F 3/0484* (2013.01); *G06F 3/04817* (2013.01); *G06F 3/04842* (2013.01); *G06F 3/04847* (2013.01);
(Continued)

(58) Field of Classification Search
None
See application file for complete search history.

(56) References Cited

U.S. PATENT DOCUMENTS

| | | | | |
|---|---|---|---|---|
| 7,447,637 | B1 * | 11/2008 | Grant ..................... | G06F 3/167 704/275 |
| 8,660,849 | B2 | 2/2014 | Gruber et al. | |
| 8,670,979 | B2 | 3/2014 | Gruber et al. | |

(Continued)

FOREIGN PATENT DOCUMENTS

KR   10-2013-0035983 A   4/2013

*Primary Examiner* — Howard Cortes
(74) *Attorney, Agent, or Firm* — Cha & Reiter, LLC.

(57) ABSTRACT

A system, apparatus, and method for generating one or more path rules or combination or path rules for performing the operations of an application. According to various embodiments, a user terminal through an intelligence server may generate a path rule and may perform the operation of an application based on the path rule to provide a service. The user terminal may provide a user with the processing status of a user utterance and may receive an additional user input to process the user utterance. For example, when a keyword (or parameter) required to process the user utterance is insufficient, the user terminal may provide the user with a state requiring additional information and may output feedback corresponding to the insufficient state in order to receive the necessary information from the user.

19 Claims, 35 Drawing Sheets

(51) Int. Cl.
*G06F 3/0482* (2013.01)
*G06F 40/174* (2020.01)

(52) U.S. Cl.
CPC .......... *G06F 3/04883* (2013.01); *G06F 3/167* (2013.01); *G06F 40/174* (2020.01)

(56) References Cited

U.S. PATENT DOCUMENTS

| | | | |
|---|---|---|---|
| 8,706,503 B2 | 4/2014 | Cheyer et al. | |
| 8,731,942 B2 | 5/2014 | Cheyer et al. | |
| 8,799,000 B2 | 8/2014 | Guzzoni et al. | |
| 8,892,446 B2 | 11/2014 | Cheyer et al. | |
| 8,903,716 B2 | 12/2014 | Chen et al. | |
| 8,930,191 B2 | 1/2015 | Gruber et al. | |
| 8,942,986 B2 | 1/2015 | Cheyer et al. | |
| 8,996,375 B1* | 3/2015 | Gagnon ................ G10L 15/19 704/257 |
| 9,117,447 B2 | 8/2015 | Gruber et al. | |
| 9,318,108 B2 | 4/2016 | Gruber et al. | |
| 9,378,740 B1* | 6/2016 | Rosen ................ G10L 15/1822 |
| 9,548,050 B2 | 1/2017 | Gruber et al. | |
| 9,734,151 B2* | 8/2017 | Patel ................ G06F 16/40 |
| 9,865,280 B2* | 1/2018 | Sumner ............... G06F 16/3344 |
| 2012/0016678 A1* | 1/2012 | Gruber ................ G06F 40/40 704/275 |
| 2012/0022869 A1* | 1/2012 | Lloyd ................ G10L 15/30 704/244 |
| 2012/0245944 A1 | 9/2012 | Gruber et al. | |
| 2013/0110505 A1 | 5/2013 | Gruber et al. | |
| 2013/0110515 A1 | 5/2013 | Guzzoni et al. | |
| 2013/0110518 A1 | 5/2013 | Gruber et al. | |
| 2013/0110519 A1 | 5/2013 | Cheyer et al. | |
| 2013/0110520 A1 | 5/2013 | Cheyer et al. | |
| 2013/0111348 A1 | 5/2013 | Gruber et al. | |
| 2013/0111487 A1 | 5/2013 | Cheyer et al. | |
| 2013/0117022 A1 | 5/2013 | Chen et al. | |
| 2013/0185074 A1 | 7/2013 | Gruber et al. | |
| 2013/0185081 A1 | 7/2013 | Cheyer et al. | |
| 2013/0289994 A1* | 10/2013 | Newman ........... H04M 1/72519 704/254 |
| 2014/0012585 A1* | 1/2014 | Heo ...................... H04N 21/233 704/270.1 |
| 2014/0095173 A1* | 4/2014 | Lynch ................ G10L 15/22 704/275 |
| 2014/0191949 A1* | 7/2014 | Park ................ G10L 15/22 345/156 |
| 2014/0258857 A1* | 9/2014 | Dykstra-Erickson ................ G06F 3/0481 715/708 |
| 2014/0278343 A1* | 9/2014 | Tran ................ G06F 40/53 704/2 |
| 2014/0350941 A1* | 11/2014 | Zeigler ................ G10L 21/10 704/275 |
| 2015/0149168 A1* | 5/2015 | Stent ................ G10L 15/22 704/235 |
| 2015/0269136 A1* | 9/2015 | Alphonso ............... G10L 15/24 704/9 |
| 2015/0278370 A1* | 10/2015 | Stratvert ............ G06F 16/9535 707/766 |
| 2016/0132293 A1* | 5/2016 | Ballinger ............ G10L 15/30 704/8 |
| 2016/0203002 A1* | 7/2016 | Kannan ................ G06F 3/167 715/708 |
| 2016/0210363 A1* | 7/2016 | Rambhia ............ G06F 3/0482 |
| 2016/0225371 A1* | 8/2016 | Agrawal ............ G06F 3/04842 |
| 2017/0076724 A1* | 3/2017 | Park ................ G10L 15/063 |
| 2017/0102918 A1* | 4/2017 | Gazdzinski ............ B66B 3/002 |
| 2017/0178626 A1 | 6/2017 | Gruber et al. | |
| 2017/0270929 A1* | 9/2017 | Aleksic ................ G10L 15/22 |
| 2018/0301150 A1* | 10/2018 | Woo ................ G10L 15/18 |
| 2019/0214013 A1* | 7/2019 | Meher ................ G06F 40/174 |

\* cited by examiner

ELECTRONIC APPARATUS FOR PROCESSING USER UTTERANCE AND CONTROLLING METHOD THEREOF

CROSS-REFERENCE TO RELATED APPLICATION(S)

This application is based on and claims priority under 35 U.S.C. § 119 to Korean Patent Application No. 10-2017-0055831, filed on Apr. 30, 2017, in the Korean Intellectual Property Office, the disclosure of which is incorporated herein by reference in its entirety.

BACKGROUND

1. Field

The present disclosure relates to a technology for processing a user's utterance.

2. Description of Related Art

In addition to a conventional input scheme using a keyboard or a mouse, electronic apparatuses have recently supported various input schemes such as voice input and the like. For example, the electronic apparatuses such as a smartphone or a tablet PC may recognize the voice of a user input in a state where a speech recognition service is executed and may execute an action corresponding to the voice input or may provide the result found based on the voice input.

Nowadays, speech recognition service is being developed based on technology that processes a natural language. Processing natural language refers to a technology that is capable of grasping the intent of the user utterance and provides the user with the result suitable for the intent.

The above information is presented as background information only to assist with an understanding of the present disclosure. No determination has been made, and no assertion is made, as to whether any of the above might be applicable as prior art with regard to the present disclosure.

SUMMARY

Since the conventional speech recognition service displays only the result corresponding to a user input when recognizing and processing the user's voice, the conventional speech recognition service may process only the user's voice, such as executing a program, but a user input to request the execution of a plurality of applications may not be processed.

When a user's voice does not provide sufficient information, the conventional speech recognition service may fail to recognize the insufficient information or may fail to recognize all of the user inputs. As another example, in the case where it is difficult to grasp the intent of the user by using only the utterance of the user in a speech recognition service, it may still be difficult to grasp the optimal intent of the user even if additional utterance of the user or the information of the terminal is used. In addition, when a user input is received again in a step of performing a speech recognition service, it is difficult to provide a service that matches the intent of the user.

Aspects of the present disclosure are to address at least the above-mentioned problems and/or disadvantages and to provide at least the advantages described below. Accordingly, an aspect of the present disclosure is to provide a method of processing a user utterance by using a rule that arranges states of an electronic apparatus corresponding to the user utterance.

In accordance with an aspect of the present disclosure, an electronic apparatus includes a housing, a touch screen display arranged inside the housing and exposed through a first portion of the housing, a microphone arranged inside the housing and exposed through a second portion of the housing, at least one speaker arranged inside the housing and exposed through a third portion of the housing, a wireless communication circuit arranged inside the housing, a processor arranged inside the housing and electrically connected to the touch screen display, the microphone, the at least one speaker, and the wireless communication circuit, and a non-transitory memory arranged in the housing and electrically connected to the processor. The non-transitory memory stores instructions which, when executed, cause the processor, as a first step, to receive a first user input through at least one of the touch screen display and the microphone, to transmit first data associated with the first user input to an external server through the wireless communication circuit, to receive a first response from the external server through the wireless communication circuit, to perform the first task after receiving the first response by allowing the electronic apparatus to have the states of the first sequence. The non-transitory memory also stores instructions that, when executed, cause the processor, as a second step, to display a user interface (UI) including a text input box on the touch screen display when performing the first task, to receive a second user input through the microphone while displaying the UI, to transmit second data associated with the second user input to the external server through the wireless communication circuit, receive a second response from the external server through the wireless communication circuit, and to fill the text input box displayed on the touch screen display with the at least one parameter. The first user input includes a first request for performing a first task using the electronic apparatus. The first response includes a first sequence of states of the electronic apparatus for performing the first task and a first identifier associated with the first sequence. The second user input includes at least one parameter for filling the text input box. The second response includes the at least one parameter and a second identifier without a sequence of states of the electronic apparatus for performing a task.

In accordance with another aspect of the present disclosure, an intelligence system includes a display, a communication circuit, a microphone, a first processor electrically connected to the display, the communication circuit, and the microphone, a user terminal electrically connected to the first processor and including a first non-transitory memory storing first instructions, a communication interface, a second processor electrically connected the communication interface, and a server electrically connected to the second processor and including a second non-transitory memory storing second instructions. The first instructions and the second instructions cause the first processor and the second processor to display on the display by the user terminal a UI including a text input box, to receive a first user input through the microphone by the user terminal while displaying the UI, to transmit first data associated with the first user input to the server through the communication circuit by the user terminal, to generate a first identifier associated with the first data by the server, to extract the at least one parameter from the first data by the server, to tag the at least one parameter with the first identifier by the server, to provide the user terminal with a first response including the at least one parameter tagged with the first identifier through the communication interface by the server, and to fill the text input box displayed on the display with the at least one parameter by the user terminal when receiving the first response. The first user input includes at least one parameter filled in the text input box.

In accordance with another aspect of the present disclosure, an electronic apparatus includes a housing, a touch screen display arranged inside the housing and exposed through a first portion of the housing, a microphone arranged inside the housing and exposed through a second portion of the housing, at least one speaker arranged inside the housing and exposed through a third portion of the housing, a communication circuit arranged inside the housing, a processor arranged inside the housing and electrically connected to the touch screen display, the microphone, the at least one speaker, and the communication circuit, and a non-transitory memory arranged in the housing and electrically connected to the processor. The non-transitory memory stores instructions that, when executed, cause the processor, as a first step, to receive a first user input through at least one of the touch screen display and the microphone, to transmit first data associated with the first user input to an external server through the communication circuit, to receive a first response from the external server through the communication circuit, to perform the first task after receiving the first response by allowing the electronic apparatus to have the states of the first sequence. The non-transitory memory also stores instructions that, when executed, cause the processor, as a second operation, to display a UI for receiving a second user input on the touch screen display in the specified state of the electronic apparatus included in the first sequence, to receive the second user input through at least one of the microphone and the touch screen display while displaying the UI, and to allow the electronic apparatus to have another state included in the first sequence based on the second user input. The first user input includes a first request for performing a first task using the electronic apparatus. The first response includes a first sequence of states of the electronic apparatus for performing the first task. The first response also includes a first identifier associated with the first sequence, wherein the first sequence includes a specified state of the electronic apparatus.

In accordance with another aspect of the present disclosure, a controlling method of an electronic apparatus includes receiving a first user input through at least one of a display and a microphone, wherein the first user input includes a first request for performing a first task using the electronic device, transmitting first data associated with the first user input to an external server through a communication circuit, receiving from the external server through the communication circuit a first response including a first sequence of states of the electronic apparatus for performing the first task, wherein the first response also includes a first identifier associated with the first sequence, performing the first task after receiving the first response by allowing the electronic apparatus to have the states of the first sequence, displaying a UI including a text input box on the display when performing the first task, receiving a second user input including at least one parameter through the microphone for filling the text input box while displaying the UI, transmitting second data associated with the second user input to the external server through the communication circuit, receiving from the external server through the communication circuit a second response including the at least one parameter and a second identifier without a sequence of states of the electronic apparatus for performing a task, and filling the text input box displayed on the display with the at least one parameter.

According to various embodiments of the present disclosure, a user terminal through an intelligence server may generate a path rule in which the states of a user terminal are arranged and may perform the operation of an app based on the path rule to provide a service. Thus, the user terminal may provide a user with the processing status of a user utterance of the user terminal and may receive an additional user input in a procedure of processing the user utterance to enter the additional information or to change the processing operation. In particular, when a keyword (or parameter) required to process the user utterance is insufficient, the user terminal may provide the user with a state requiring information and may output feedback corresponding to the insufficient state to receive necessary information from a user.

An intelligence server generating a path rule received by a user terminal may combine path rules corresponding to functions of the apps to generate various path rules and may generate a path rule corresponding to a user input by using the various path rules. In addition, when combining the path rule, the intelligence server may combine a path rule corresponding to a user input with a path rule corresponding to the function of an app in real time (or runtime) to generate the path rule (or full path rule) corresponding to the user input, thereby reducing the amount of path rules included in a database.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure may be described to be associated with accompanying drawings. Accordingly, those of ordinary skill in the art will recognize that modifications, equivalents, and/or alternatives on the various embodiments described herein can be variously made without departing from the scope and spirit of the present disclosure.

Before describing an embodiment of the present disclosure, an integrated intelligent system to which an embodiment of the present disclosure is applied will be described.

Figure 1:
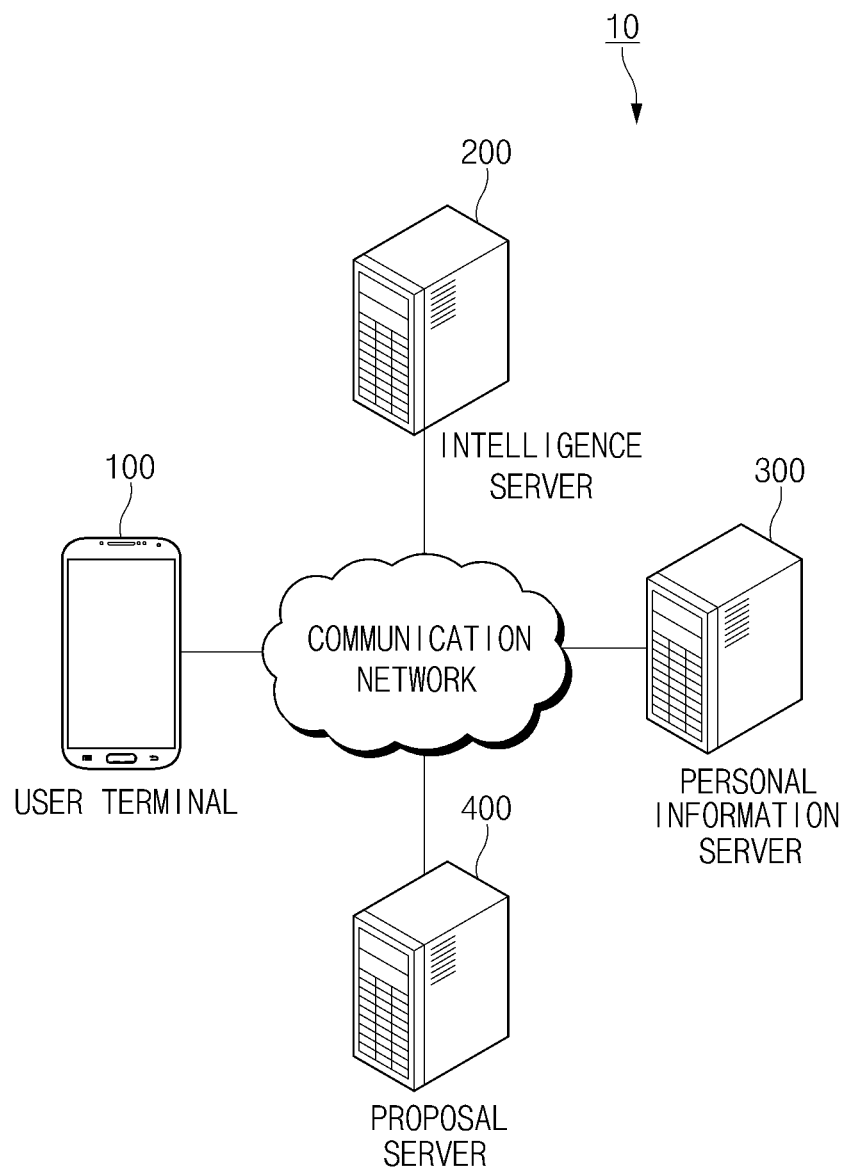
FIG. 1 is a view illustrating an integrated intelligent system, according to various embodiments.

FIG. 1 is a view illustrating an integrated intelligent system, according to various embodiments.

Referring to FIG. 1, an integrated intelligent system 10 may include a user terminal 100 (e.g., the electronic device 2100 of FIG. 21), an intelligence server 200 (e.g., the server 2108 of FIG. 21), a personal information server 300, or a proposal server 400.

The user terminal 100 may provide a service to a user through an application program (i.e., an "app") (e.g., an alarm app, a message app, a picture (gallery) app, and the like) that is stored in the user terminal 100. For example, the user terminal 100 may execute and operate other apps through an intelligence app (or a speech recognition app) stored in the user terminal 100. A user input may be received through the intelligence app of the user terminal 100 for launching and operating the other apps. For example, the user input may be received through a physical button, a voice input, a remote input, and the like. According to an embodiment, various types of terminal devices (or an electronic device), which are connected to the Internet, such as a mobile phone, a smartphone, a personal digital assistant (PDA), a notebook computer, and the like may correspond to the user terminal 100.

According to an embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a path rule (or sequence) based on the text data. The path rule may include information about an action (or an operation or a task) for performing the function of an app, or information about a parameter (e.g., a keyword, search term, telephone number, etc) necessary to perform the action. In addition, the path rule may include the sequence of the action of the app. The user terminal 100 may receive the path rule, may select an app depending on the path rule, and may execute an action included in the path rule in the selected app.

Generally, the term "path rule" of the present disclosure may indicate, but is not limited to, a sequence of states in which an electronic device performs the task requested by the user. In other words, the path rule may include information about the sequence of the states. For example, the task may be a certain action that the intelligence app provides. The task may include generating a schedule, transmitting a picture to a desired recipient, provisioning weather information, and the like. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, a neural network-based system (e.g., a feedforward neural network (FNN), or a recurrent neural network (RNN)). Alternatively, the artificial intelligent system may be a combination of the above-described systems or an artificial intelligent system that is different from the above-described system. According to an embodiment, the path rule may be selected from a set of predefined path rules or may be generated in real time in response to a user request. For example, the artificial intelligent system may select at least one path rule from a plurality of predefined path rules or may generate a path rule dynamically (or in real time). Furthermore, the user terminal 100 may use a hybrid system to provide the path rule.

For example, the user terminal 100 may execute the action and may display a screen on a display that corresponds to a state of the user terminal 100, which executes the action. As another example, the user terminal 100 may execute the action and may not display on the display the result obtained by executing the action. For example, the user terminal 100 may execute a plurality of actions and may only display on the display the result of a part of the plurality of actions. For example, the user terminal 100 may only display on the display the result that is obtained by executing the last action. As another example, the user terminal 100 may receive the user input to display on the display the result obtained by executing the action.

The personal information server 300 may include a database where user information is stored. For example, the personal information server 300 may receive the user information (e.g., context information, information about execution of an app, and the like) from the user terminal 100 and may store the user information in the database. The intelligence server 200 may be used to receive the user information from the personal information server 300 over the communication network and to generate a path rule associated with the user input. According to an embodiment, the user terminal 100 may receive the user information from the personal information server 300 over the communication network and may use the user information as information for managing the database.

The proposal server 400 may include a database for storing information about a function of a terminal, introduction of an application, or a function to be provided. For example, the proposal server 400 may include a database associated with a function that a user utilizes by receiving user information of the user terminal 100 from the personal information server 300. The user terminal 100 may receive information about the function to be provided from the proposal server 400 over the communication network and may provide the information to the user.

Figure 2:
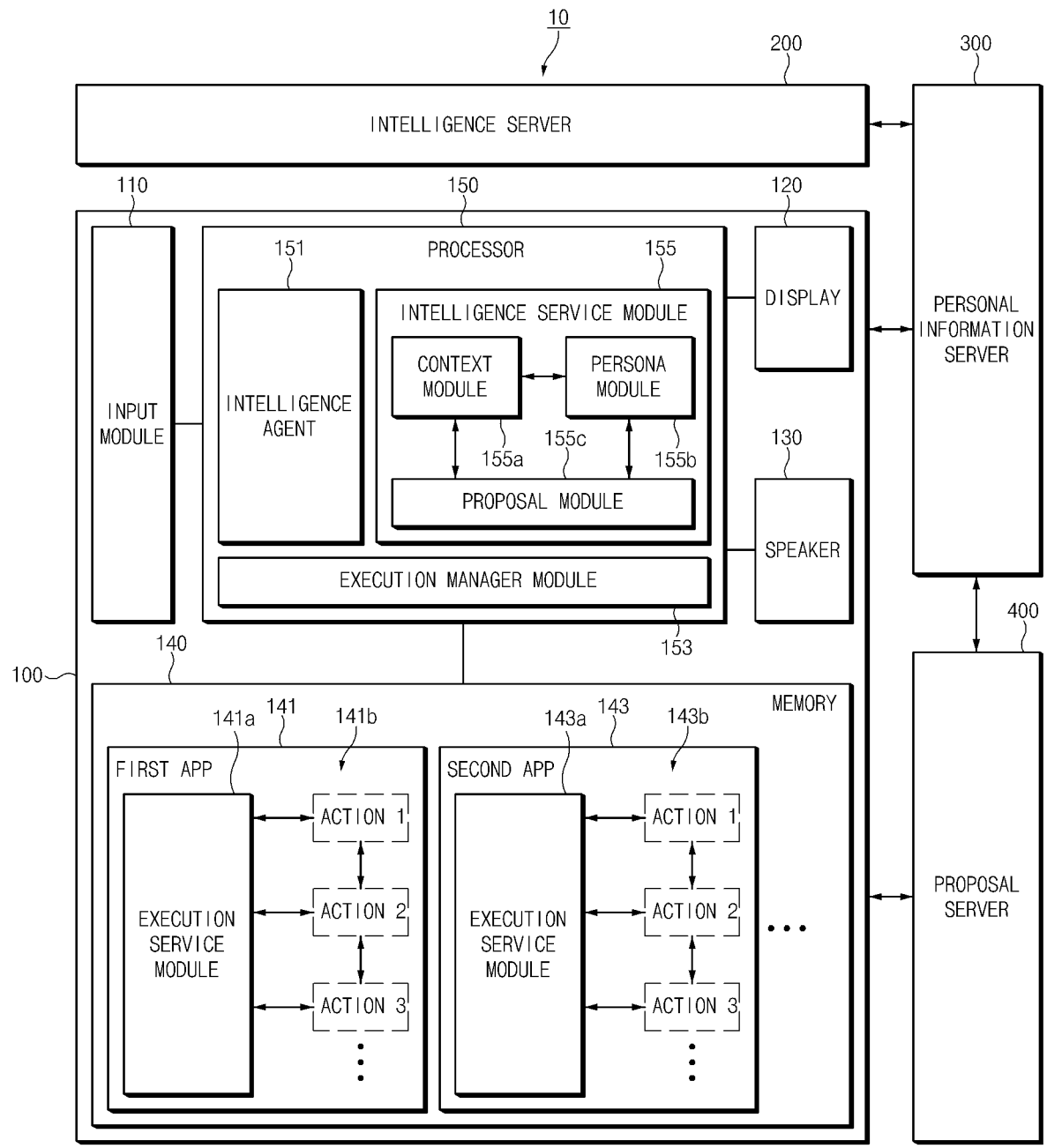
FIG. 2 is a block diagram illustrating a user terminal of an integrated intelligent system, according to an embodiment.

FIG. 2 is a block diagram illustrating a user terminal of an integrated intelligent system, according to an embodiment.

Referring to FIG. 2, the user terminal 100 may include an input module 110, a display 120, a speaker 130, a non-transitory memory 140, and a processor 150. The user terminal 100 may further include a housing, wherein elements of the user terminal 100 may be seated in the housing or may be positioned on the housing.

According to an embodiment, the user terminal 100 may further include a communication circuit that communicates with an external server (e.g., the intelligence server 200). For example, the communication circuit may be positioned inside a housing of the user terminal 100 and may be electrically connected to the processor 150.

According to an embodiment, the input module 110 may receive a user input from a user. For example, the input module 110 may receive the user input from a connected external device (e.g., a keyboard or a headset). As another example, the input module 110 may include a touch screen (e.g., a touch screen display) coupled to the display 120. In yet another example, the input module 110 may include a hardware key (or a physical key) placed in the user terminal 100 (or the housing of the user terminal 100). In yet another example, the input module 110 may include a microphone that is capable of receiving a user utterance as a voice signal. For example, the input module 110 may include a speech input system and may receive the utterance of the user as a voice signal through the speech input system.

According to an embodiment, the display 120 may display an image, a video, and/or an execution screen of an application. For example, the display 120 may display a graphical user interface (GUI) of an app.

According to an embodiment, the speaker 130 may output the voice signal. For example, the speaker 130 may output the voice signal generated by the user terminal 100 to the outside.

According to an embodiment, the non-transitory memory 140 may store a plurality of apps (e.g., apps 141 and 143). The plurality of apps 141 and 143 that are stored in the non-transitory memory 140 may be selected, launched, and executed depending on the user input.

According to an embodiment, the non-transitory memory 140 may include a database capable of storing information that is necessary to recognize the user input. For example, the non-transitory memory 140 may include a log database that is capable of storing log information. As another example, the memory 140 may include a persona database that is capable of storing user information.

According to an embodiment, the non-transitory memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141*a* and 143*a* for performing a function or a plurality of actions (or unit actions) 141*b* and 143*b*. The execution services 141*a* and 143*a* may be generated by the execution manager module 153 of the processor 150 and then may execute the plurality of actions 141*b* and 143*b*.

According to an embodiment, when the actions 141*b* and 143*b* of the apps 141 and 143 are executed, an execution state screen according to the execution of the actions 141*b* and 143*b* may be displayed on the display 120. For example, the execution state screen may be a screen that is in a state where the actions 141*b* and 143*b* are completed. As another example, the execution state screen may be a screen that is in a state where the execution of the actions 141*b* and 143*b* is in partial landing (e.g., in the case where a parameter necessary for the actions 141*b* and 143*b* are not input).

According to an embodiment, the execution services 141*a* and 143*a* may execute the actions 141*b* and 143*b* depending on a path rule. For example, the execution services 141*a* and 143*a* may be activated by the execution manager module 153, may receive an execution request from the execution manager module 153 based on the path rule, and may execute the actions 141*b* and 143*b* of the apps 141 and 143 based on the execution request. When the execution of the actions 141*b* and 143*b* are completed, the execution services 141*a* and 143*a* may transmit completion information to the execution manager module 153.

According to an embodiment, in the case where the plurality of actions 141*b* and 143*b* are respectively executed in the apps 141 and 143, the plurality of the actions 141*b* and 143*b* may be sequentially executed. For example, when the execution of one action (action 1) is completed, the execution services 141*a* and 143*a* may open the next action (action 2) and may transmit completion information to the execution manager module 153. Here, it is understood that opening an arbitrary action is to change a state of the arbitrary action to an executable state or to prepare for the execution of the arbitrary action. In other words, when the arbitrary action is not opened, the corresponding action may not be executed. When the completion information is received, the execution manager module 153 may transmit an execution request to an execution service for the next actions 141*b* and 143*b* (e.g., action 2) to be executed.

According to an embodiment, in the case where the plurality of apps 141 and 143 are executed, the plurality of apps 141 and 143 may be sequentially executed. For example, when receiving the completion information after executing the last action of the first app 141, the execution manager module 153 may transmit an execution request to the execution service 143*a* for executing the first action of the second app 143.

According to an embodiment, in the case where the plurality of actions 141*b* and 143*b* are executed in the apps 141 and 143, a result screen corresponding to the execution of each of the executed plurality of the actions 141*b* and 143*b* may be displayed on the display 120. According to an embodiment, only a part of a plurality of result screens corresponding to the executed plurality of actions 141*b* and 143*b* may be displayed on the display 120.

According to an embodiment, the non-transitory memory 140 may store an intelligence app (e.g., a speech recognition app) that may operate in conjunction with an intelligence agent 151. The intelligence app operating in conjunction with the intelligence agent 151 may receive and process the utterance of the user as a voice signal. According to an embodiment, the intelligence app operating in conjunction with the intelligence agent 151 may be operated by a specific input (e.g., an input through a hardware key, an input through a touch screen, or a specific voice input) that is input through the input module 110.

According to an embodiment, the processor 150 may control overall actions of the user terminal 100. For example, the processor 150 may control the input module 110 to receive the user input. For example, the user input may include a request for performing a task using the user terminal 100. The processor 150 of the user terminal 100 may control the display 120 to display an image. The processor 150 may control the speaker 130 to output the voice signal. The processor 150 may control the non-transitory memory 140 to read or store necessary information.

According to an embodiment, the processor 150 may include the intelligence agent 151, the execution manager module 153, an intelligence service module 155, or any combination thereof. In an embodiment, the processor 150 may drive the intelligence agent 151, the execution manager module 153, and/or the intelligence service module 155 by executing one or more commands (or one or more instructions) stored in the non-transitory memory 140. Modules described in various embodiments of the present disclosure may be implemented by hardware or by software. In various embodiments of the present disclosure, it is understood that the action executed by the intelligence agent 151, the execution manager module 153, and/or the intelligence service module 155 is an action executed by the processor 150.

According to an embodiment, the intelligence agent 151 may generate, based on the voice signal received as the user input, one or more instructions for operating an app. According to an embodiment, the execution manager module 153 may receive the generated instruction(s) from the intelligence agent 151, and may select, launch, and operate the apps 141 and 143 stored in the non-transitory memory 140. According to an embodiment, the intelligence service module 155 may manage information of the user and may use the information of the user to process the user input.

The intelligence agent 151 may transmit the user input received through the input module 110 to the intelligence server 200 to process the received user input.

According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, and/or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all of the pre-processing elements discussed above for performance. However, in another embodiment, the intelligence agent 151 may include one or some of the pre-processing elements discussed above to operate at low power.

According to an embodiment, the intelligence agent 151 may include a wake up recognition module that recognizes a call initiated by a user. The wake up recognition module may recognize a wake up instruction initiated by the user through the speech recognition module. In the case where the wake up recognition module receives the wake up instruction, the wake up recognition module may activate the intelligence agent 151 to receive the user input. According to an embodiment, the wake up recognition module of the intelligence agent 151 may be implemented with a low-power processor (e.g., a processor included in an audio codec). According to an embodiment, the intelligence agent 151 may be activated based on user input entered through a hardware key. In the case where the intelligence agent 151 is activated, an intelligence app (e.g., a speech recognition app) operating in conjunction with the intelligence agent 151 may be executed.

According to an embodiment, the intelligence agent 151 may include a speech recognition module for performing the user input. The speech recognition module may recognize the user input for executing an action in an app. For example, the speech recognition module may recognize a limited user (voice) input (e.g., uttering the word "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input by using an algorithm for recognizing a voice. For example, the algorithm for recognizing the voice may be at least one of a hidden Markov model (HMM) algorithm, an artificial neural network (ANN) algorithm, a dynamic time warping (DTW) algorithm, or any combination thereof.

According to an embodiment, the intelligence agent 151 may change the voice input of the user to text data. According to an embodiment, the intelligence agent 151 may transmit the voice of the user to the intelligence server 200 to receive the changed text data. As such, the intelligence agent 151 may display the text data on the display 120.

According to an embodiment, the intelligence agent 151 may receive a path rule (or sequence) from the intelligence server 200. The path rule may include the states of the user terminal 100. For example, the intelligence agent 151 may receive, from the intelligence server 200, a path rule for performing a task and a response including an identifier associated with the received path rule. The identifier may be a unique ID (or path rule ID) (e.g., unique number) for distinguishing the relevant path rule from other path rules. For example, different path rules may be assigned to unique IDs (e.g., 001~099), respectively. According to an embodiment, the intelligence agent 151 may transmit the path rule to the execution manager module 153. The intelligence agent 151 may recognize the identifier included in the response and may execute the operation of an app based on the sequence.

According to another embodiment, an arbitrary identifier (e.g., virtual identifier) may include only a specified value even though the path rule corresponding to the identifier is not assigned to the arbitrary identifier. For example, the specified path rule may not be assigned to the arbitrary unique ID (e.g., 100). In other words, the sequence of the states of the electronic device may be assigned to the arbitrary unique ID. According to an embodiment, in the case where the intelligence agent 151 recognizes an identifier to which a path rule is not assigned, the intelligence agent 151 may not execute operations based on the specified sequence. In other words, the intelligence agent 151 may execute the operation of the app that does not conform to the specified sequence.

According to an embodiment, the intelligence agent 151 may transmit the execution result log to the intelligence service module 155 according to the path rule that was received from the intelligence server 200, wherein the transmitted execution result log may be accumulated and managed in a persona module 155b as preference information of the user.

According to an embodiment, the execution manager module 153 may receive the path rule from the intelligence agent 151 to execute the apps 141 and 143 and may allow the apps 141 and 143 to execute the actions 141b and 143b included in the path rule. In other words, the execution manager module 153 may perform the task by allowing the user terminal to have the state of the path rule. For example, the execution manager module 153 may transmit instruction information to the apps 141 and 143 for executing the actions 141b and 143b. The execution manager module 153 may receive from the apps 141 and 143 completion information of the actions 141b and 143b.

According to an embodiment, the execution manager module 153 may transmit or receive the instruction information for executing the actions 141b and 143b of the apps 141 and 143 between the intelligence agent 151 and the apps 141 and 143. The execution manager module 153 may bind the apps 141 and 143 to be executed based on the path rule and may transmit the instruction information of the actions 141b and 143b included in the path rule to the apps 141 and 143. For example, the execution manager module 153 may transmit to the apps 141 and 143 a request for performing the actions 141b and 143b included in the path rule and may sequentially execute the actions 141b and 143b of the apps 141 and 143 based on the path rule. The request for performing the actions 141b and 143b of the apps 141 and 143 may be transmitted depending on the path rule.

According to an embodiment, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in a standstill (or partial landing) (e.g., in the case where a parameter necessary for the actions 141b and 143b is not input), the execution manager module 153 may transmit information about the partial landing to the intelligence agent 151. Based on the information received from the execution manager module 153, the intelligence agent 151 may request the user to input the necessary information (e.g., parameter information). As another example, and in the case where the execution state of the actions 141b and 143b are in an operating state, the utterance may be received from the user and the execution manager module 153 may transmit information about the apps 141 and 143 that are being executed along with the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141b and 143b to a new parameter by using the received parameter information.

According to an embodiment, the execution manager module 153 may transmit the parameter information included in the path rule to the apps 141 and 143. In the scenario where the plurality of apps 141 and 143 are sequentially executed based on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, in the case where the user utterance specifies the app 141 for executing a part of the action 141b, but does not specify the app 143 for executing any other action 143b, the execution manager module 153 may receive a plurality of different path rules in which the same app 141 (e.g., an gallery app) is executed for action 141b and in which different apps 143 (e.g., a message app or a Telegram app) are executed for action 143b. For example, the execution manager module 153 may execute the same actions 141b and 143b (e.g., the same successive actions 141b and 143b) of the plurality of path rules. In the case where the execution manager module 153 executes the same action, the execution manager module 153 may display a state screen on the display 120 for selecting the different apps 141 and 143 included in the plurality of path rules.

According to an embodiment, the intelligence service module 155 may include a context module 155a, a persona module 155b, a proposal module 155c, or any combination thereof.

The context module 155a may collect the current states of the apps 141 and 143 from the apps 141 and 143. For example, the context module 155a may receive context information that is indicative of the current states of the apps 141 and 143.

The persona module 155b may manage personal information of the user that is utilizing the user terminal 100. For example, the persona module 155b may collect the usage information and the execution result of the user terminal 100 to manage the personal information of the user.

The suggestion module 155c may predict the intent of the user to recommend an instruction to the user. For example, the proposal module 155*c* may recommend an instruction to the user by taking into consideration the current state (e.g., a time, a place, context, or an app) of the user.

Figure 3:
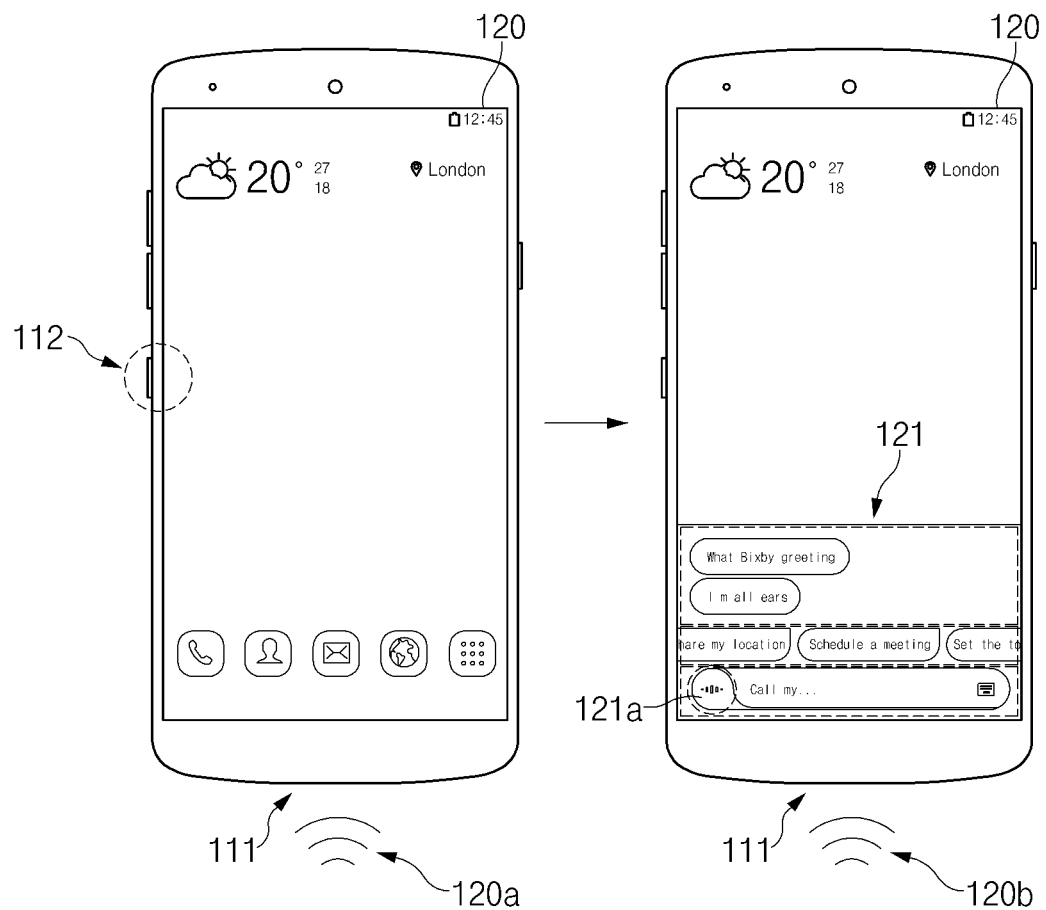
FIG. 3 is a view illustrating that an intelligence app of a user terminal is executed, according to an embodiment.

FIG. 3 is view illustrating that an intelligence app of a user terminal is executed, according to an embodiment.

FIG. 3 illustrates that the user terminal 100 receives a user input to execute an intelligence app (e.g., a speech recognition app) operating in conjunction with the intelligence agent 151.

According to an embodiment, the user terminal 100 may execute the intelligence app for recognizing a voice through a hardware key 112. For example, in the case where the user terminal 100 receives the user input through the hardware key 112, the user terminal 100 may display a user interface (UI) 121 of the intelligence app on the display 120. For example, a user may touch a speech recognition button 121*a* of the UI 121 of the intelligence app for the purpose of entering a voice 120*b* in a state where the UI 121 of the intelligence app is displayed on the display 120. As another example, while continuously pressing down on the hardware key 112 to enter the voice 120*b*.

According to an embodiment, the user terminal 100 may execute the intelligence app for recognizing a voice through the microphone 111. For example, in the case where a specified voice (e.g., wake up!) is entered 120*a* through the microphone 111, the user terminal 100 may display the UI 121 of the intelligence app on the display 120.

Figure 4:
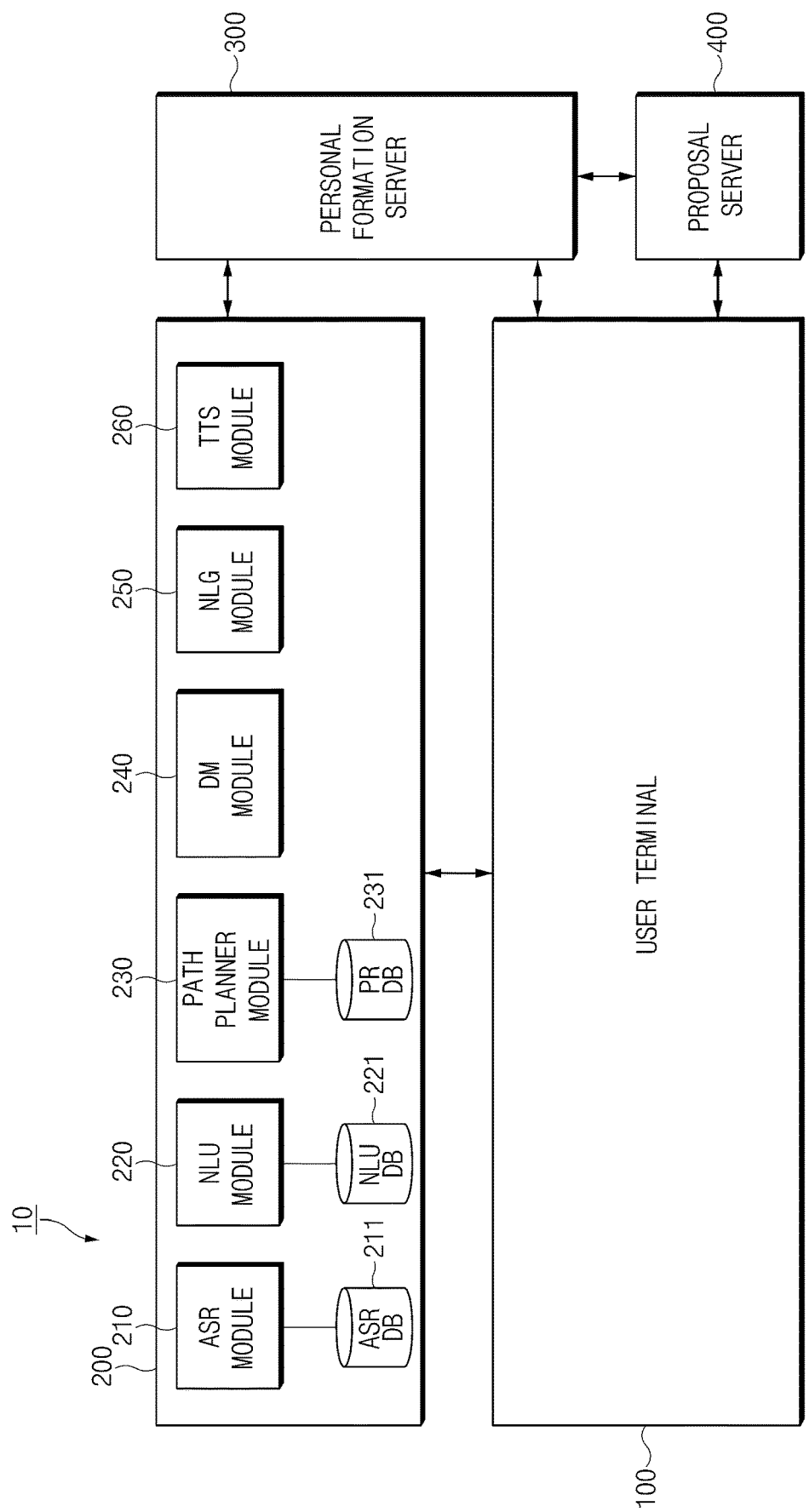
FIG. 4 is a block diagram illustrating an intelligence server of an integrated intelligent system, according to an embodiment.

FIG. 4 is a block diagram illustrating an intelligence server of an integrated intelligent system, according to an embodiment.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, a text to speech (TTS) module 260, or any combination thereof.

According to an embodiment, the intelligence server 200 may include a communication interface, a non-transitory memory, and a processor. The communication interface may be connected to an external electronic device (e.g., the user terminal 100) and may communicate with the external electronic device. The non-transitory memory may store data of the intelligence server 200. The processor may include the ASR module 210, the NLU module 220, the path planner module 230, the DM module 240, the NLG module 250, and the TTS module 260. In other words, the processor may execute the functions of the ASR module 210, the NLU module 220, the path planner module 230, the DM module 240, the NLG module 250, and the TTS module 260.

The NLU module 220 or the path planner module 230 of the intelligence server 200 may generate a path rule.

According to an embodiment, the ASR module 210 may change the user input received from the user terminal 100 to text data.

For example, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and the unit phoneme information. For example, the information about the acoustic model and the language model may be stored in an automatic speech recognition database (ASR DB) 211.

According to an embodiment, the NLU module 220 may grasp the user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, and the like. As such, the NLU module 220 may obtain a domain, intent, or a parameter (or a slot) necessary for the user input to express the intent.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine the user intent. For example, for the purpose of determining the user intent, the NLU module 220 may calculate how many words extracted from the user input are included in each of the domain and the intent. According to an embodiment, the NLU module 220 may determine a parameter of the user input by using the words that are the basis for grasping the intent. According to an embodiment, the NLU module 220 may determine the user intent by using the NLU DB 221 that stores the linguistic features for grasping the intent of the user input. According to another embodiment, the NLU module 220 may determine the user intent by using a personal language model (PLM), which model may be stored in the NLU DB 221. For example, the NLU module 220 may determine the user intent by using the personalized information (e.g., a contact list or a music list). According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed based on the intent of the user input and may determine an action to be executed in the selected app. The NLU module 220 may determine the parameter that corresponds to the determined action to generate the path rule. The NLU module 220 may generate a path rule ID (or identifier) associated with the generated path rule. The NLU module 220 may tag the generated path rule with the generated path rule ID. According to an embodiment, the path rule generated by the NLU module 220 may include information about the app to be executed, the action to be executed in the app, and a parameter necessary to execute the action.

According to an embodiment, the NLU module 220 may generate one path rule or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, for the purpose of generating the path rule, the NLU module 220 may arrange the app to be executed and the action to be executed in the app by using information of the user terminal 100, wherein the app is arranged based on the intent of the user input and is further based on ontology or a graph model. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. As another example, in the case where only a part of the action is specified based on the user utterance, the NLU module 220 may select a plurality of path rules. The NLU module 220 may determine one path rule in the plurality of path rules based on an additional input of the user.

According to an embodiment, the NLU module 220 may transmit the path rule to the user terminal 100 in response to a request for the user input. For example, the NLU module 220 may transmit one path rule corresponding to the user input to the user terminal 100. As another example, the NLU module 220 may transmit the plurality of path rules corresponding to the user input to the user terminal 100. For example, in the case where only a part of the action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in a tabular form in the PR DB 231 connected to the path planner module 230. For example, the path planner module 230 may transmit to the NLU module 220 a path rule set that corresponds to information (e.g., OS information or app information) of the user terminal 100, which is received from the intelligence agent 151. For example, a table stored in the PR DB 231 may be stored for each domain or for each version of the domain.

According to an embodiment, the path planner module 230 may select one path rule or the plurality of path rules from the path rule set and transmit the selected one path rule or the selected plurality of path rules to the NLU module 220. For example, the path planner module 230 may match the user intent and the parameter to the path rule set that corresponds to the user terminal 100 to select one path rule or a plurality of path rules. The path planner module 230 may also transmit the selected one path rule or the selected plurality of path rules to the NLU module 220.

According to an embodiment, the path planner module 230 may generate the one path rule or the plurality of path rules by using the user intent and the parameter. For example, and for the purpose of generating the one path rule or the plurality of path rules, the path planner module 230 may determine the app to be executed and the action to be executed in the app based on the user intent and the parameter. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is clear. For example, the DM module 240 may determine whether the user intent is clear based on whether the information of a parameter (e.g., a keyword, search term, telephone number, etc) is sufficient. The DM module 240 may determine whether the parameter grasped by the NLU module 220 is sufficient to perform a task. According to an embodiment, in the case where the user intent is not clear, the DM module 240 may perform a feedback for making a request to the user to provide the necessary information. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit to the user terminal 100 the result generated by the content provider module as the response to the user input.

According to an embodiment, the natural language generating module NLG 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented as one module. For example, the NLU module 220, the path planner module 230 and the DM module 240 may be implemented as one module, may determine the user intent and the parameter, and may generate a response (e.g., a path rule) corresponding to the determined user intent and parameter. As such, the generated response may be transmitted to the user terminal 100.

Figure 5:
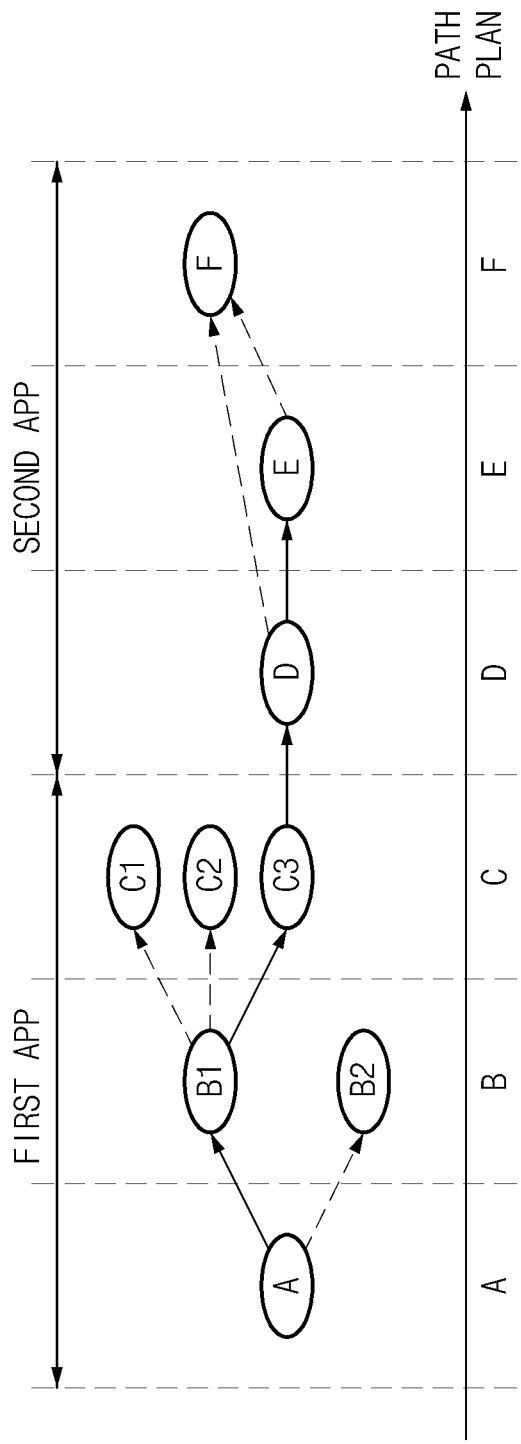
FIG. 5 is a view illustrating a path rule generating method of natural language understanding (NLU), according to an embodiment.

FIG. 5 is a diagram illustrating a path rule generating method of an NLU module, according to an embodiment.

Referring to FIG. 5, according to an embodiment, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F that are divided into unit actions in the PR DB 231.

According to an embodiment, the PR DB 231 of the path planner module 230 may store the path rule set for performing the function of an app. The path rule set may include a plurality of path rules each of which includes a plurality of actions. An action executed based on a parameter input to each of the plurality of actions may be sequentially arranged in the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule that completely matches the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) based on the user input (e.g., an input for selecting C3) that is additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where the intelligence server 200 receives information of a user input which is insufficient, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for the user to provide additional input by using the information about the insufficient parameter. When the additional input is received from the user, the intelligence agent 151 may transmit and process the additional input to the intelligence server 200. The NLU module 220 may generate a path rule to be added based on the intent of the user input that is additionally entered and the parameter information. The NLU module 220 may transmit to the intelligence agent 151 the generated path rule to be added. The intelligence agent 151 may transmit the generated path rule to the execution manager module 153 and may execute the second app 143.

According to an embodiment, in the case where a user input is received by the intelligence server 200, in which a portion of information is missing, the NLU module 220 may transmit a user information request to the personal information server 300. The personal information server 300 may transmit to the NLU module 220 information about the user that is entering the user input, wherein the information is stored in a persona database. The NLU module 220 may select a path rule, corresponding to the user input in which a part of the information is missing, by using the user information received from the personal information server 300. As such, even though the intelligence server 200 receives the user input with a portion of the information missing, the NLU module 220 may make a request for the missing information so that it may receive an additional input or may determine a path rule corresponding to the user input by using the user information received from the personal information server 300.

Figure 6:
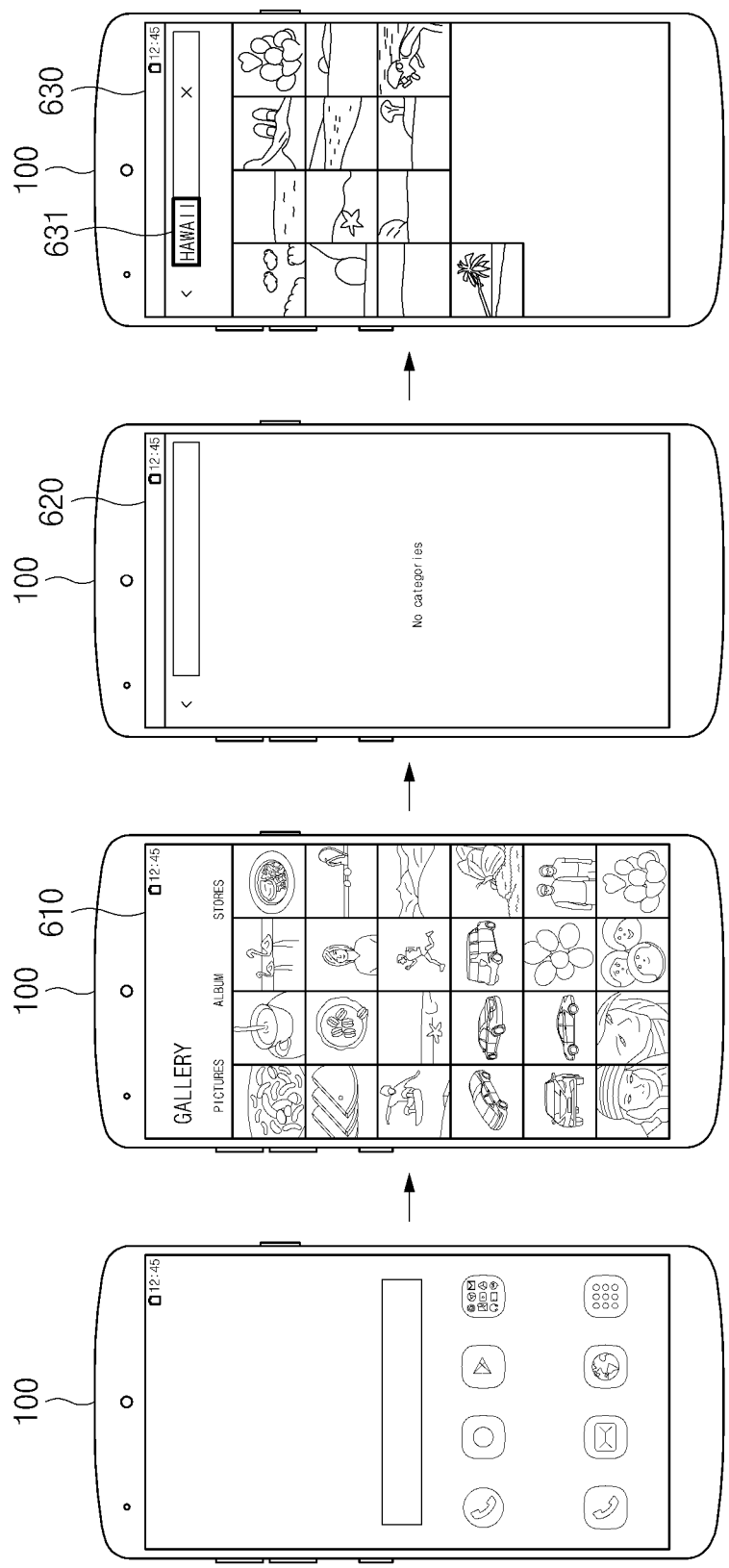
FIG. 6 is a view illustrating a conceptual diagram of a path rule generated by an intelligence server, according to an embodiment.
Figure 6:
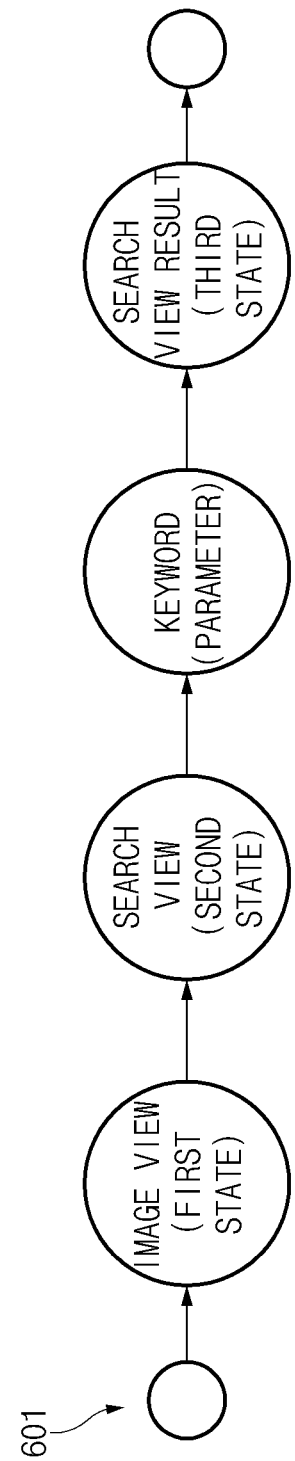

FIG. 6 is a view illustrating a conceptual diagram of a path rule generated by an intelligence server, according to an embodiment.

Referring to FIG. 6, the intelligence server 200 may generate a path rule 601 corresponding to a user input received from the user terminal 100.

According to an embodiment, the intelligence server 200 may generate the path rule 601, including information about the operation for performing the function of an app. For example, the intelligence server 200 may generate the path rule 601, including information about the operation of the app and a parameter (or keyword) necessary for the operation of the app. For example, the information about the operation of the app may include information about the state of the user terminal 100. According to an embodiment, the intelligence server 200 may generate a path rule including information about a plurality of operations of the app. For example, the path rule may include information in which the plurality of operations of the app are arranged sequentially. As such, the intelligence server 200 may generate a path rule in which the plurality of states of the user terminal 100 and the parameters (e.g., parameters input to change to a specified state) necessary for the operations corresponding to the plurality of states are arranged sequentially.

According to an embodiment, the intelligence server 200 may receive data corresponding to a user utterance from the user terminal 100. For example, the intelligence server 200 may receive data (e.g., voice data) corresponding to "find a Hawaii picture" from the user terminal 100. The intelligence server 200 (e.g., the NLU module 220) may generate the path rule 601 corresponding to the user input that says, "find a Hawaii picture". For example, the path rule may include information in which an image view (first state), a search view (second state), a parameter (e.g., Hawaii) input in the search view (second state), and a search view result (third state) are sequentially arranged.

According to an embodiment, the user terminal 100 may perform the operation of the app based on the path rule and may display the screen on the display 120 according to the executed operation. For example, the user terminal 100 may launch a gallery app corresponding to each state included in the path rule to sequentially display an image view screen 610, a search view screen 620 for searching for an image, and a search view result screen 630 for providing the result found by entering "Hawaii" 631 on the display 120.

Figure 7A:
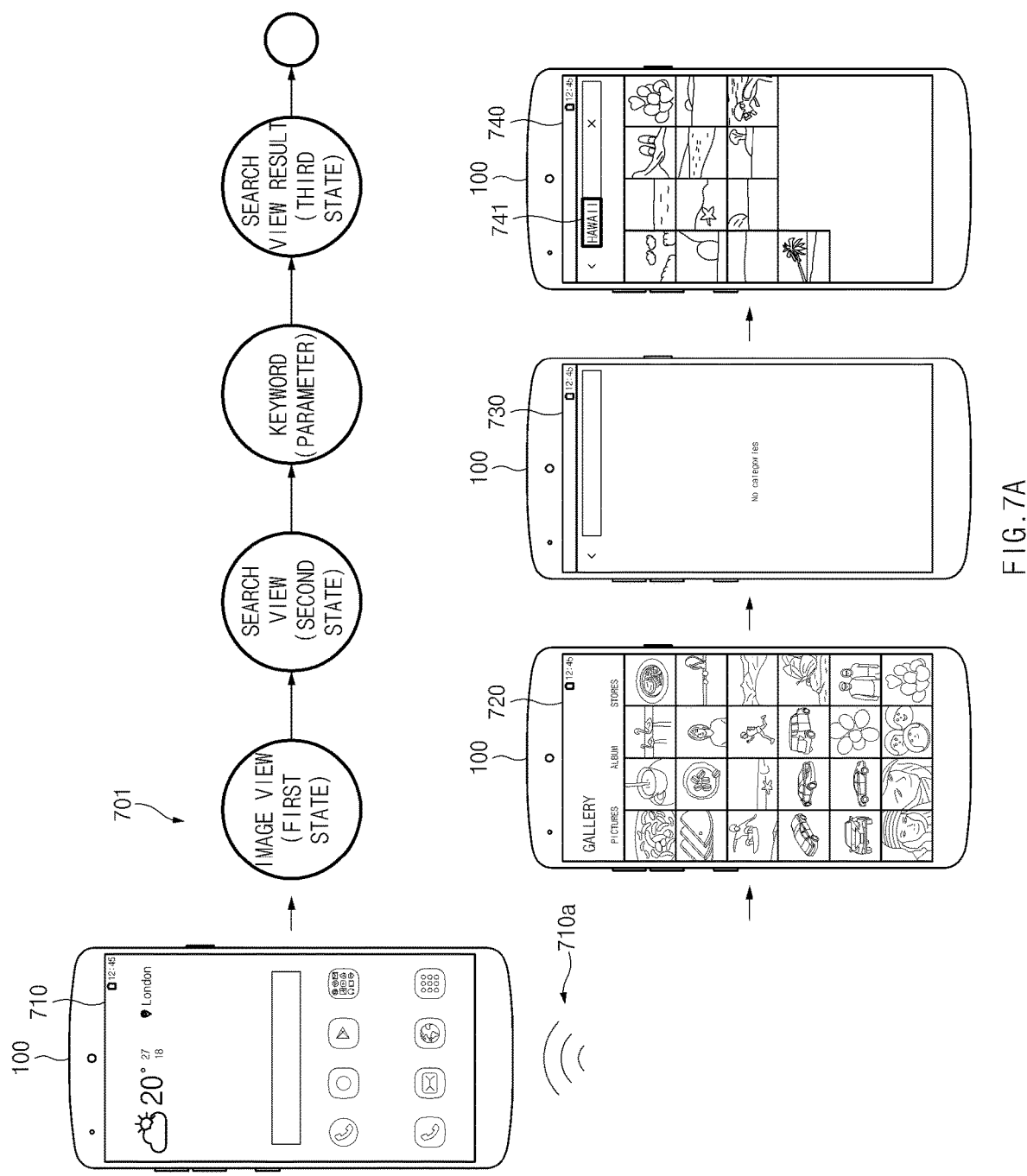
FIG. 7A, FIG. 7B, and FIG. 7C are views illustrating types of user utterances distinguished based on a path rule generated by an intelligence server, according to an embodiment.
Figure 7B:
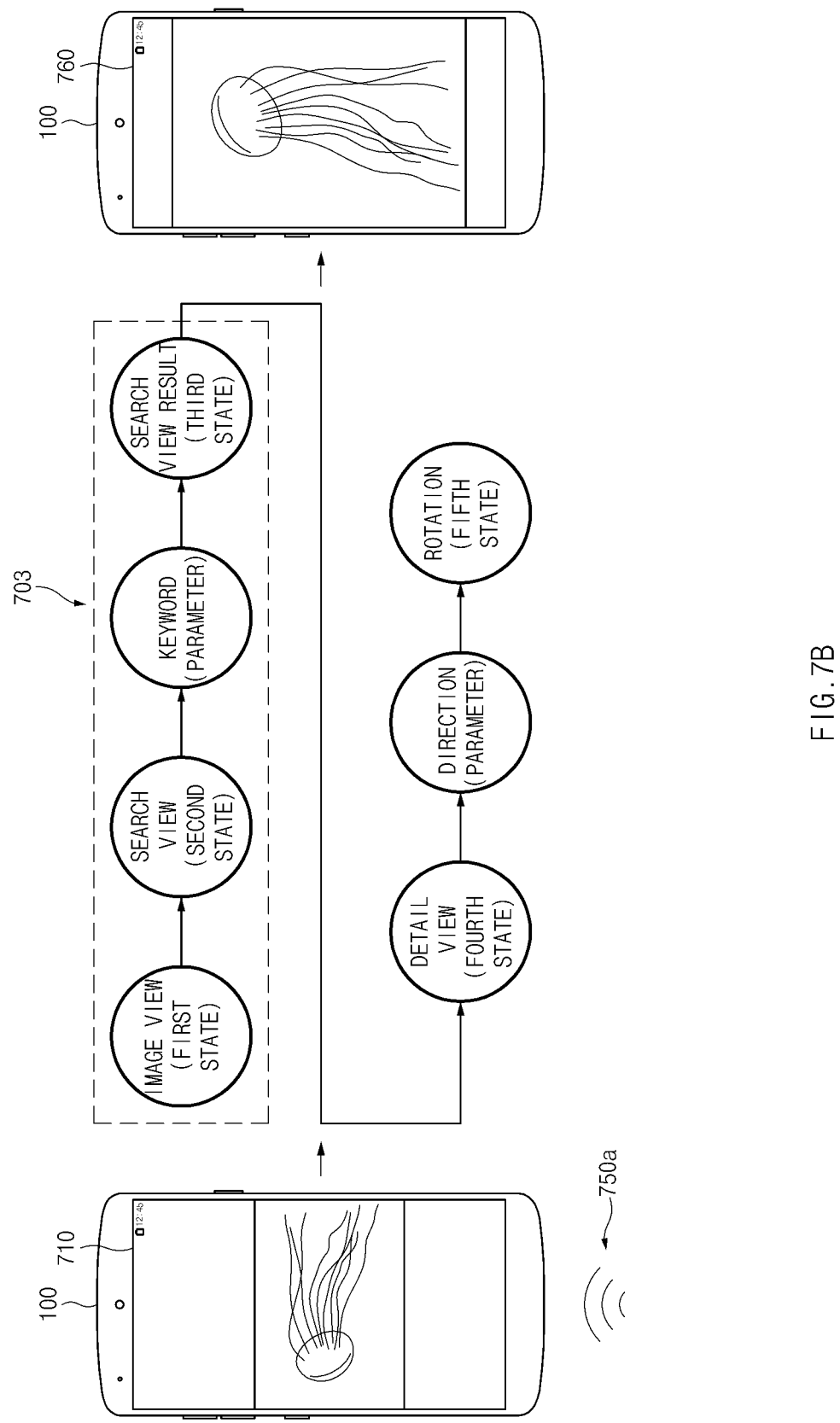
Figure 7C:
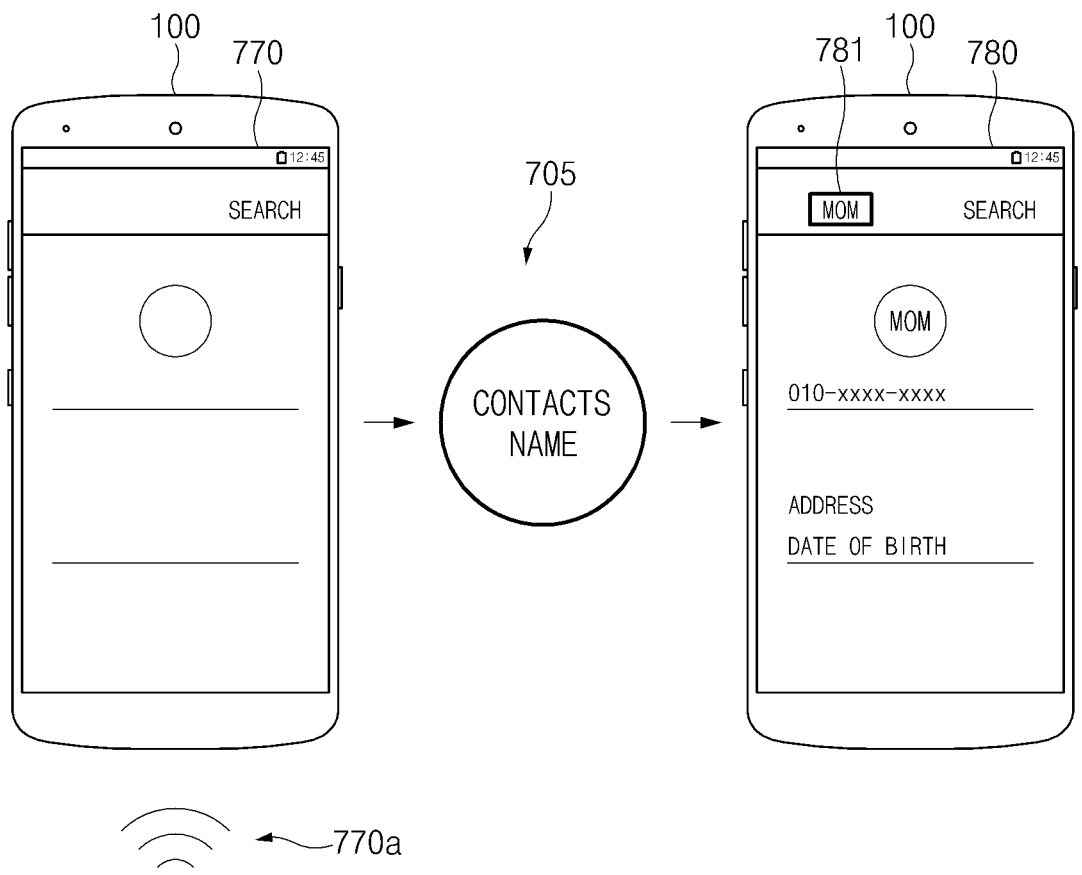

FIGS. 7A, 7B, and 7C are views illustrating the types of user utterances that may be distinguished based on a path rule generated by an intelligence server, according to an embodiment.

Referring to FIGS. 7A, 7B, and 7C, the user utterance may be distinguished based on the path rule generated by the intelligent server 200.

TABLE 1

| The type of an utterance | Detailed classification |
| --- | --- |
| Root utterance | Full root utterance |
|  | Partial root utterance |
| Follow-up utterance | Full follow-up utterance |
|  | Partial follow-up utterance |
| Parameter filling utterance | General parameter filling utterance |
|  | Targeted parameter filling utterance |

Referring to FIG. 7A, a root utterance may be an utterance to be processed regardless of the state of the user terminal 100. The user terminal 100 may process the root utterance regardless of the current state. For example, in the state where a home screen 710 is displayed, the user terminal 100 may receive "find a Hawaii photo" as input. For example, the user terminal 100 may receive from the intelligence server 200 the path rule in which the image view (first state), the search view (second state), the parameter (e.g., Hawaii) input in the search view (second state), and a search view result (third state) are sequentially arranged. As such, the user terminal 100 may sequentially display on the display 120 an image view screen 720, a search view screen 730 for searching for an image, and a search view result screen 740 for providing the result found by entering "Hawaii" 741, which correspond to each of the states included in a path rule 701 corresponding to the user input. As another example, in a state where another screen (e.g., dialogue box screen of a message app) is displayed on the display 120 as well as a state where the home screen 710 is displayed on the display 120, the user terminal 100 may receive and process a user input (e.g., "find a Hawaii photo") 710a.

The root utterance may include a full root utterance and a partial root utterance. According to an embodiment, the full root utterance may be executed (or connected to the last state) up to an operation corresponding to the last state included in the path rule. For example, a path rule corresponding to the full root utterance may include all the parameters needed for the operation corresponding to each state in the path rule. As such, when receiving the full root utterance, the user terminal 100 may perform an operation of an app up to the last state that is included in the path rule corresponding to the user input. According to an embodiment, the partial root utterance may be executed (or partial landing) up to an operation corresponding to the intermediate state (or one state) included in the path rule. For example, the path rule corresponding to the partial root utterance may not include the parameters required for an operation of at least one state. As such, when receiving the partial root utterance, the user terminal 100 may perform an operation of an app up to the intermediate state included in the path rule and may receive an additional user input for performing an operation corresponding to the next state. In other words, the user terminal 100 may maintain one state among the states included in the path rule and may receive a user input as a parameter while maintaining that one state.

Referring to FIG. 7B, the follow-up utterance may be an utterance processed in a specified state of the user terminal 100. The user terminal 100 may process the follow-up utterance in the specified state. The follow-up utterance may include a full follow-up utterance and a partial follow-up utterance. According to an embodiment, similar to the full root utterance, the full follow-up utterance may be executed up to the operation corresponding to the last state included in the path rule corresponding to the user utterance. For example, in the state where the search view result screen 710 is displayed on the display 120, the user terminal 100 may receive "rotate the found photo rightward" 750a. The user terminal 100 may receive, from the intelligent server 200, a path rule 703 including the rightward rotation (fifth state) of the found photo. As such, the user terminal 100 may display, on the display 120, a screen 760 in which the found photo is rotated rightward. According to an embodiment, similar to the partial root utterance, the partial follow-up utterance may be executed up to the operation corresponding to the intermediate state included in the path rule corresponding to the user utterance. For example, the user terminal 100 may receive "search for a jellyfish photo, select the jellyfish photo, and apply effects to the jellyfish photo". The user terminal 100 may receive a path rule including an image view (first state), a search view (second state), a parameter (e.g., jellyfish) input in the search view state, a search view result (third state), a detail view (fourth state), and an effect application (fifth state). The user terminal 100 may perform partial landing in the state (fifth state) in which the effect is applied and may receive parameters that are necessary to perform an operation corresponding to the landing state. For example, the user terminal 100 may output the feedback saying "what effect do you want to apply?" and the user terminal 100 may receive a user input saying "rotate rightward".

Referring to FIG. 7C, the parameter filling utterance may be an utterance processed in a specified state of the user terminal 100. For example, the user terminal 100 may process the parameter filling utterance in a state where a parameter is capable of being entered. As another example, the user terminal 100 may receive the partial user input (e.g., partial root utterance or partial follow-up utterance) to process the parameter filling utterance while in a state of partial landing. In other words, when the user terminal 100 executes an operation corresponding to the intermediate state included in the path rule based on the user's input, the parameter filling utterance may be an utterance for putting the parameter needed to perform the operation that corresponds to the next state.

According to an embodiment, while displaying a UI that includes a text input box, the user terminal 100 may receive a user input 770a that includes at least one parameter for filling the text input box. For example, while displaying the contact search screen 770 and the UI that includes the text input box on the display 120, the user terminal 100 may receive "enter Mom" 770a.

According to an embodiment, the user terminal 100 may receive, from the intelligence server 200, a response 705 including a parameter to be entered into the text box. For example, as well as the parameter, the response 705 may further include an identifier that does not have the sequence of states of the user terminal 100 for performing a task. In other words, the identifier may have a value, but the specified sequence may not be assigned to the corresponding value. The intelligence server 200 may generate the identifier and may tag the generated identifier with the parameter extracted from the parameter filling utterance.

According to an embodiment, when receiving the response 705, the user terminal 100 may recognize the identifier and may fill the text input box with the parameter. When the user terminal 100 fills the text input box with the parameter corresponding to a user input, the state of the user terminal 100 may be changed to another state included in the path rule. For example, the user terminal 100 may display a screen 780 on which the contact is found by entering "Mom" 781 corresponding to the user input, in the display 120.

The parameter filling utterance may include a general parameter filling utterance and a targeted parameter filling utterance. According to an embodiment, the general parameter filling utterance may be a general utterance for entering a parameter for performing an operation corresponding to the specified state. For example, the general parameter filling utterance may include an utterance corresponding to the parameter and an utterance corresponding to the operation for entering the parameter. According to an embodiment, the targeted parameter filling utterance may be a targeted utterance for performing only the operation corresponding to the specified state. For example, the targeted filling utterance may include only the utterance corresponding to the parameter. The targeted parameter filling utterance may be the user utterance corresponding to the additional input request of the user terminal 100. According to an embodiment, before receiving the parameter filling utterance, the user terminal 100 may generate a request for a parameter. For example, the user terminal 100 may generate the request for a parameter through at least one of the display 120 and the speaker 130.

Figure 7D:
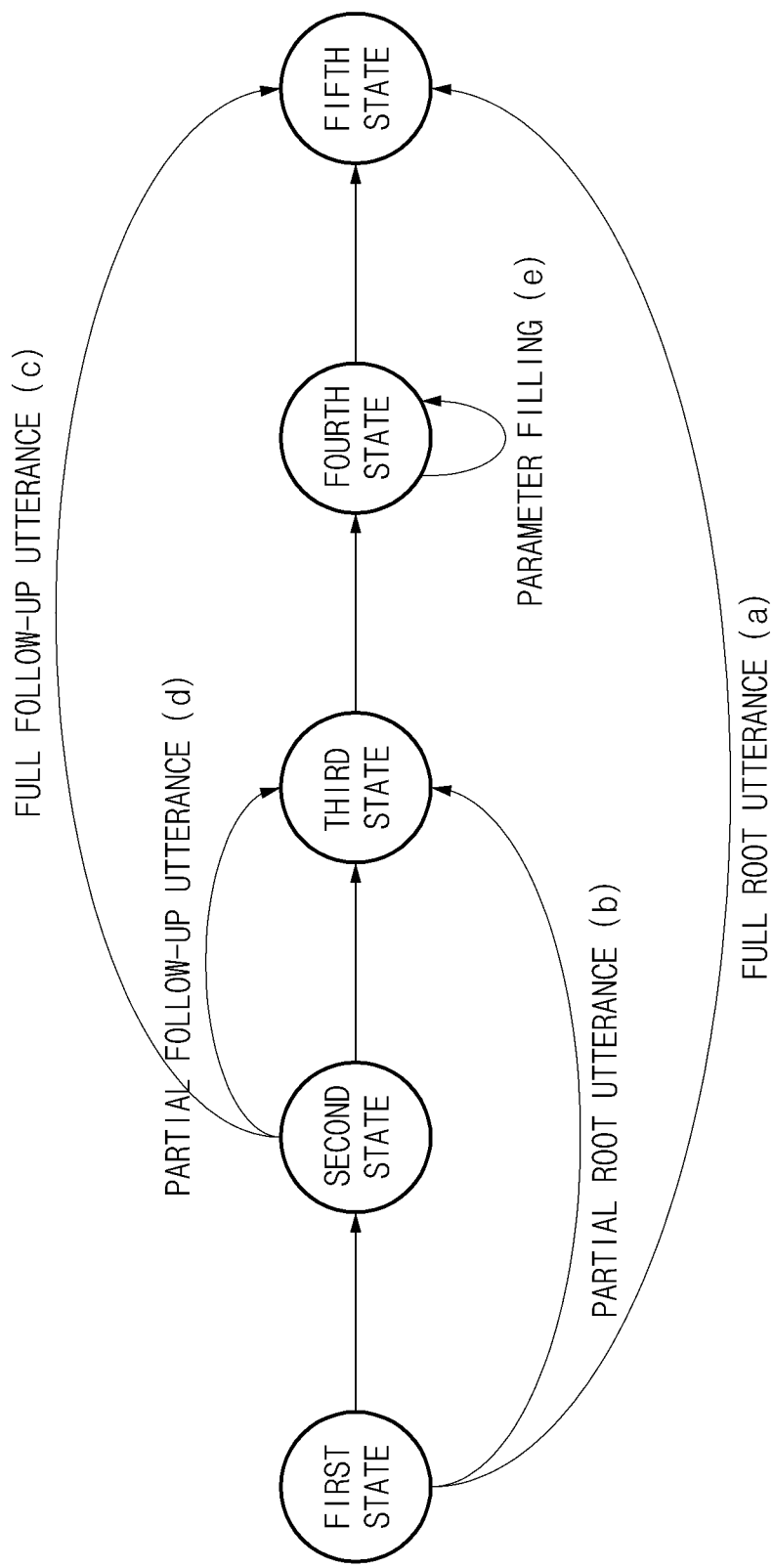
FIG. 7D is a view illustrating a range in which a state of a user terminal is changed based on a path rule that is generated based on the type of user utterance processed by an intelligence server, according to an embodiment.

FIG. 7D is a view illustrating a range in which a state of a user terminal is changed depending on a path rule generated depending on the type of a user utterance processed by an intelligence server, according to an embodiment.

Referring to FIG. 7D, when the user terminal 100 receives a path rule that corresponds to a full root utterance (a), the state of the user terminal 100 may be sequentially changed from the first state to the fifth state based on the path rule. When the user terminal 100 receives a path rule that corresponds to a partial root utterance (b), the state of the user terminal 100 may be sequentially changed from the first state to the third state based on the path rule. The user terminal 100 may perform partial landing in the third state.

When the user terminal 100 receives a path rule that corresponds to a full follow-up utterance (c), the state of the user terminal 100 may be sequentially changed from the second state to the fifth state based on the path rule. When the user terminal 100 receives a path rule that corresponds to a partial follow-up utterance (d), the state of the user terminal 100 may be sequentially changed from the second state to the third state. The user terminal 100 may perform partial landing in the third state.

When the user terminal 100 receives a path rule that corresponds to a parameter filling utterance (e), the user terminal 100 may enter a parameter in the fourth state. The state of the user terminal 100 may not change in a process of the parameter filling utterance (e).

According to an embodiment, the intelligence server 200 may generate a path rule that corresponds to a user input by using information about the path rule stored in the database (e.g., the PR DB 231). For example, the information about the path rule stored in the database may include a field as shown in Table 2.

TABLE 2

| Field | Description |
|---|---|
| Version | Supported version information |
| ruleImportance | Importance information of path rule |
| pathRuleType | Information for interworking with other apps |
| isConditional | Follow-up utterance support information |
| sampleUtterance | Representative utterance information |
| pathRuleID | ID information for identifying path rule |
| appNames | App information belonging to path rule |
| description | Additional description information |
| conflictoInfo | Conflict information of utterance |
| updateType | Update information |

The version field of the path rule may include version information of the app supported by the corresponding path rule. The ruleImportance field of the path rule may include information indicating the importance of the corresponding path rule. The importance of the path rule may be needed when one path rule of a plurality of path rules corresponding to the user utterance is selected. The pathRuleType field of the path rule may include information (e.g., static, dynamic caller, and dynamic callee) that allows an app executing an operation included in the corresponding path rule to interact with another app. The isConditional field of the path rule may include information about whether the follow-up utterance is capable of being processed when the follow-up utterance is received in the state where the operation is included in the corresponding path rule. The sampleUtterance field of the path rule includes information (e.g., app name, goal, and mandatory parameter) about the representative utterance corresponding to its respective path rule. The pathRuleId field of the path rule may include information about a unique ID (e.g., identifier) for distinguishing the corresponding path rule from other path rules. An arbitrary identifier may include a specified value and the path rule corresponding to the identifier may not be assigned. The appNames field of the path rule may include the name information of the app for executing the operation included in the corresponding path rule. The description field of the path rule may include additionally necessary information of the corresponding path rule. The conflictoInfo field of the path rule may include information with which the corresponding path rule is conflicted with while the user utterance is processed. The updateType field of the path rule may include update information (e.g., changed, added, and deleted) of the path rule or app.

According to an embodiment, the path rule generated by the intelligence server 200 may include information about the state of the user terminal 100. For example, the information about the state of the user terminal 100 may include fields as shown in Table 3.

TABLE 3

| Field | Description |
|---|---|
| seqNum | Sequence information of state |
| appName | App information corresponding to state |
| stateId | ID information for identifying state |
| isNestingState | Nesting operation information |
| nestingGroup | Group information about nesting operation |
| isLandingState | Landing state information |
| stateDescription | Description information about state |

The seqNum field of the state of the user terminal 100 may include information about the sequence of the corresponding state in the path rule. The appName field of the state of the user terminal 100 may include name information of the app indicated by the corresponding state. The stateId field of the state of the user terminal 100 may include information about the unique ID for distinguishing the corresponding state from other states. The isNestingState field of the state of the user terminal 100 may include information about whether a nesting operation is performed in the corresponding state. The nestingGroup field of the state of the user terminal 100 may include information (e.g., app information to be executed during the nesting operation and parameter information to be transmitted to the app) about the nesting operation of the corresponding state. The isLandingState field of the state of the user terminal 100 may include information about partial landing possibility of the corresponding state. The stateDescription field of the state of the user terminal 100 may include the necessary information of the corresponding state.

According to an embodiment, the path rule generated by the intelligence server 200 may include information about the parameters needed to perform the operation of the app. For example, the information about the parameter may include fields as shown in Table 4.

TABLE 4

| Field | Description |
| --- | --- |
| parameterName | Name information of parameter |
| parameterType | Input method information of parameter |
| parameterDescription | Description information about parameter |
| isMandatory | Information about whether it is mandatory |
| isNLUparameter | Information about whether input is made through utterance |
| parameterGroup | Group information about parameter |

The parameterName field of the parameter may include unique information for distinguishing the corresponding parameter from other parameters. The parameterType field of the parameter may include information about the type (e.g., int or string) in which the parameter is entered. The parameterDescription field of the parameter may include the necessary information for the corresponding parameter. The isMandatory field of the parameter may include information about whether the corresponding parameter is necessary for the operation of the app. The isNLUparameter field of the parameter may include information about whether the input is available through the user's utterance. The parameterGroup field of the parameter may include information about the parameter entered when an operation is performed based on the same path rule.

According to an embodiment, the path rule may include information about a parameter used for an operation corresponding to each of the states included in the path rule. For example, the information about the parameter may be information about whether the parameter is necessary to execute the operation. When maintaining one state that is included in the path rule (or performing partial landing), the user terminal 100 may determine whether to maintain that one state based on information of the parameter that is included in the path rule.

According to an embodiment, at least one parameter included in the parameter generated by the intelligence server 200 (e.g., the NLU module 220) may be grouped together. For the purpose of clarifying the criteria by which the path rule is generated, the intelligence server 200 may group the parameters included in the path rule. For example, the intelligence server 200 may group the parameters (e.g., date, time, and place required when a date is set) capable of being used when the intelligence server 200 performs an operation based on the same path rule. For example, information about the grouped parameter (or parameter group) may include information about the name of the parameter group and whether the parameter group is mandatory. According to an embodiment, the parameter group may include information about the name of the group, information about the type of the group, and whether the parameter group is mandatory (e.g., mandatory or optional). The type of the parameter group may include a plain type and a radio type. The plain type may be a type in which a plurality of parameters included in the parameter group are capable of being selected at the same time. The radio type may be a type in which one parameter included in the parameter group is capable of being selected. The parameter included in the parameter group may include information about whether the parameter group or the parameter is mandatory. According to an embodiment, whether the parameter group or the parameter is mandatory may be determined through a parameter that the parameter or the parameter group includes. For example, when the type of the parameter group is the radio type, all of the parameters included in the parameter group may be optional. In addition, in the case where all the parameters included in the parameter group are optional, the type of the parameter group may be a radio type.

According to an embodiment, the intelligence server 200 may group parameters included in the generated path rule based on the user input. For example, the intelligence server 200 may receive a user input to send an image to a specified recipient. The path rule corresponding to the user input may include a recipient, a sending time, a capture time, a place, and a character as parameters. The user input may include an operation of sending a message to the specified recipient and an operation of attaching the image to the message. As such, the parameter (e.g., recipient and sending time) for sending a message to the specified recipient may be grouped as a first parameter group, and the parameter (e.g., capture time, place, and character) for attaching an image may be grouped as a second parameter group. Since the operation of sending a message to the specified recipient is mandatory, the type of the first parameter group may be a plain type and the first parameter group may be entered mandatorily. Also, the recipient needs to be entered mandatorily, and the sending time may be entered optionally. The operation of attaching an image to the message may be mandatory or optional depending on a user input. For example, the type of the second parameter group may be either a plain type or a radio type and the second parameter group may be either mandatory or optional. In the case where the type of the second parameter group is a plane type, the capture time and the place needs to be entered mandatorily and the character may be entered optionally. In the case where the type of the second parameter group is the radio type, the capture time, the place, and the character may be entered optionally.

Figure 8A:
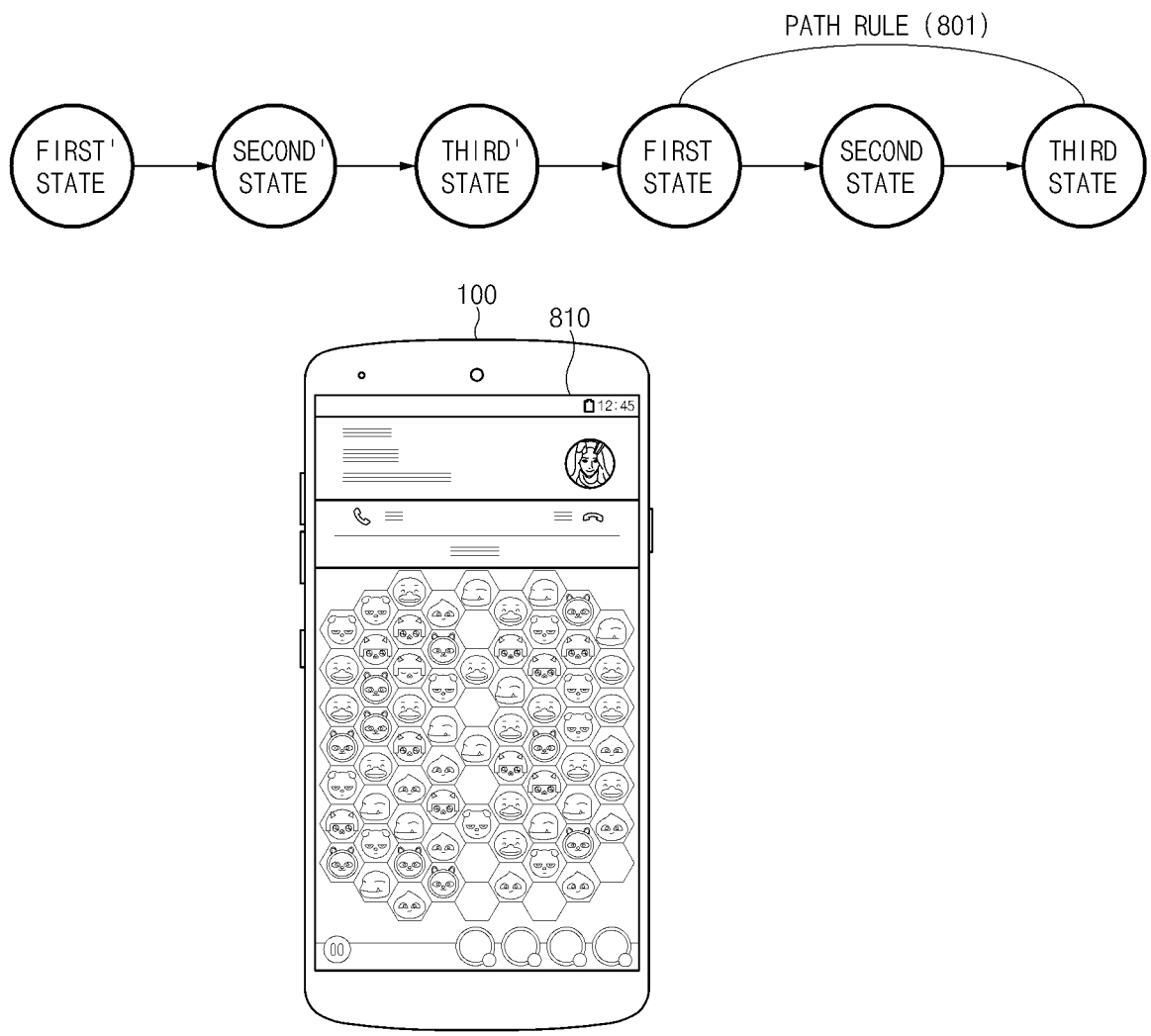
FIG. 8A and FIG. 8B are views illustrating how a path rule generated by an intelligence server is processed in a specified state of a user terminal, according to an embodiment.
Figure 8B:
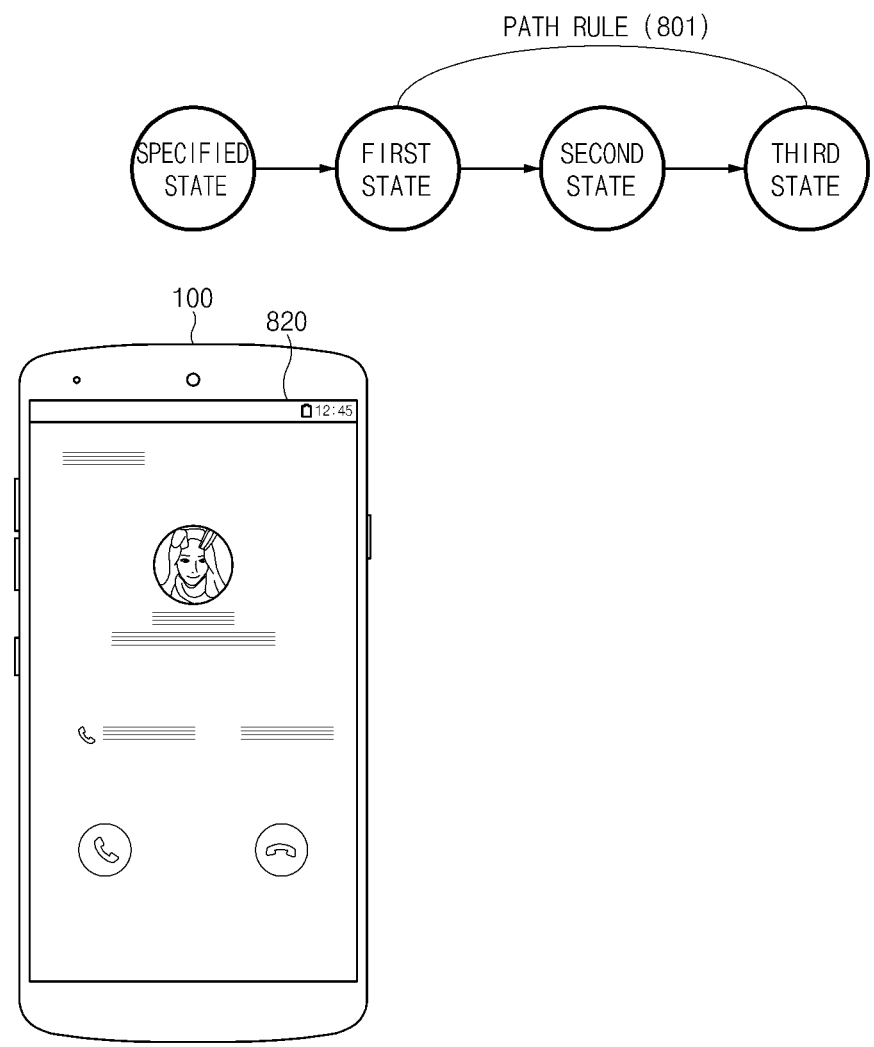

FIGS. 8A and 8B are views illustrating how a path rule generated by an intelligence server is processed in a specified state of a user terminal, according to an embodiment.

According to an embodiment, the user terminal 100 may receive a user input processed in a conditional state. For example, the user terminal 100 may receive and process "decline incoming calls" as a user input in an incoming call state.

Referring to FIG. 8A, according to an embodiment, the user terminal 100 may be changed to the incoming call state (third' state) while performing an operation of changing to a first' state and a second' state. The user terminal 100 may display a pop-up screen 810 of an incoming call on the display 120. The user terminal 100 may receive "decline incoming calls" as a user input. The intelligence server 200 may receive the user input to generate a path rule 801 including the first state, the second state, and the third state to block the incoming call. The user terminal 100 may receive the path rule 801 from the intelligence server 200 to block the incoming call. Since the one state is not the specified state even through receiving the user input in one state of the first' state and the second' state, the user terminal 100 may not process the user input. In other words, the user input (e.g., "decline incoming calls") may be processed in the specified state (e.g., the third' state).

Referring to FIG. 8B, the user terminal 100 may be in the incoming call state (or a specified state). The user terminal 100 may display a screen 820 of the incoming call on the display 120. The user terminal 100 may receive "decline incoming calls" as a user input. The user terminal 100 may receive the path rule 801 including the first state, the second state, and the third state, and may block the incoming call based on the path rule 801. When not being in the incoming call state, even though receiving a user input, the user terminal 100 may not process the user input. In other words, the user input (e.g., "decline incoming calls") may be processed in the specified state.

Figure 9A:
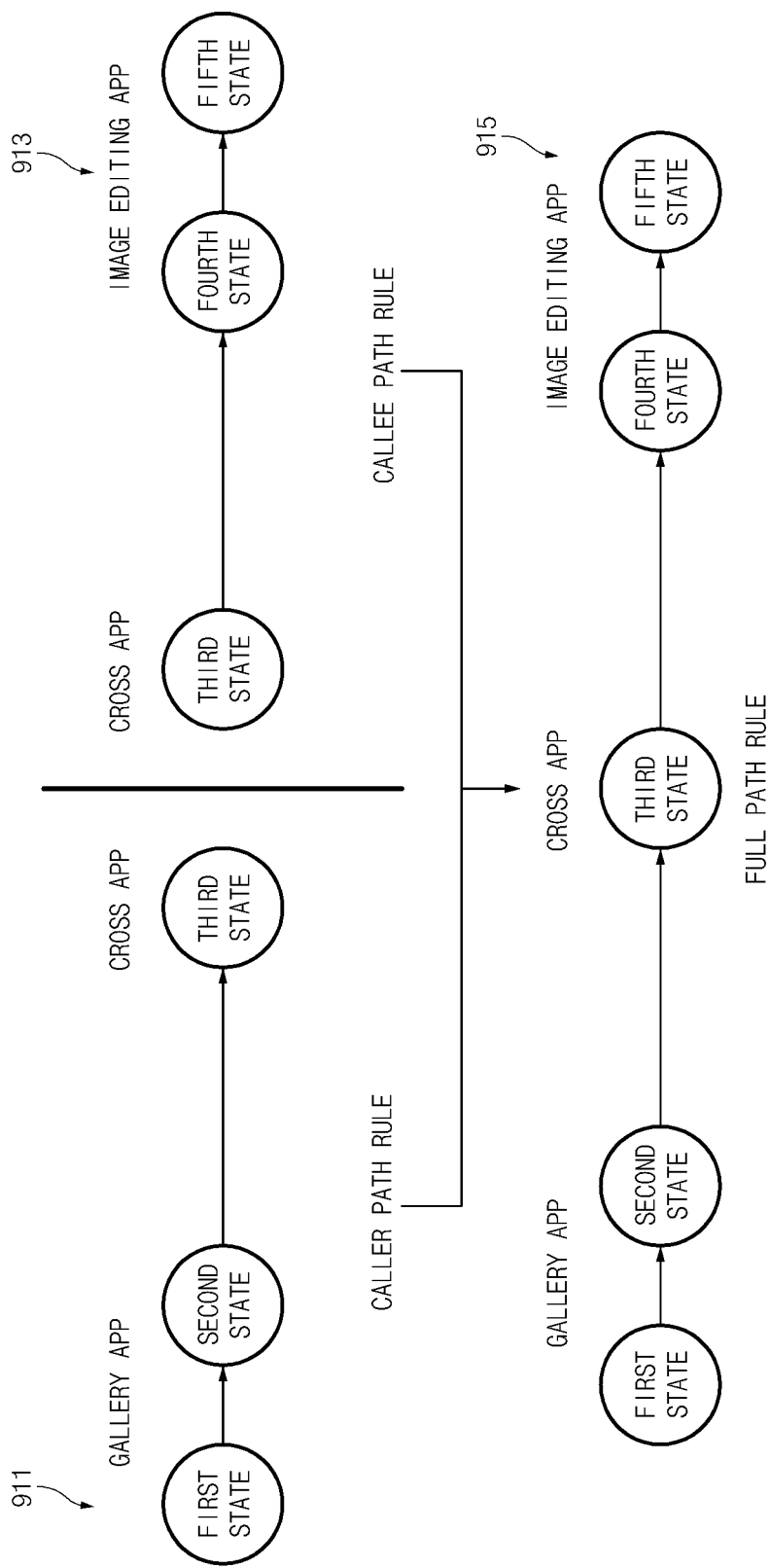
FIG. 9A, FIG. 9B, and FIG. 9C are views illustrating how an intelligence server generates a path rule corresponding to a user input by using a plurality of path rules, according to an embodiment.
Figure 9B:
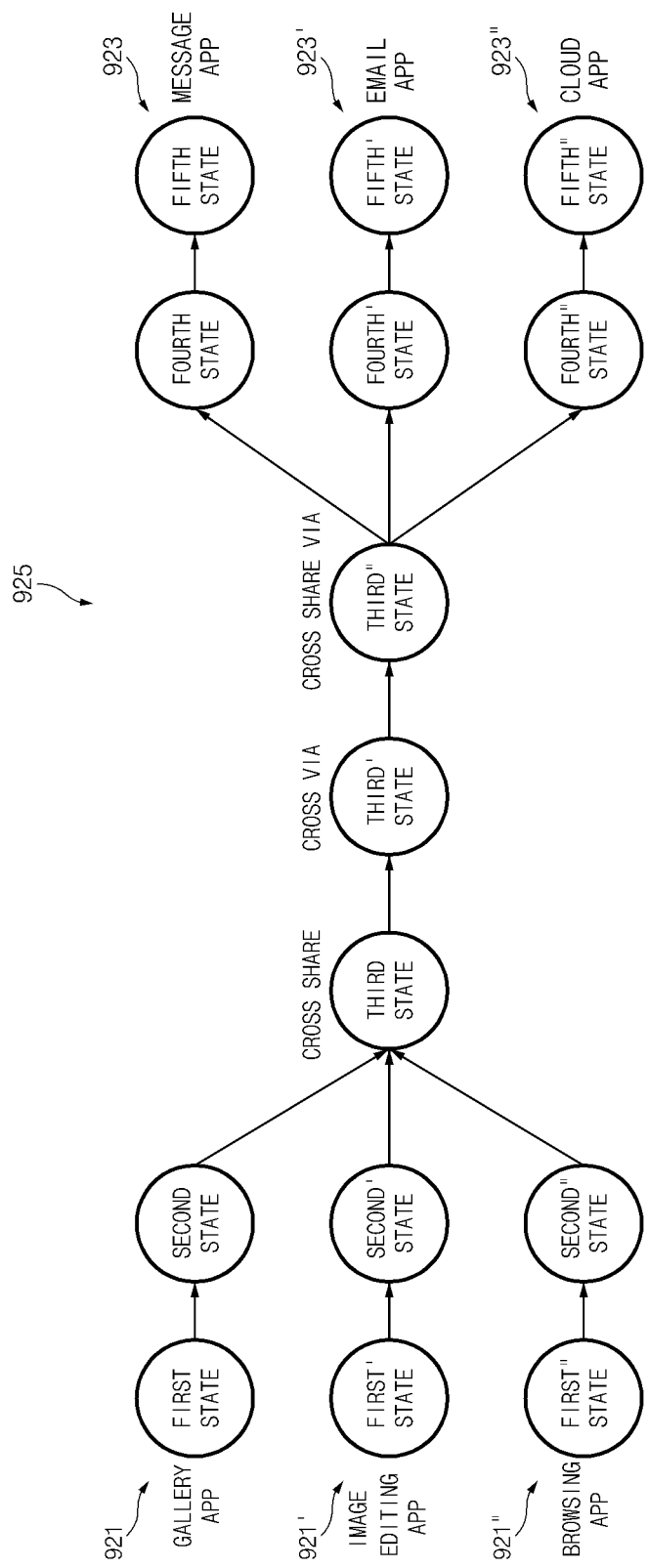
Figure 9C:
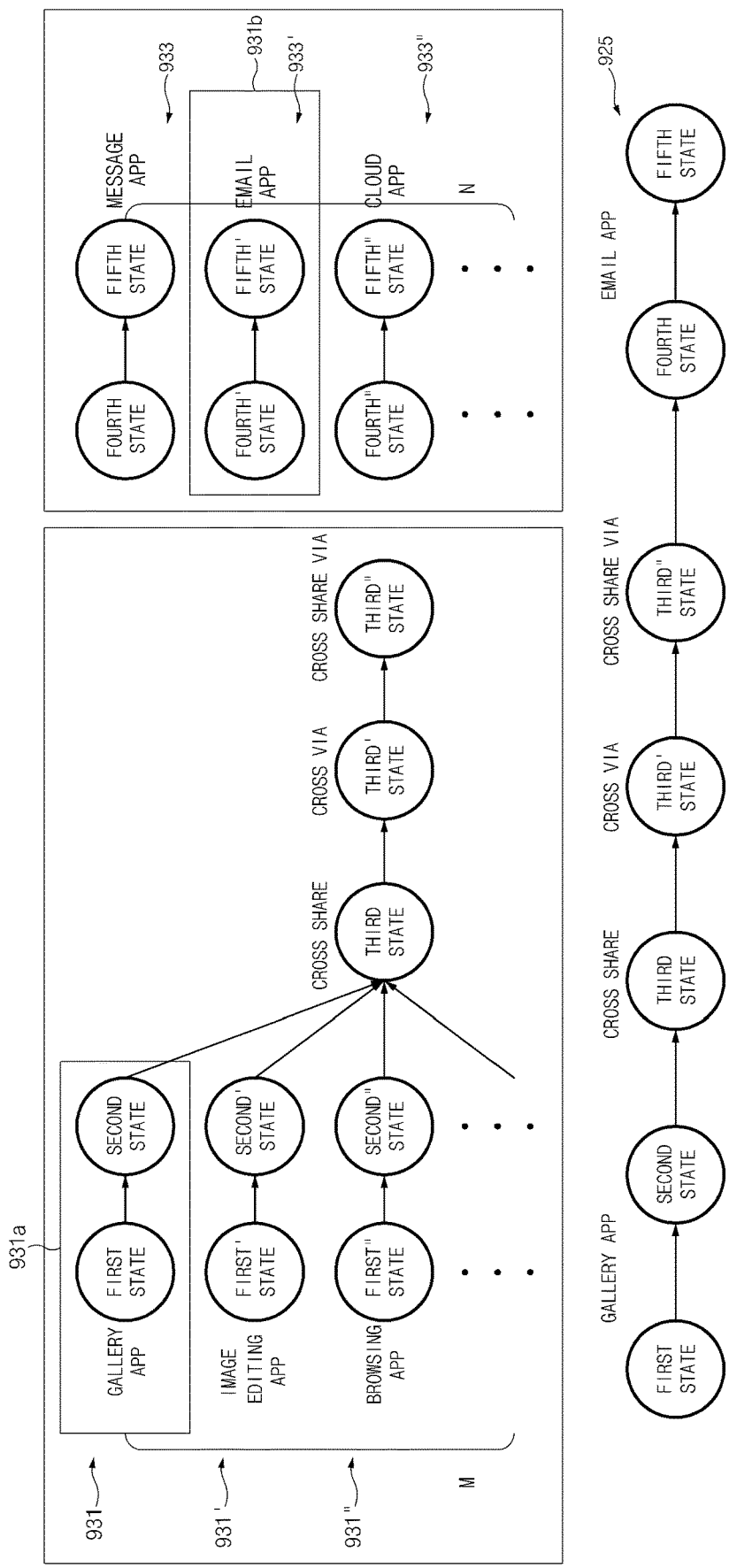

FIGS. 9A, 9B, and 9C are views illustrating how an intelligence server generates a path rule corresponding to a user input by using a plurality of path rules, according to an embodiment.

Referring to FIGS. 9A, 9B, and 9C, the intelligence server 200 (e.g., the NLU module 220) may generate a path rule corresponding to a user input (e.g., user utterance) by using a path rule of an app stored in the database (e.g., the PR DB 231). For example, the intelligence server 200 may select the path rule of the app based on the intent of the user input and a parameter, and may generate a path rule (or full path rule) corresponding to the user input by using the path rule (or partial path rule) of the selected application.

Referring to FIG. 9A, the intelligence server 200 (e.g., the NLU module 220) may generate a full path rule 915 corresponding to the user input by using a path rule combination method. For example, the intelligence server 200 may generate the full path rule 915 corresponding to the user input by using a static combination method of combining a static caller rule 911 and a static callee rule 913. The static caller path rule 911 and the static callee path rule 913 may be a path rule sufficient to perform the operation of the app based on the user input. For example, in the case where the user input is "edit a Hawaii photo", the path rule for selecting the Hawaii image in a gallery app may be the static caller path rule 911, and the path rule for sending the edited image in the image editing app may be the static callee path rule 913. The image editing app may be the only app that performs an image editing function in the user terminal 100. The static caller path rule 911 and the static callee path rule 913 may include information about the operations of different apps (e.g., a gallery app and an image editing app).

According to an embodiment, the intelligence server 200 may separately select the static caller path rule 911 and the static callee path rule 913 that correspond to the user input. For example, the intelligence server 200 may generate a path rule using the static caller path rule 911 and the static callee path rule 913, which include information about operations of different apps (e.g., gallery app and image editing app). For example, the static caller path rule 911 may include the first state and second state of the first app (e.g., a gallery app), and may include a third state (or cross app) for calling a specified app (or a targeted app) (e.g., a second app). The third state may include a first state ID (e.g., CROSS_photoedit_home) for calling the specified app (or second app). The static caller path rule 913 may include a third' state (or cross app) for calling the second app (e.g., an image editing app), and may include a fourth state and a fifth state of the second app. The third' state may include a second state ID (e.g., CROSS_photoedit_home) for calling the second app. The first state ID and the second state ID may be the same as or similar to each other.

According to an embodiment, the intelligence server 200 may generate the full path rule 915 by using the caller path rule 911 and the callee path rule 913 including state IDs that corresponds to each other. For example, the intelligence server 200 may combine a static caller path rule and a static callee path rule by using a tool (e.g., software tool) for combining a caller path rule and a callee path rule. The intelligence server 200 may call the specified app (or second app) without going through a chooser that receives a user input to select the app to be called. For example, the full path rule 915 may include the first state and the second state of the first app, the third state for calling the second app (or cross app), and the fourth state and the fifth state of the second app.

According to an embodiment, the intelligence server 200 may store the generated full path rule 915 in the database (e.g., the PR DB 231). In other words, the intelligence server 200 may train the generated full path rule 915. According to an embodiment, the intelligence server 200 may generate a path rule corresponding to a user input received from the user terminal 100 by using the path rule (or the full path rule 915) stored in the database.

Referring to FIG. 9B, the intelligence server 200 (e.g., the NLU module 220) may generate a full path rule 925 corresponding to the user input by using a path rule combination method. For example, the intelligence server 200 may generate the full path rule 925 corresponding to the user input by using a dynamic combination method of combining a caller rule 921 and a callee rule 923. The dynamic caller path rule 921 and the dynamic callee path rule 923 may be a path rule insufficient to perform the operation of the app based on the user input. For example, in the case where the user input is "share a Hawaii photo with Mom", a path rule that selects a Hawaii image in a gallery app and shares the selected image in an image editing app may be a dynamic caller path rule. In addition, in the case where the user input is "sending a message to Mom", sending the message to Mom by a message app may be a dynamic callee path rule. Dynamic caller path rules 921, 921', and 921" and dynamic callee path rules 923, 923', and 923" may include information about operations of different apps. The dynamic caller paths rules 921, 921', and 921" and the dynamic callee path rules 923, 923', and 923" may be stored in the database (e.g., the PR DB 231).

According to an embodiment, the intelligence server 200 may select the dynamic caller path rules 921, 921', and 921" corresponding to the user input. For example, the first dynamic caller path rule 921 may include the first state and the second state of the first app (e.g., gallery app), and may include a third state (or cross share) for calling a specified app (or a targeted app). As another example, the second dynamic caller path rule 921' may include a first' state, a second' state, and the third state of a second app (e.g., image editing app). In yet another example, the third dynamic caller path rule 921″ may include the first″ state, the second″ state, and the third state of a third app (e.g., browsing app). The third state may include may include a first state ID (e.g., CROSS_share) for calling an app selected based on the user input. The specified app may be an app (or fourth app, fifth app, or sixth app) capable of being selected based on the user input.

According to an embodiment, the intelligence server 200 may select the dynamic callee path rules 923, 923', and 923″ corresponding to the user input. For example, the first dynamic callee path rule 923 may include a third″ state (or cross share via) for calling an app (or fourth app, fifth app, or sixth app) selected based on the user input and may include the fourth state and the fifth state of a fourth app (e.g., message app) capable of being selected based on the user input. As another example, the second dynamic callee path rule 923' may include the third″ state and may include the fourth' state and the fifth' state of a fifth app (e.g., email app) that is capable of being selected based on the user input. In yet another example, the third dynamic callee path rule 923″ may include the third″ state, the fourth″ state, and the fifth″ state of a sixth app (e.g., cloud app) that is capable of being selected based on the user input. The third″ state may include a second state ID (e.g., CROSS_sharevia) to be called from a specified app (or first app, second app, or third app). The specified app may be an app (e.g., first app, second app, or third app) assigned by the second state ID. The intelligence server 200 may receive a user input to select an app to be called through the chooser, and may generate the dynamic caller path rules 923, 923', and 923″ corresponding to an app (fourth app, fifth app, or sixth app) selected based on the user input.

According to an embodiment, the intelligence server 200 may generate a full path rule 925 in all cases capable of being generated based on the user input by using the dynamic caller path rules 921, 921', and 921″ and the dynamic callee path rules 923, 923', and 923″. According to an embodiment, the intelligence server 200 may combine a dynamic callee path rule and a static callee path rule by using a tool for combining a caller path rule and a callee path rule. For the purpose of combing the dynamic callee path rule and the static callee path rule, the tool may interpose a third state ID (e.g., sharevia) between the dynamic callee path rule and the static callee path rule. The full path rule 925 may include states of one selected app among the first state and the second state of the first app, the first' state and the second' state of the second app, and the first″ state and the second″ state of the third app. The full path rule 925 may further include the third state, the third' state, and the third″ state for calling (or cross sharing) an app that is capable of selecting the state of the selected app based on the user input. And the full path rule 925 may futher include states of one selected among the fourth state and the fifth state of the fourth app, the fourth' state and the fifth' state of the fifth app, and the fourth″ state and the fifth″ state of the sixth app.

According to an embodiment, the intelligence server 200 may store the generated full path rule 925 in the database (e.g., the PR DB 231). In other words, the intelligence server 200 may train the generated full path rule 925. According to an embodiment, the intelligence server 200 may generate a path rule corresponding to a user input received from the user terminal 100 by using the path rule (or the full path rule 925) stored in the database.

As such, the intelligence server 200 may generate various path rules (or full path rule) by combining path rules (e.g., caller path rule and callee path rule) corresponding to functions of each of the apps of the user terminal 100, and may generate a path rule corresponding to the user input by using the various path rules.

Referring to FIG. 9C, the intelligence server 200 (e.g., the NLU module 220 and the path planner module 230) may generate a full path rule 935 corresponding to a user input by using a path rule combination method. The intelligence server 200 may separately generate the dynamic caller path rule 921 and the dynamic callee path rule 923.

According to an embodiment, the intelligence server 200 (e.g., the NLU module 220) may select the dynamic caller path rules 931, 931', and 931″ corresponding to the user input. For example, the intelligence server 200 may generate the dynamic caller path rules 931, 931', and 931″ respectively corresponding to a first app (e.g., gallery app), a second app (e.g., image editing app), and a third app (e.g., browsing app). The dynamic caller path rules 931, 931', and 931″ may be similar to the dynamic caller path rules 921, 921', and 921″ of FIG. 9B, respectively. Furthermore, the intelligence server 200 may generate a dynamic caller path rule corresponding to "M" apps including the first app, the second app, and the third app.

According to an embodiment, the intelligence server 200 (e.g., the NLU module 220) may select the dynamic callee path rules 933, 933', and 933″ corresponding to the user input. For example, the intelligence server 200 may generate the dynamic callee path rules 933, 933', and 933″ respectively corresponding to a fourth app (e.g., message app), a fifth app (e.g., email app), and a sixth app (e.g., cloud app). The dynamic callee path rules 933, 933', and 933″ may be similar to the dynamic callee path rules 923, 923', and 923″ of FIG. 9B, respectively. Furthermore, the intelligence server 200 may generate a dynamic callee path rule corresponding to "N" apps including the fourth app, the fifth app, and the sixth app. For another example, even in the case of the same app, the intelligence server 200 may generate a dynamic callee path rule corresponding to the state of another version.

According to an embodiment, the intelligence server 200 may store the generated dynamic caller path rules 931, 931', and 931″ and the generated dynamic callee path rules 933, 933', and 933″ in a database (e.g., the PR DB 231). In other words, the intelligence server 200 may train the generated dynamic caller path rules 931, 931', and 931″ and the dynamic callee path rules 933, 933', and 933″. For example, the intelligence server 200 may store, in the database, the dynamic caller path rules 931, 931', and 931″ and the dynamic callee path rules 933, 933', and 933″, which include information about a parameter (e.g., searchword and recipient) that is necessary for the operation of an app.

According to an embodiment, the intelligence server 200 may generate a path rule corresponding to the user input received from the user terminal 100 by using a path rule (or the dynamic caller path rules 931, 931', and 931″ and the dynamic callee path rules 933, 933', and 933″) stored in the database. For example, the intelligence server 200 (e.g., the NLU module 220) may select a dynamic caller path rule 931a corresponding to a user input. The intelligence server 200 (e.g., the path planner module 230) may select a dynamic callee path rule 933a corresponding to user input. Each of the selected dynamic caller path rule 931a and the selected dynamic callee path rule 933a may be a path rule that is capable of being processed by the user terminal 100. For example, the path rule that is capable of being processed by the user terminal 100 may include information about the operation of an app, the version of which is the same as the version of an app of the user terminal 100. As such, the intelligence server 200 may combine (or in runtime) the selected dynamic caller path rule 931a and the dynamic callee path rule 933a to generate the full path rule 935.

As such, the intelligence server 200 may combine path rules (e.g., caller path rule and callee path rule) corresponding to the functions of an app to generate a path rule (or full path rule) corresponding to a user input, and thus the intelligence server 200 may store a small amount of information in the database, compared with generating the path rule corresponding to the user input by using a path rule (or full path rule) indicating the end-to-end operation that is generated in advance. In other words, when the number of caller path rules and the number of callee path rules respectively are 'M' and 'N', in the case where the intelligence server 200 stores a full path rule, the intelligence server 200 may store path rules corresponding to "M*N*the number of versions" in a database. However, in the case where the intelligence server 200 combines path rules to generate the full path rule, the intelligence server 200 may store only path rules corresponding to "(M+N)*the number of versions" in the database.

According to an embodiment, when generating the path rule corresponding to a user input by using the caller path rule and the callee path rule, the intelligence server 200 may generate a path rule including information about a parameter (or standard parameter) that is transmitted from the caller path rule to the callee path rule. For example, the information about the parameter may include an appname, recipients, and content. The appname may include information about the appname to be called. The recipients may include information about a person who receives the content. The content may include information (e.g., a message or an email body) to be delivered. As such, the intelligence server 200 (e.g., the path planner module 230) may select the callee path rule by using the information of the parameter.

According to another embodiment, the user terminal 100 may select the callee path rule by using the parameter information. For example, the user terminal 100 may receive a caller path rule and the parameter information from the intelligence server 200, and may select the callee path rule stored in the database by using the parameter information to generate a full path rule.

Figure 10A:
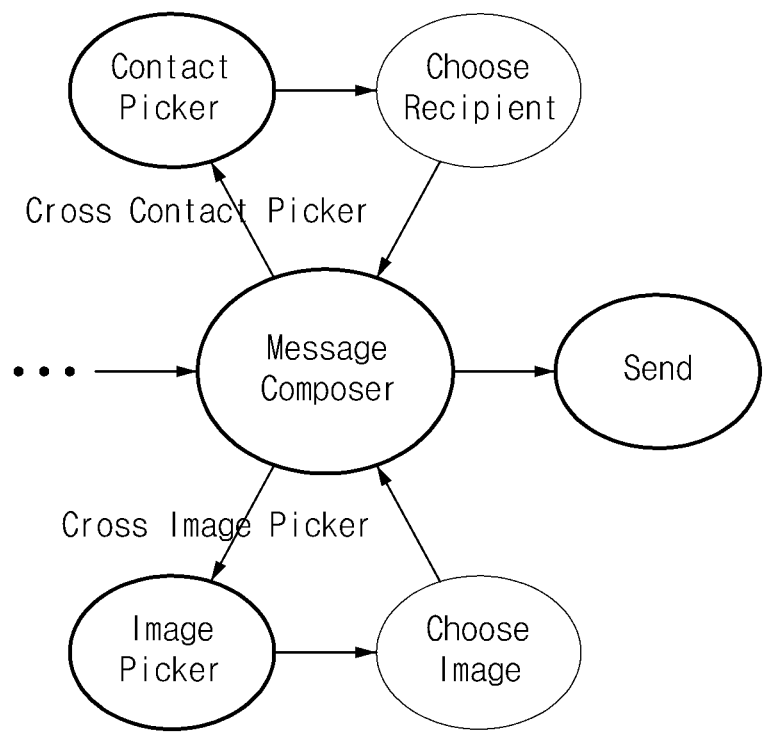
FIG. 10A and FIG. 10B are views illustrating a path rule including a nesting operation generated by an intelligence server, according to an embodiment.
Figure 10B:
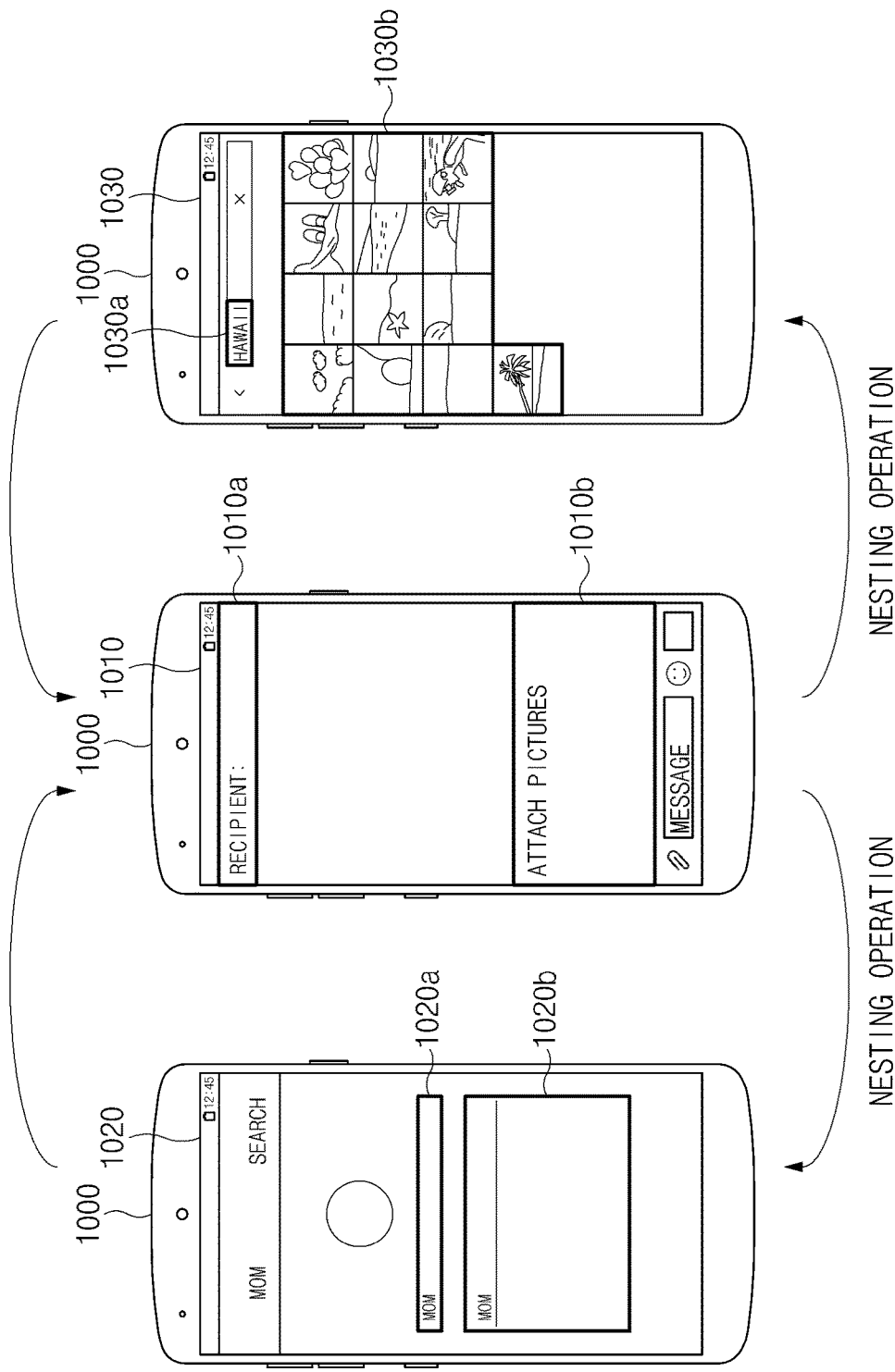

FIGS. 10A and 10B are views illustrating a path rule including a nesting operation generated by an intelligence server, according to an embodiment.

Referring to FIG. 10A, when generating a path rule corresponding to a user input, the intelligence server 200 may generate a path rule including a nesting operation. For example, the nesting operation may be an operation that calls another app in one app and obtains a parameter needed for the operation according to the path rule.

According to an embodiment, the intelligence server 200 may generate a path rule including a state ID corresponding to the user input. For example, the intelligence server 200 may receive a user input saying that "send a Hawaii photo to Mom" and may generate a path rule corresponding to the user input. The intelligence server 200 may generate a path rule including a first state ID (e.g., MessageComposer) of a first app (e.g., message app) for composing a message, a second state ID (e.g., ContactPicker) of a second app (e.g., contact app) that is capable of selecting contacts, a third state ID (e.g., ChooseRecipient) of the second app for selecting contacts, a fourth state ID (e.g., ImagePicker) of a third app (e.g., gallery app) that is capable of selecting an image, a fifth state ID (e.g., ChooseImage) of the third app for selecting an image, and a sixth state ID (e.g., Send) of the first app for sending a message.

According to an embodiment, the intelligence server 200 may sequentially arrange the states of the user terminal 100, including a nesting state, and may generate a path rule. For example, the intelligence server 200 may generate a path rule including a first state (including a first state ID) for composing a message, a second state (including a second state ID) that is capable of selecting contacts, a third state (including a third state ID) for selecting contacts, a fourth state (including a first state ID) where the selected contact is entered, a fifth state (including a fourth state ID) capable of selecting an image, a sixth state (including a fifth state ID) for selecting an image, a seventh state (including a first state ID) where the selected image is attached, and an eighth state (including a sixth state ID) for sending a message. The second state, the third state, the sixth state, and the seventh state for calling the second app or the third app to obtain a parameter may be a nesting state. According to an embodiment, the intelligence server 200 may group the second state and the third state of the second app as one nesting state and may group the sixth state and the seventh state of the third app as one nesting state.

According to an embodiment, the intelligence server 200 may further include a state for performing the nesting operation, in the path rule. For example, the intelligence server 200 may include a state including a state ID (e.g., CrossContactPicker or CrossImagePicker) for calling the second app or the third app, in the path rule. According to an embodiment, after performing the nesting operation, the intelligence server 200 may include a screenless state in the pass rule, as needed, in which the display screen is not displayed in the display 120.

Referring to FIG. 10B, the user terminal 100 may receive the generated path rule from the intelligence server 200 and may execute the operation of an app depending on the path rule.

According to an embodiment, the user terminal 100 may launch a first app (e.g., message app) depending on the path rule. The user terminal 100 may display on the display 120 a message composing screen 1010 of the first app. The message composing screen 1010 may include a portion 1010a for entering a recipient and a portion 1010b for attaching an image.

According to an embodiment, the user terminal 100 may launch a second app (e.g., contact app) depending on the path rule. The user terminal 100 may display on the display 120 a screen 1020 (and a screen for selecting contacts) capable of selecting contacts of the second app. The screen 1020 allows the user of the terminal 100 to select contacts and may include a portion 1020a for entering a name and a portion 1020b for selecting the contacts.

According to an embodiment, the user terminal 100 may launch (or re-launch) the first app depending on the path rule. The user terminal 100 may enter information (e.g., contacts) obtained through the second app, into the portion 1010a for entering the recipient of the message composing screen 1010 of the first app.

According to an embodiment, the user terminal 100 may launch a third app (e.g., gallery app) depending on the path rule. The user terminal 100 may display on the display 120 a screen 1030 for selecting the image of a third app (and a screen for selecting an image). The screen 1030 for selecting the image may include a portion 1030a for entering a searchable word and a portion 1030b for selecting an image.

According to an embodiment, the user terminal 100 may launch (or re-launch) the first app depending on the path rule. The user terminal 100 may enter information (e.g., image) obtained through the third app, into the portion 1010b for attaching an image of the message composing screen 1010 of the first app.

As such, the user terminal 100 may organically use a plurality of apps by performing the nesting operation of calling another app to obtain a parameter necessary for one app. Moreover, the user terminal 100 may verify the processing status of any other called app by receiving a path rule including the nesting state.

Figure 11:
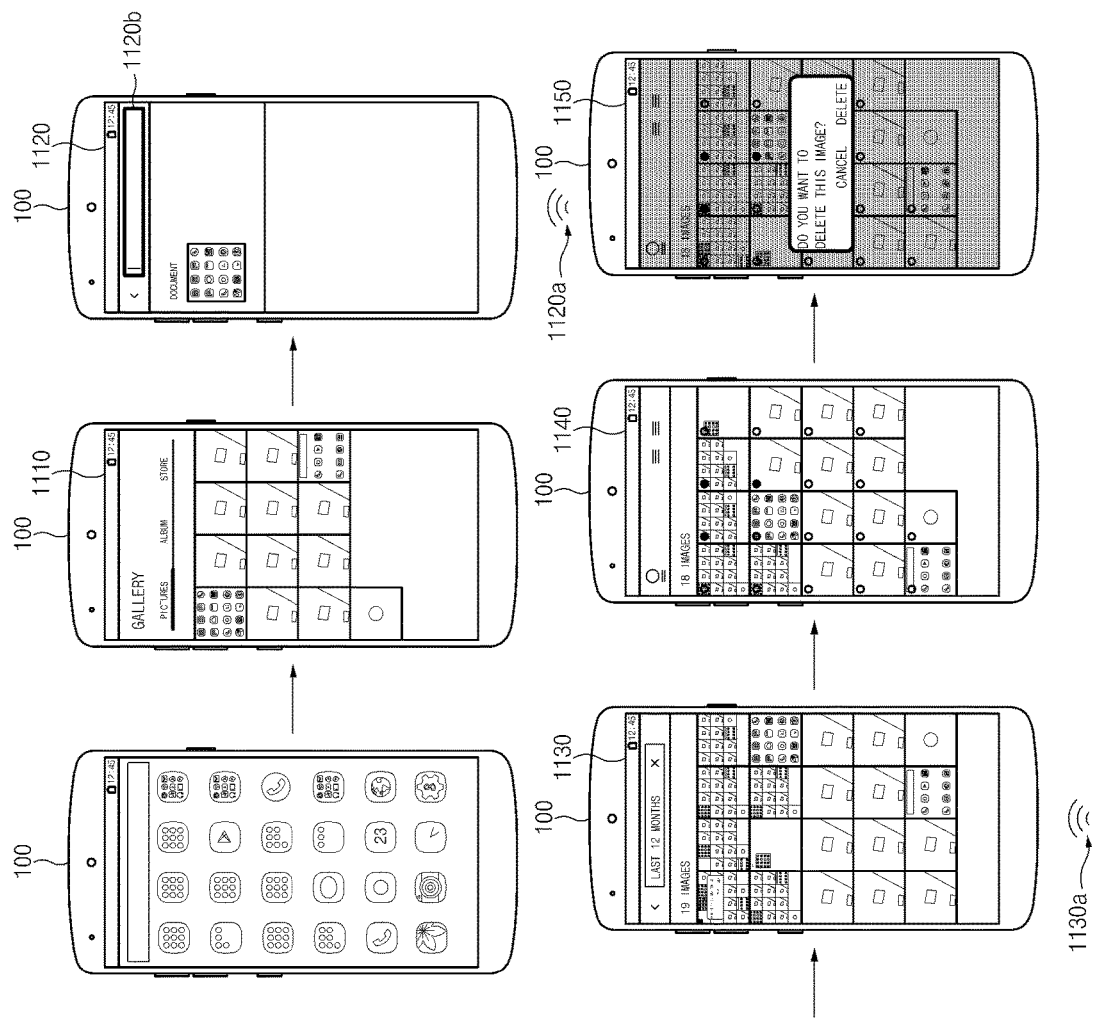
FIG. 11 is a view illustrating how a user terminal receives a user input to additionally put a parameter, according to an embodiment.

FIG. 11 is a view illustrating how a user terminal receives a user input to additionally put a parameter, according to an embodiment.

Referring to FIG. 11, while performing the operation of the app depending on the received path rule, the user terminal 100 may receive the parameter filling utterance from a user. The parameter filling utterance may include a general parameter filling utterance and a targeted parameter filling utterance.

According to an embodiment, while performing the operation of the app depending on the path rule, the user terminal 100 may receive the general parameter filling utterance from the user. The general parameter filling utterance may include an utterance corresponding to a parameter and an utterance corresponding to the operation for entering the parameter. The general parameter filling utterance may be processed in a state (or display screen) where it is possible to enter the parameter. The parameter of the general parameter filling utterance may be extracted by the intelligence server 200 (e.g., the NLU module 220).

For example, the user terminal 100 may receive a user input saying, "delete a photo". The user terminal 100 may receive a path rule including an image view (first state), a search view (second state), a search view result (third state), an image selection (fourth state), and an image deletion (fifth state). The user terminal 100 may sequentially display on the display 120 an image view screen 1110 and a search view screen 1120, which respectively corresponds to the first state and the second state. Because a parameter for searching for the image in the second state is missing from the user utterance, the user terminal 100 may stop executing the operation of the app and may perform landing (or partial landing) in the third state. The user terminal 100 may receive a general parameter filling utterance saying "enter Hawaii into a search keyword" 1130a. The intelligence server 200 may process the parameter filling utterance, may extract 'Hawaii' as a parameter, and may transmit the parameter to the user terminal 100. The user terminal 100 may receive "Hawaii" and may enter "Hawaii" into a search portion 1120b of the search view screen 1120. As such, the user terminal 100 may sequentially display on the display 120 a search view result screen 1130, an image selection screen 1140, and an image deletion screen 1150.

According to another embodiment, while performing the operation of the app depending on the path rule, the user terminal 100 may receive the targeted parameter filling utterance from the user. The targeted parameter filling utterance may include only the utterance corresponding to a parameter. In the case where the user terminal 100 outputs a feedback for putting the specified parameter, the user terminal 100 may receive a targeted parameter filling utterance. The intelligence server 200 (e.g., the NLU module 220) may receive the parameter filling utterance and may transmit the parameter filling utterance changed to text data to the user terminal 100.

For example, the user terminal 100 may receive a user input saying "delete a photo". The user terminal 100 may receive a path rule corresponding to the user input. Since the parameter for searching an image is missing, the user terminal 100 may sequentially display the image view screen 1110 and the search view screen 1120 on the display 120 and may land in a state for searching for the image. The user terminal 100 may output a feedback that says, "What keywords do you want to search for?" to the speaker 230 and may receive the targeted parameter filling utterance 1120a of "Hawaii" from the user. The intelligence server 200 may transmit text data of the parameter filling utterance 1120a to the user terminal 100. The user terminal 100 may enter the text data into the search portion 1120b of the search view screen 1120. As such, the user terminal 100 may sequentially display on the display 120 a search view result screen 1130, an image selection screen 1140, and an image deletion screen 1150. Furthermore, the user terminal 100 may receive a parameter filling utterance in the specified state. For example, the user terminal 100 may receive a user input that says "fill a search window with Hawaii" in a state for searching for an image. As such, the user terminal 100 may fill the search window of the currently displayed image search screen with "Hawaii" on the display 120.

Figure 12:
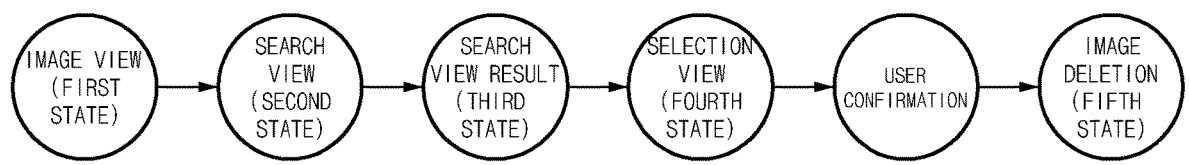
FIG. 12 is a view illustrating how a user terminal receives a user input to execute an operation of an app, according to an embodiment.
Figure 12:
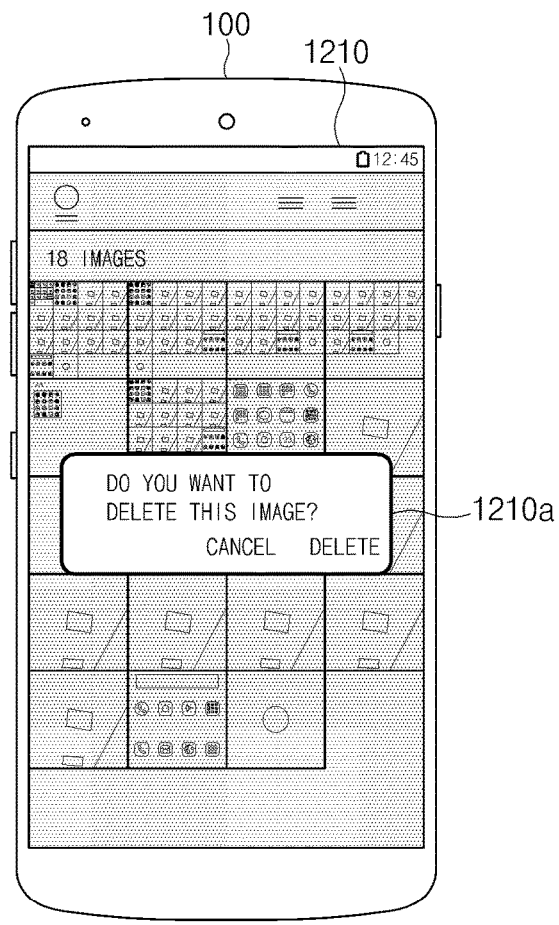

FIG. 12 is a view illustrating how a user terminal receives a user input to execute an operation of an app, according to an embodiment.

Referring to FIG. 12, the user terminal 100 may receive a user input for performing an operation corresponding to a specified state. For example, when performing an operation corresponding to the specified state, the user terminal 100 may receive a user input to verify the execution of the operation. The user terminal 100 may set the user input to the parameter necessary for the operation corresponding to the specified state, may land (or partial landing) in the specified state, and may output a feedback for receiving a user input through the intelligence server 200 (e.g., the NLG module 250). For example, the specified state may be an operation, corresponding to the specified state of deleting, adding, or transmitting information stored in the non-transitory memory 140.

According to an embodiment, the user terminal 100 may receive a path rule including the specified state. For example, the user terminal 100 may receive a user input that says, "delete a Hawaii photo". The user terminal 100 may include an image view (first state), a search view (second state), a search view result (third state), an image selection (fourth state), and an image deletion (fifth state). For example, the fifth state may be a state in which user verification is needed. The state of the user terminal 100 may be sequentially changed to the image view (first state), the search view (second state), the search view result (third state), the image selection (fourth state), and the image deletion (fifth state). Since a parameter is not entered, and because a parameter is necessary when the operation corresponding to the fifth state is performed, the user terminal 100 may perform partial landing in the fifth state and may display the deletion verification pop-up 1210a for receiving the additional input from the user. The deletion verification pop-up 1210a may be displayed on the image deletion screen 1210 corresponding to the fifth state.

According to an embodiment, the intelligence server 200 may receive and process a user input (e.g., utterance input or touch input) received through the deletion verification pop-up 1210a, as a parameter filling utterance. In the case where the intelligence server 200 receives a user input having a positive meaning, the intelligence server 200 may perform an operation of deleting an image; and in the case where the intelligence server 200 receives a user input having a negative meaning, the intelligence server 200 may cancel the operation of deleting an image.

According to an embodiment, when outputting a feedback for receiving a user input in a specified state, for example in the case where the user terminal 100 does not receive the user input during a specified time, the user terminal 100 may terminate a state for receiving the user input. For example, when landing in the specified state, the user terminal 100 may activate the input module 110 (e.g., the microphone 111) during a specified time; and when it does not receive the user's input during the specified time, the user terminal 100 may terminate the state for receiving the user input. In addition, in the case where there is no user information (e.g., context information) about the specified state, the intelligence server 200 may terminate the state for receiving the user input. For example, the specified state may be a state for deleting, adding, or transmitting information stored in the non-transitory memory 140.

Figure 13:
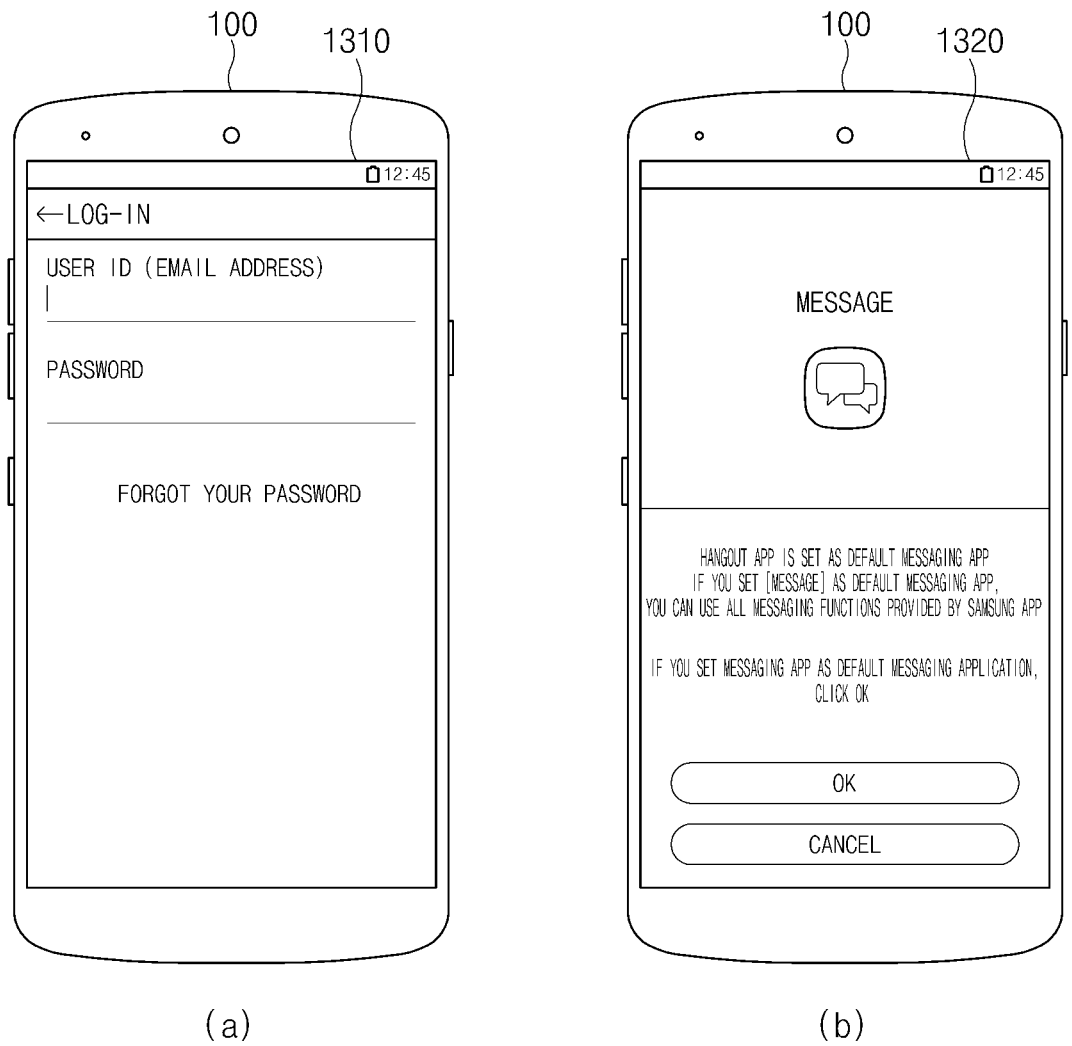
FIG. 13 is a view illustrating how a user terminal displays a pop-up screen in a display, according to an embodiment.

FIG. 13 is a view illustrating how the user terminal 100 displays a pop-up screen in a display, according to an embodiment.

Referring to FIG. 13, when performing an operation of an app based on a path rule, the user terminal 100 may display pop-up screens 1310 and 1320 on display 120 under a specified condition. For example, under the specified condition, the user terminal 100 may display on the display 120 the pop-up screen 1310 for logging-in or the pop-up screen 1320 for setting an app. For example, the specified condition may be a state where a log-in state has expired or a state where setting-up a default app is needed, each of which may be displayed on the display 120 in any state of the user terminal 100. As such, unlike a pop-up for user verification, the intelligence server 200 may not set the pop-up screens 1310 and 1320 that are displayed under the specified condition to parameters that are included in a path rule.

According to an embodiment, the intelligence server 200 may receive a user utterance including an anaphora. For example, the intelligence server 200 may receive a user utterance including "this photo", "that schedule", or "that character". In the case where an object being the target of indication is displayed on the display screen, the intelligence server 200 may receive a user utterance including the anaphora. As such, the intelligence server 200 may process a user utterance including the anaphora, as a follow-up utterance.

According to an embodiment, when processing a user input including the anaphora, the intelligence server 200 (e.g., the NLU module 220) may set the anaphora to a parameter of the specified state. For example, the specified state may be landed and may be the next state of the state including an object to which the anaphora is assigned. The intelligence server 200 may perform the operation corresponding to the specified state by using the object to which the anaphora is assigned.

For example, in a state where a screen for selecting one photo is displayed on the display 120, the intelligence server 200 may receive a user input that says, "send this photo to Mom by using a message". The intelligence server 200 may set a state (e.g., a state for sending a message) corresponding to "send" of the user input to a parameter and may transmit one photo corresponding to "this photo" to a recipient (e.g., Mom).

According to an embodiment, the intelligence server 200 may receive a user utterance including an ordinal number (or cardinal number). For example, the intelligence server 200 may receive a user utterance including "first photo", "second contact", and "last character". In the case where a list is displayed on the display screen, the intelligence server 200 may receive a user utterance including the ordinal number. As such, the intelligence server 200 may process a user utterance including the ordinal number as a follow-up utterance.

According to an embodiment, when processing a user input including the ordinal number, the intelligence server 200 (e.g., the NLU module 220) may set the ordinal number to a parameter of the specified state. The intelligence server 200 may receive the ordinal number value as an integer type (i.e., int type). For example, the specified state may be landing and may be the next state of the state including a list to which the anaphora is assigned. The intelligence server 200 may perform the operation corresponding to the specified state by using the list to which the ordinal number is assigned.

For example, in a state where a screen, on which an image list is displayed on the display 120, the intelligence server 200 may receive a user input that says, "send the first photo to Mom by using a message". The intelligence server 200 may set a state (e.g., a state for sending a message), corresponding to "send" of the user input, to a parameter and may transmit the first photo of the image list corresponding to "the first photo" to a recipient (e.g., Mom).

Figure 14A:
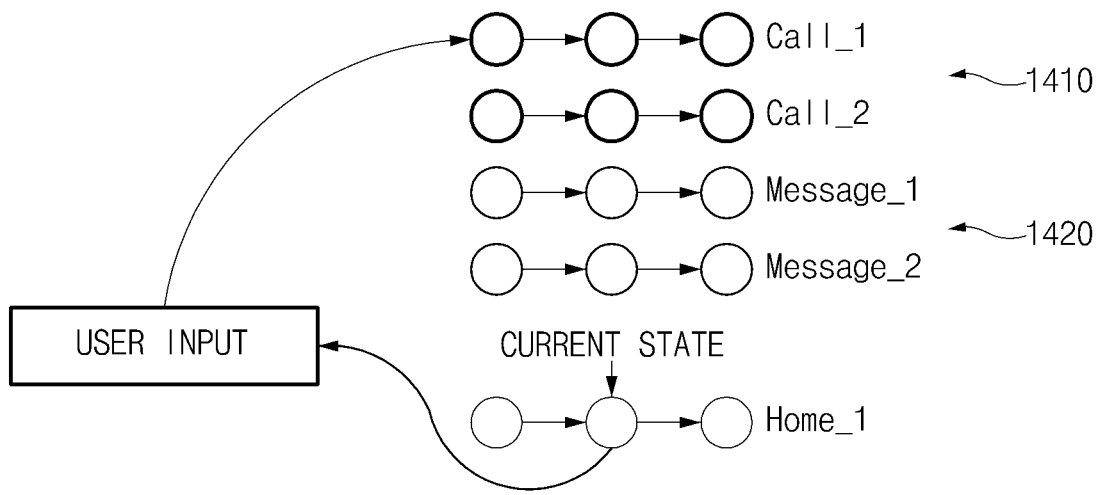
FIG. 14A, FIG. 14B, and FIG. 14C are views illustrating a method in which an intelligence server selects one path rule of a plurality of path rules corresponding to a user input, according to an embodiment.
Figure 14B:
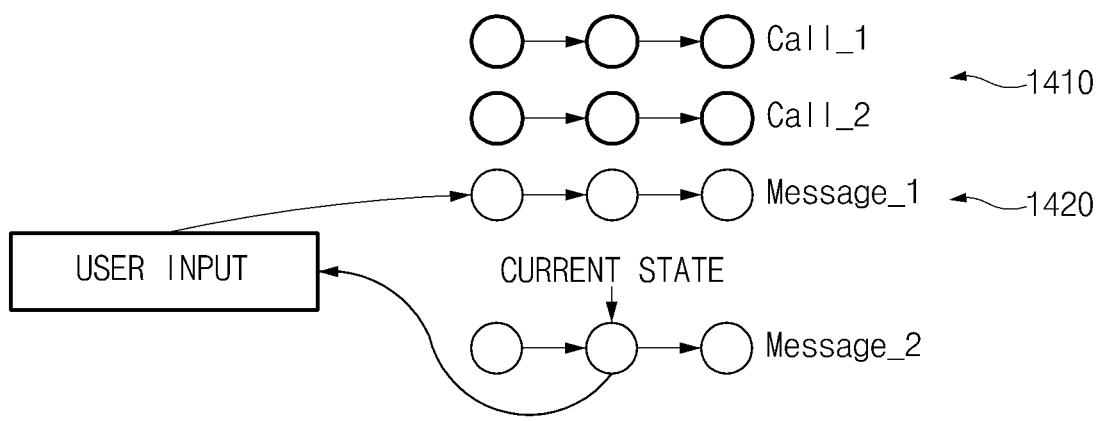
Figure 14C:
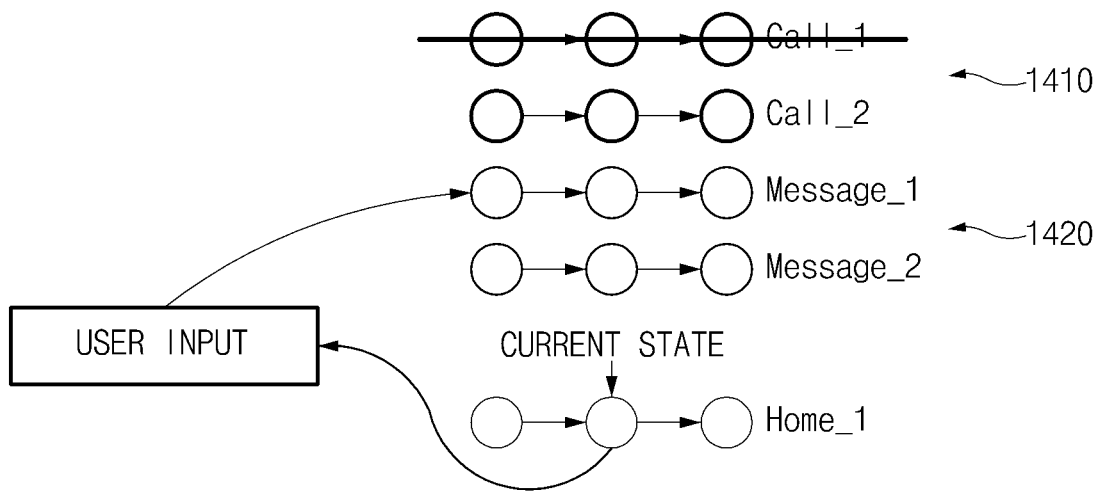

FIGS. 14A, 14B, and 14C are views illustrating a method in which an intelligence server selects one path rule of a plurality of path rules corresponding to a user input, according to an embodiment.

Referring to FIGS. 14A, 14B, and 14C, in the case where a plurality of path rules corresponds to a user input, the intelligence server 200 may select one path rule of the plurality of path rules. For example, the plurality of path rules may be path rules of the same purpose. In other words, the plurality of path rules may be path rules that provides similar results. The intelligence server 200 may transmit the selected one path rule to the user terminal 100.

According to an embodiment, the intelligence server 200 (e.g., the NLU module 220) may select one of the plurality of path rules depending on the priority of a plurality of path rules corresponding to the user utterance. The intelligence server 200 may determine the priority for each of a plurality of path rules stored in the database. For example, the intelligence server 200 may determine the priority between the plurality of path rules of the same purpose (or the same function).

Referring to FIG. 14A, the intelligence server 200 may select a path rule having the highest priority among a plurality of path rules corresponding to a user input and may transmit the path rule to the user terminal 100. The intelligence server 200 may select the path rule having the highest priority regardless of the current state home_1 of the user terminal 100. For example, the intelligence server 200 may receive a user input that says, "block a phone number of XX-XXX-XXXX". The first path rule Call_1 among a plurality of path rules Call_1 and Call_2 of the first app (e.g., telephone app) 1410 may correspond to a user input. In addition, the second path rule Message_1 among the plurality of path rules Message_1 and Message_2 of the second app (e.g., message app) 1420 may correspond to the user input. For example, the first path rule Call_1 may have a higher priority than the second path rule Message_1. As such, the intelligence server 200 may select the first path rule Call_1 among a plurality of path rules (the first path rule Call_1 and the second path rule Message_1). The intelligence server 200 may transmit the selected first path rule Call_1 to the user terminal 100.

Referring to FIG. 14B, the intelligence server 200 may select, based on the current state of the user terminal 100, one path rule among a plurality of path rules corresponding to a user input and may transmit the selected path rule to the user terminal 100. When receiving the user input, the intelligence server 200 may also receive information about the current state of the user terminal 100. For example, in a state where the user terminal 100 performs an operation based on the third path rule Message_2 of the second app 1420, the intelligence server 200 may receive a user input that says, "block a phone number of XX-XXX-XXXX". As such, the intelligence server 200 may select the second path rule Message_1 of the second app 1420 with a low priority (regardless of priority) based on the state where the user terminal 100 is executing the second app 1420. The intelligence server 200 may transmit the selected second path rule Message_1 to the user terminal 100.

Referring to FIG. 14C, the intelligence server 200 may select, based on a path rule that is updated (or added or deleted) in the database (e.g., the PR DB 231), a path rule among a plurality of path rules that has the highest priority and which corresponds to a user input. The selected path rule is transmitted from the intelligence server 200 to the user terminal 100. The intelligence server 200 may receive information about the state (e.g., the installed state of the app or the version of an app) of the user terminal 100 to update the path rule stored in the database. For example, the intelligence server 200 may receive a user input that says, "block a phone number of XX-XXX-XXXX". The intelligence server 200 may delete the first path rule Call_1 of the first app (e.g., phone app) 1410 based on the state of the user terminal 100. As such, the intelligence server 200 may select the second path rule Message_1 of the second app 1420 with the highest priority in the updated database. The intelligence server 200 may transmit the selected second path rule Message_1 to the user terminal 100.

Figure 15:
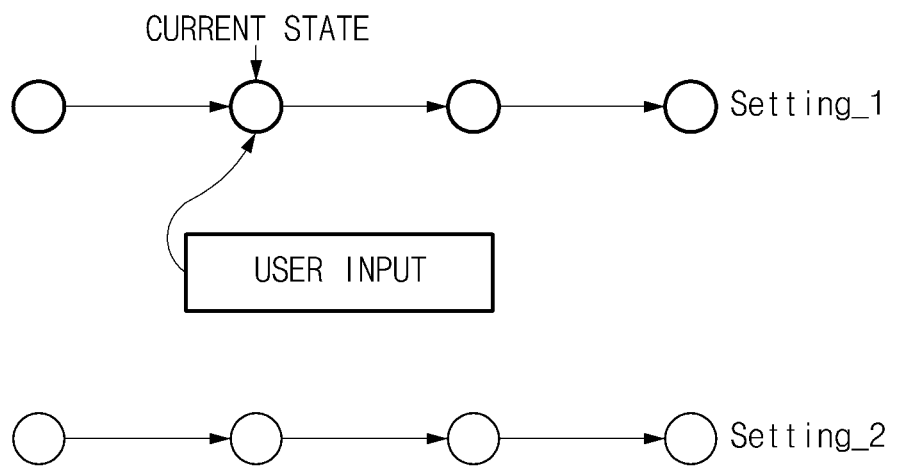
FIG. 15 is a view illustrating a method in which an intelligence server selects one path rule of a plurality of path rules corresponding to a user input, according to an embodiment

FIG. 15 is a view illustrating a method in which an intelligence server selects one path rule of a plurality of path rules corresponding to a user input, according to an embodiment.

Referring to FIG. 15, the intelligence server 200 may select one path rule among a plurality of path rules corresponding to a user input. For example, the plurality of path rules may be path rules of different purposes. The intelligence server 200 may transmit the selected one path rule to the user terminal 100.

According to an embodiment, the intelligence server 200 (e.g., the NLU module 220) may preferentially select a path rule capable of being processed as a follow-up utterance among a plurality of path rules corresponding to the user utterance. The intelligence server 200 may determine whether the user input is capable of being processed as a follow-up utterance based on the current state of the user terminal 100. The user terminal 100 may determine whether the user input is capable of being processed as a follow-up utterance by using the state ID included in the stored (or trained) path rule. For example, the intelligence server 200 may receive the user input that says, "change the vibration intensity". A plurality of path rules Setting_1 and Setting_2 of the first app (e.g., setting app) may correspond to the user input. The representative utterance corresponding to the first path rule Setting_1 may be "change the vibration intensity to 50". The representative utterance corresponding to the second path rule Setting_2 may be "turn on vibration intensity settings". The user terminal 100 may be in a state where the user terminal 100 lands in one state of a plurality of states included in the first path rule Setting_1. As such, the intelligence server 200 may select the first path rule Setting_1 in which the user input is capable of being processed as a follow-up utterance. The intelligence server 200 may transmit the selected first path rule Setting_1 to the user terminal 100.

Figure 16A:
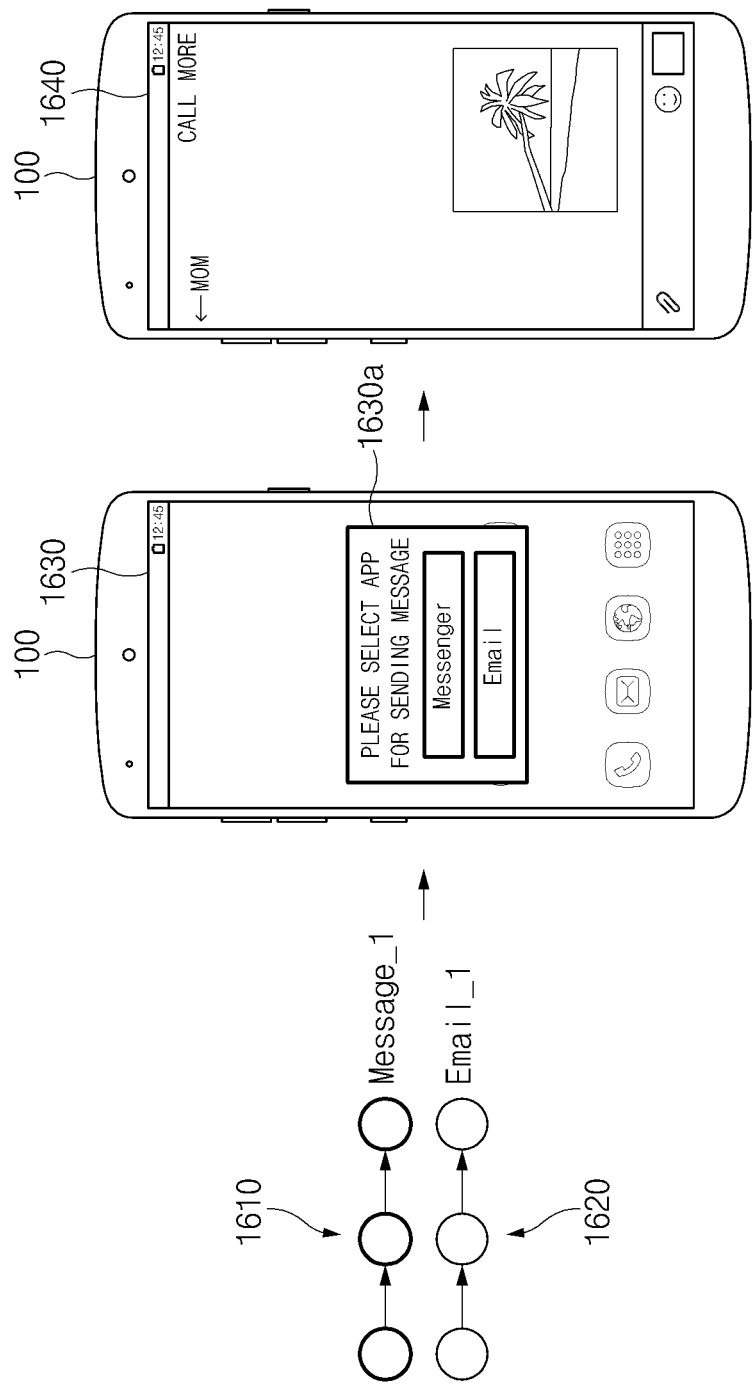
FIG. 16A and FIG. 16B are views illustrating how an intelligence server transmits a plurality of path rules corresponding to a user input to a user terminal, according to an embodiment.
Figure 16B:
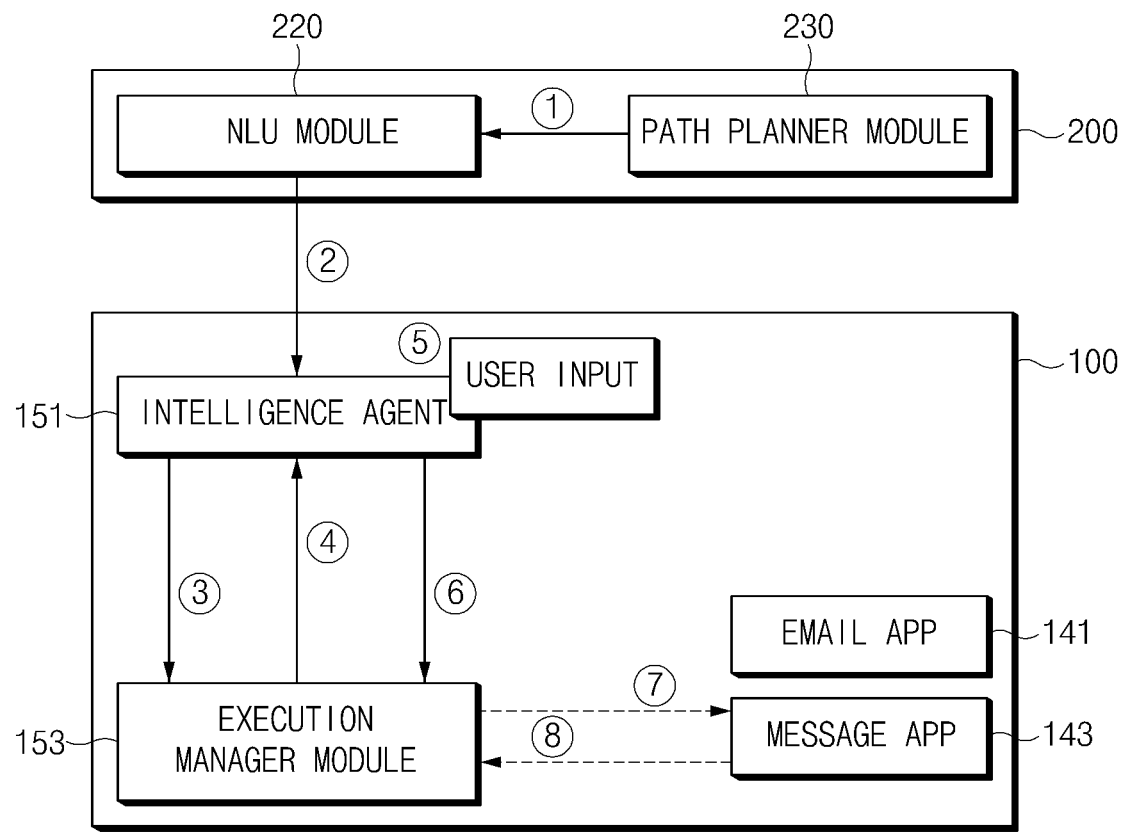

FIGS. 16A and 16B are views illustrating how an intelligence server transmits a plurality of path rules corresponding to a user input to a user terminal, according to an embodiment.

Referring to FIGS. 16A and 16B, the intelligence server 200 may transmit a plurality of path rules corresponding to a user input to the user terminal 100. The user terminal 100 may select one of the plurality of path rules based on the user input.

Referring to FIG. 16A, the intelligence server 200 may generate the plurality of path rules corresponding to the user input to transmit the plurality of path rules to the user terminal 100. For example, the intelligence server 200 may receive the user input "send a Hawaii photo to Mom". The first path rule of the first app (e.g., message app) 1610 and the second path rule of the second app 1620 (e.g., email app) 1611 may correspond to the user input. The intelligence server 200 may transmit the first path rule Message_1 and the second path rule Email_1 to the user terminal 100. According to an embodiment, the user terminal 100 may output a feedback for receiving a user input to select one path rule among a plurality of path rules. For example, the user terminal 100 may display a pop-up 1630a on a display screen indicating a plurality of appnames respectively corresponding to the plurality of path rules. The user terminal 100 may receive a user input (e.g., utterance input or touch input) to select one app (e.g., message app) of the plurality of apps. As such, the user terminal 100 may display the image transmission screen 1640 corresponding to the operation of the first app (e.g., message app) on the display based on a path rule (e.g., first path rule Message_1) selected by the user input.

According to an embodiment, the intelligence server 200 (e.g., the NLU module 220) may be used as a plurality of path rules that corresponds to a specified user input by using a specified plurality of path rules. In other words, the intelligence server 200 may predefine a plurality of path rules that correspond to the specified user input. For example, the plurality of path rules may be stored in a database (e.g., the PR DB 231). According to an embodiment, the intelligence server 200 may select a plurality of path rules corresponding to the same user input among the plurality of path rules stored in the database. In other words, the intelligence server 200 may systematically extract the plurality of path rules corresponding to the same user input from the database.

Referring to FIG. 16B, the NLU module 220 of the intelligence server 200 may receive a plurality of path rules (e.g., first path rule Message_1 and second path rule Email_1) that corresponds to a user input from the path planner module 230 (①). The NLU module 220 may transmit the plurality of path rules to the user terminal 100 (②). According to an embodiment, the intelligence agent 151 of the user terminal 100 may receive the plurality of path rules and may forward a request to the execution manager module 153 (③) for obtaining information (e.g., appname) of the app that corresponds to the plurality of path rules. The execution manager module 153 may forward a response including the information (e.g., Message and Email) of an app that corresponds to the plurality of path rules to the intelligence agent 151 (④). The intelligence agent 151 may display information about a plurality of apps corresponding to the plurality of path rules on a display screen and may receive a user input to select one (e.g., message app) of the plurality of path rules (⑤). The intelligence agent 151 may forward the appname (e.g., Message) corresponding to the selected path rule to the execution manager module 153 (⑥). According to an embodiment, the execution manager module 153 may transmit a request to the message app 143 among the plurality of apps 141 and 143 (⑦) for performing the operation based on the selected path rule, and may receive information about the fact that the execution of the operation has been completed from the message app 143 (⑧).

Figure 17A:
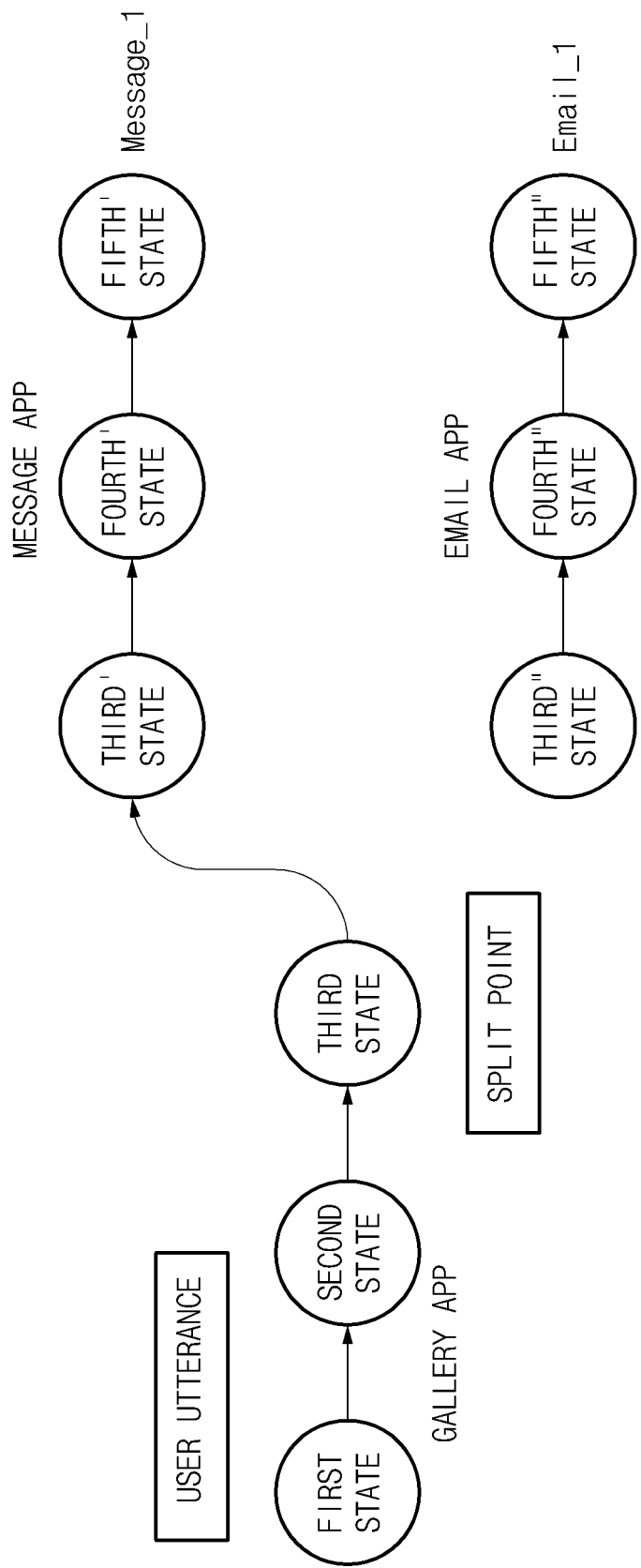
FIG. 17A and FIG. 17B are views illustrating how an intelligence server selects one path rule among a plurality of path rules by using context information of an app, according to an embodiment.
Figure 17B:
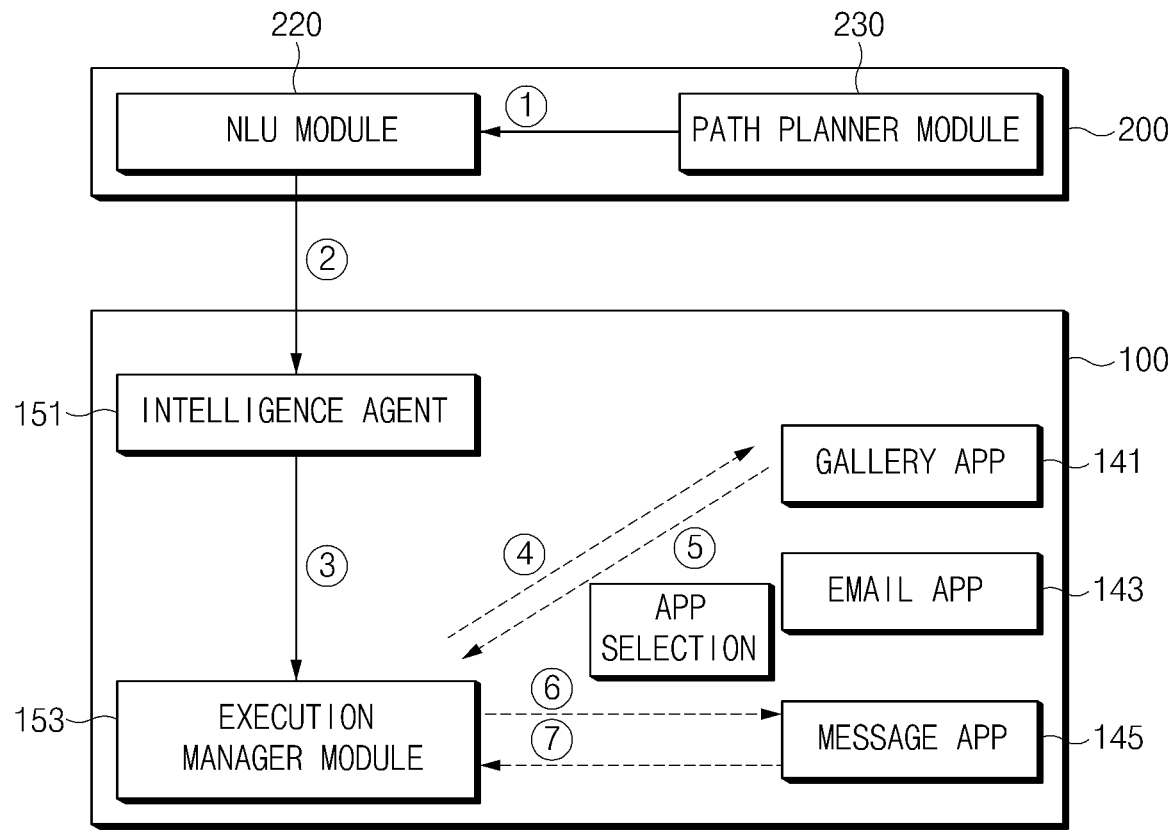

FIGS. 17A and 17B are views illustrating how an intelligence server selects one path rule among a plurality of path rules by using context information of an app, according to an embodiment.

Referring to FIGS. 17A and 17B, the intelligence server 200 may transmit a plurality of path rules corresponding to a user input to the user terminal 100. The user terminal 100 may select one of the plurality of path rules by using context information.

Referring to FIG. 17A, the intelligence server 200 may generate a plurality of path rules that corresponds to the user input. The intelligence server 200 may generate the plurality of path rules including a state split point. The plurality of path rules may be split from the path rule of one app to the path rules of a plurality of other apps. In other words, the plurality of path rules may include a common path rule of the one app. Furthermore, the plurality of path rules may include a split state in the split point. For example, the intelligence server 200 may receive a user input that says, "send a Hawaii photo to Mom". The intelligence server 200 may generate a plurality of path rules connected to the path rule Message_1 (e.g., third' state, fourth' state, and fifth' state) of a second app (e.g., message app) or the path rule Email_1 (e.g., third" state, fourth" state and fifth" state) of a third app (e.g., email app) by splitting the path rule (e.g., first state and second state) of a first app (e.g., gallery app). The plurality of path rules may include the common path rule of the first app. Moreover, the plurality of path rules may include a split state (third state) at a split point at which the path rule of the first app is split to the path rule Message_1 of the second app or the path rule Email_1 of the third app. According to an embodiment, the user terminal 100 may receive the plurality of path rules. The user terminal 100 may select one of the plurality of path rules by using context information of an app. For example, the user terminal 100 may select one of the plurality of path rules so as to perform an operation corresponding to the state of the first app and to perform an operation corresponding to the state of the second app, in consideration of context information (e.g., the type or capacity of an image) of the app in the split state.

Referring to FIG. 17B, the NLU module 220 of the intelligence server 200 may receive the plurality of path rules (e.g., path rules connected to the path rule Message_1 of the second app or third app path rule Email_1 by splitting the path rule of the first app) that corresponds to the user input from the path planner module 230 (①). The NLU module 220 may transmit the plurality of path rules to the user terminal 100 (②). According to an embodiment, the intelligence agent 151 of the user terminal 100 may receive the plurality of path rules and may forward the plurality of path rules to the execution manager module 153 (③). According to an embodiment, the execution manager module 153 may transmit a request to the gallery app 141 (④) for performing an operation based on the common path rule of an app among the plurality of path rules. The execution manager module 153 may receive information from the gallery app 141 about the fact that the execution of the operation has been completed and may select one app among the plurality of apps 143 and 145 that is capable of being executed based on the execution result of the operation (⑤). The execution manager module 153 may transmit a request to the message app 145 for performing an operation based on the path rule of the selected app (e.g., the message app 145) and may receive information from the message app 145 (⑥) about the fact that the execution of the operation has been completed.

Figure 18A:
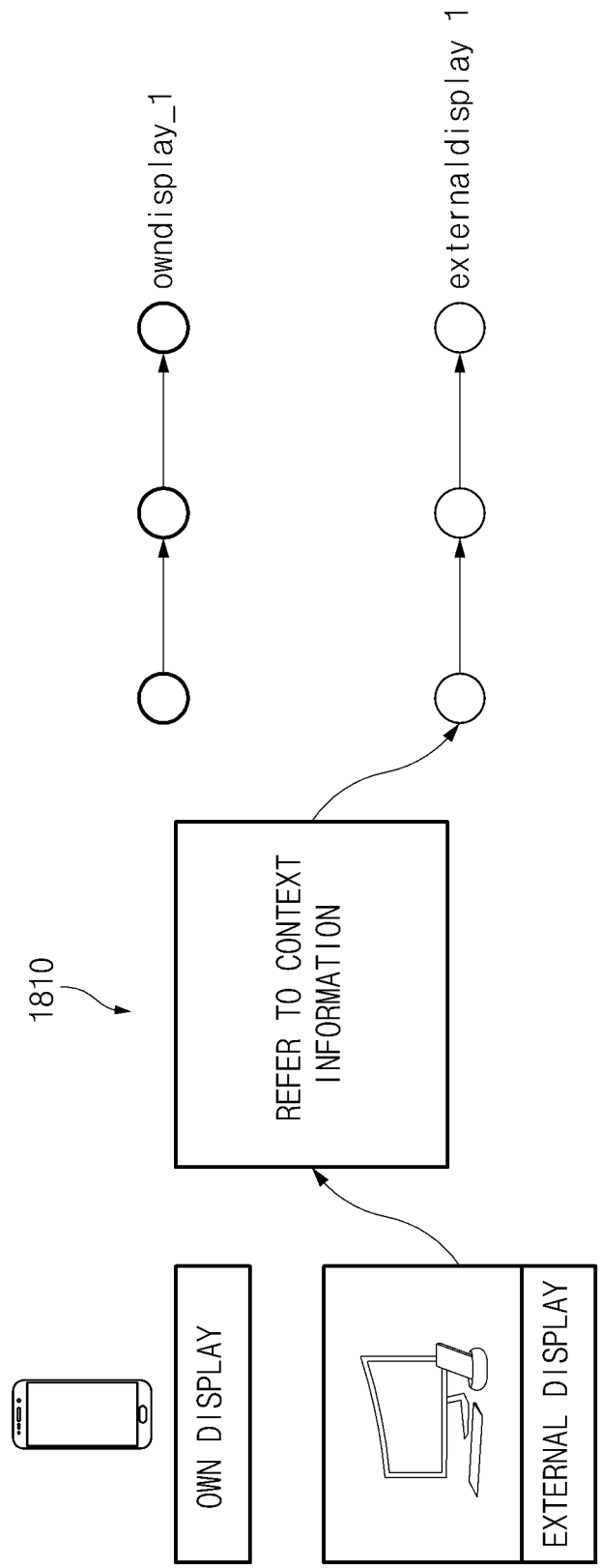
FIG. 18A and FIG. 18B are views illustrating how an intelligence server selects one path rule among a plurality of path rules by using context information of a user terminal, according to an embodiment.
Figure 18B:
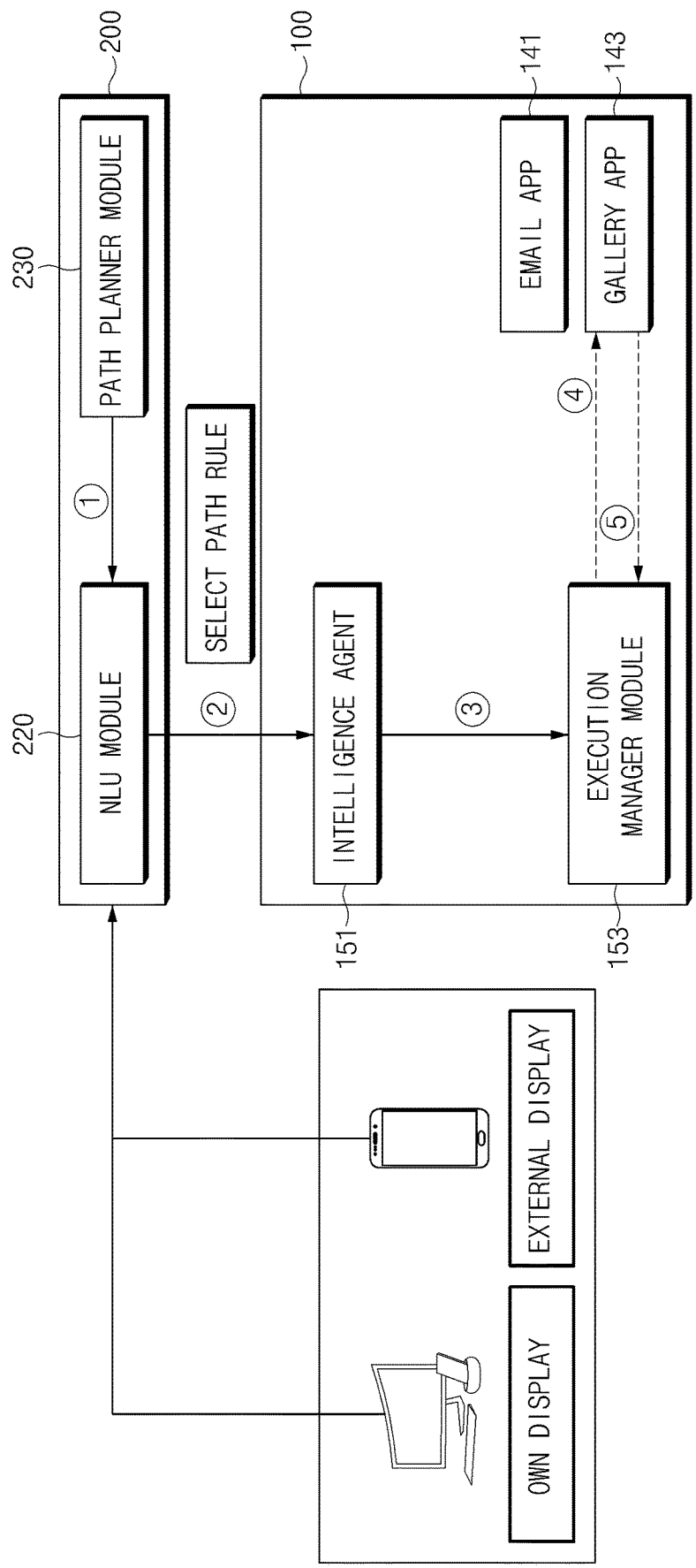

FIGS. 18A and 18B are views illustrating how an intelligence server selects one path rule among a plurality of path rules by using context information of a user terminal, according to an embodiment.

Referring to FIGS. 18A and 18B, the intelligence server 200 may select one path rule among a plurality of path rules that corresponds to a user input by using context information of the user terminal 100. The intelligence server 200 may transmit the selected one path rule to the user terminal 100.

Referring to FIG. 18A, the intelligence server 200 may generate a plurality of path rules that corresponds to the user input and may select one path rule among the generated plurality of path rules by using the context information (e.g., state information of the user terminal 100) of the user terminal 100. The context information of the user terminal 100 may be received from the user terminal 100 together with the user input. For example, the intelligence server 200 may receive a user input that says, "show a Hawaii photo". The intelligence server 200 may generate a plurality of path rules (e.g., owndisplay_1 and externaldisplay_1) corresponding to the user input. The intelligence server 200 may receive the context information of the user terminal 100 connected to an external display together with the user input. As such, the intelligence server 200 may select a path rule (e.g., externaldisplay_1) in a state connected to the external display based on the context information. The intelligence server 200 may transmit the selected second path rule (e.g., externaldisplay_1) to the user terminal 100.

Referring to FIG. 18B, the NLU module 220 of the intelligence server 200 may receive a plurality of path rules (e.g., first path rule owndisplay_1 and second path rule externaldisplay_1) that corresponds to the user input from the path planner module 230 (①). The NLU module 220 may select one path rule (e.g., second path rule externaldisplay_1) among the plurality of path rules based on context information (e.g., a state connected to the external display) received from the user terminal 100 and may transmit the selected one path rule to the user terminal 100 (②). According to an embodiment, the intelligence agent 151 of the user terminal 100 may receive the path rule and may forward the path rule to the execution manager module 153 (③). The execution manager module 153 may transmit a request to the gallery app 143 (④) for performing the operation based on the path rule, and may receive information from the gallery app 143 (⑤) about the fact that the execution of the operation has been completed.

Figure 19A:
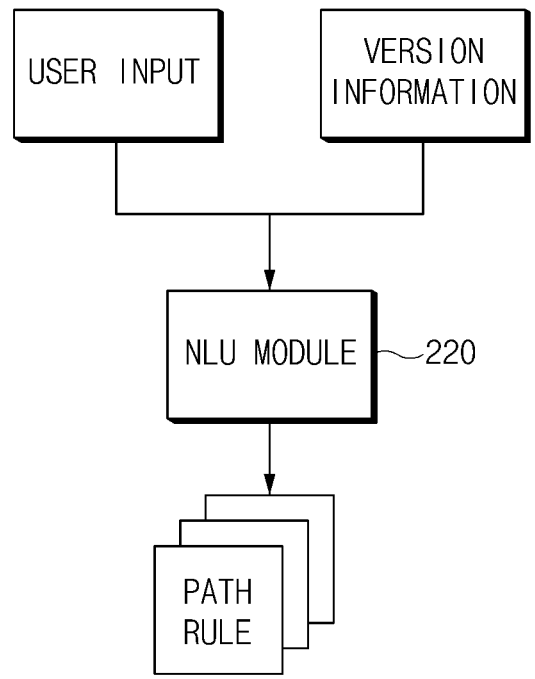
FIG. 19A, FIG. 19B, and FIG. 19C are views illustrating how an intelligence server generates a path rule by using state information of a user terminal, according to an embodiment.
Figure 19B:
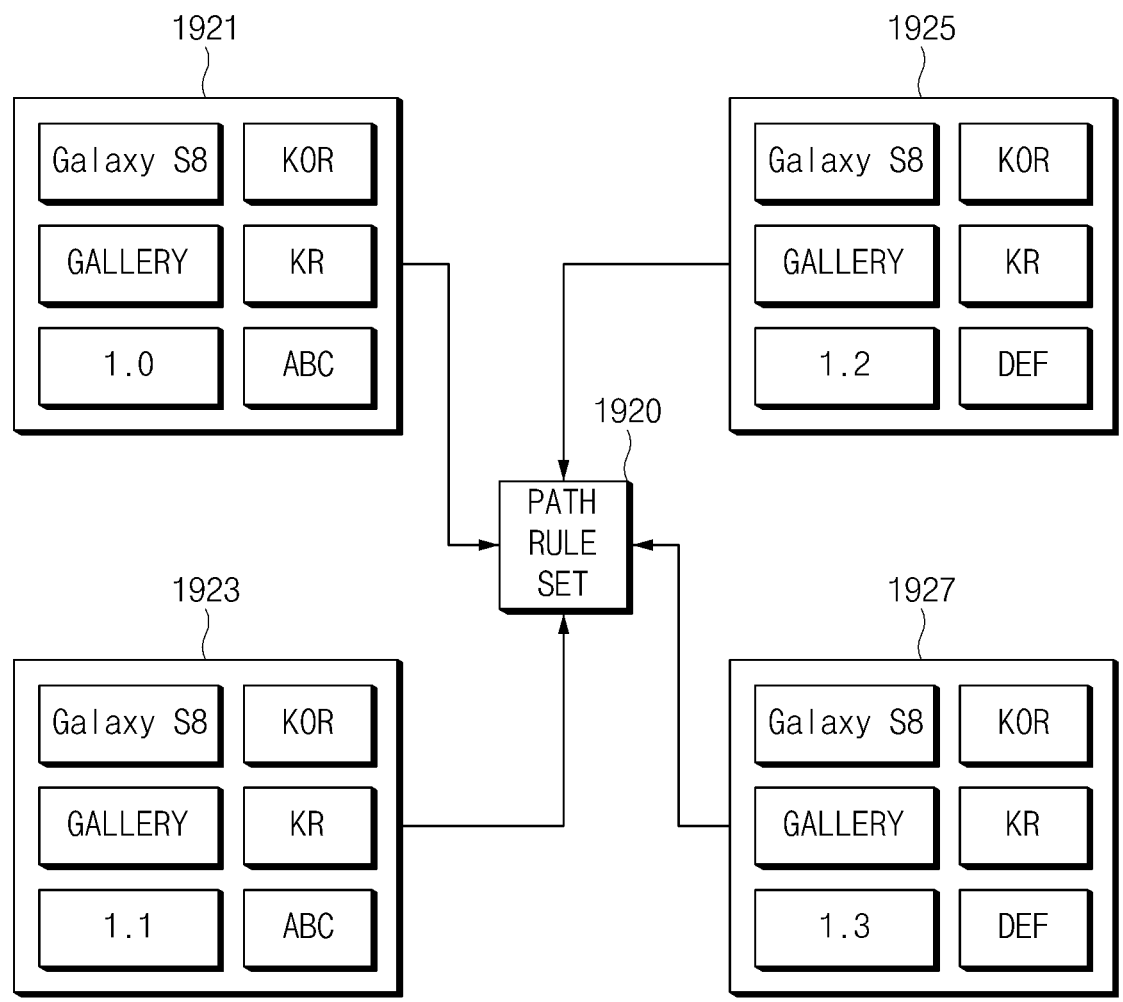
Figure 19C:
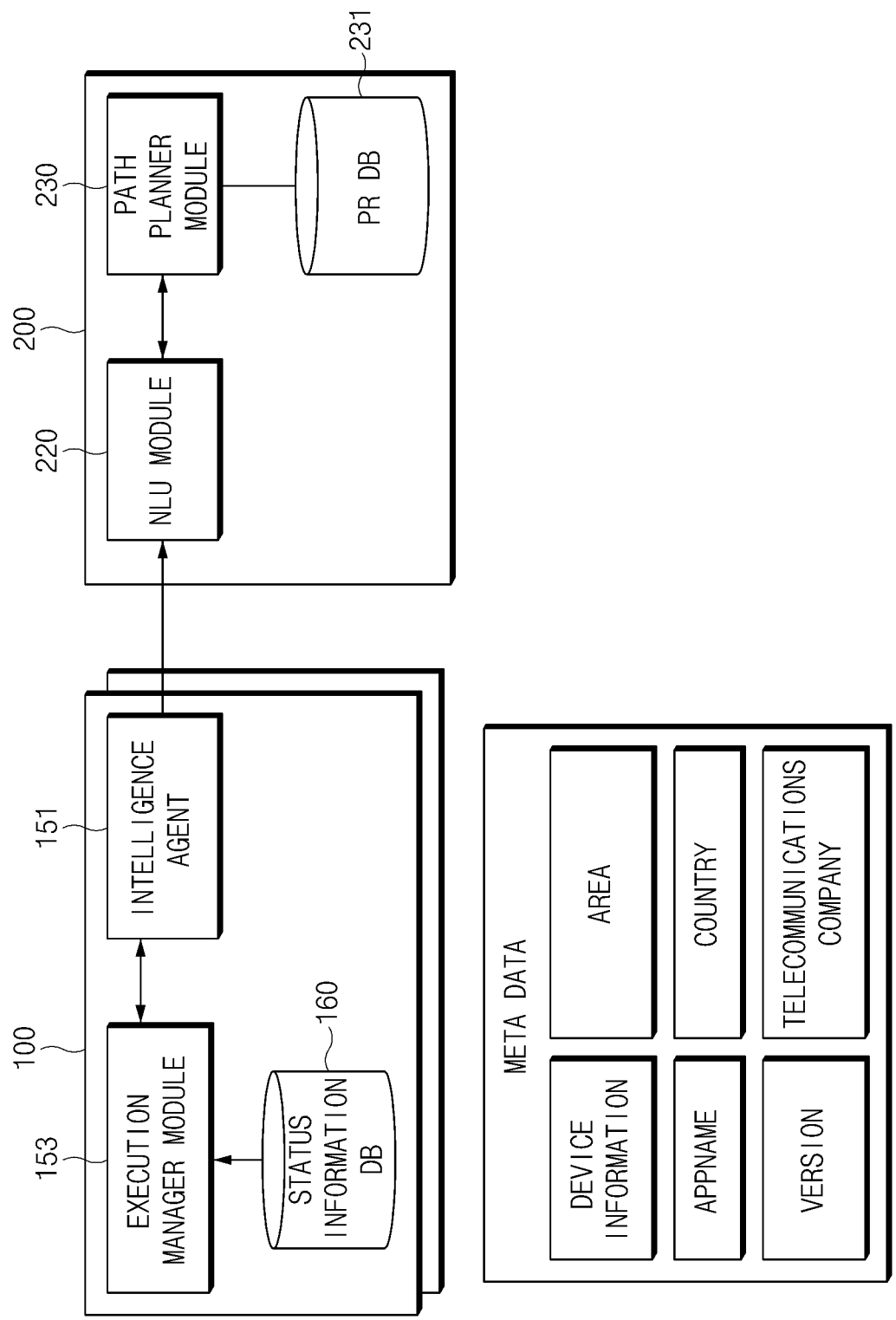

FIGS. 19A, 19B, and 19C are views illustrating how an intelligence server generates a path rule by using state information of a user terminal, according to an embodiment.

Referring to FIGS. 19A, 19B, and 19C, the intelligence server 200 may generate a path rule corresponding to a user input by using state information of the user terminal 100.

Referring to FIG. 19A, the intelligence server 200 (e.g., the NLU module 220) may generate the path rule that corresponds to the user input (or user utterance) and the state information of the user terminal 100. For example, the intelligence server 200 may determine the path rule that corresponds to the user input from a path rule set that corresponds to the state information (e.g., meta data) of the user terminal 100. For example, the state information of the user terminal 100 may include information about at least one of the type of the device, the installed app, the version of an app, an area where a device is being used, a country where a device is set, and a telecommunications company. In an embodiment, the intelligence server 200 may select a path rule based on the version of the app that is installed in the user terminal 100 and transmit the selected path rule to the user terminal 100 and may not transmit a path rule that does not match the version of the app. The selected path rule may be a path rule that matches the intent of a user input and a parameter among a path rule set corresponding to the version of the app installed in the user terminal 100. The intelligence server 200 may receive a feedback associated with the selected path rule from a user.

For example, the intelligence server 200 may receive user input that says, "rotate the Hawaii photo rightward" and the state information of the user terminal 100 in which the gallery app of version 1.0 is installed. The intelligence server 200 may obtain a path rule set corresponding to the gallery app of the version 1.0 from a database (e.g., the PR DB 231). For example, the gallery app of the version 1.0 may not include an image editing function. As such, the intelligence server 200 may select a path rule, which edits an image selected from the gallery app in the image editing app, from the path rule set. As another example, the intelligence server 200 may receive the same user input and the state information of the user terminal 100 in which a gallery app of version 1.1 is installed. The intelligence server 200 may obtain a path rule set that corresponds to the gallery app of version 1.1 from a database (e.g., the PR DB 231). For example, the gallery app of version 1.1 may include a simple image editing function (e.g., image rotation function). As such, the intelligence server 200 may select a path rule, which edits an image selected from the gallery app, from the path rule set without calling an image editing app.

Referring to FIG. 19B, the intelligence server 200 may map different state information of the user terminal 100 to one path rule set. For example, the intelligence server 200 may determine a path rule corresponding to a user input by using the same path rule set 1920 with respect to first state information 1921 (e.g., Galaxy S8 device, gallery app, 1.0 version, KOR area use, KR settings, and ABC telecommunications company), second state information 1923 (e.g., Galaxy S8 device, gallery app, 1.1 version, KOR area use, KR settings, and ABC telecommunications company), third state information 1925 (e.g., Galaxy S8 device, gallery app, 1.2 version, KOR area use, KR settings, and DEF telecommunications company), and fourth state information 1927 (e.g., Galaxy S8 device, gallery app, 1.3 version, KOR area use, KR settings, and DEF telecommunications company) of the user terminal 100.

For example, even though telecommunications companies (e.g., ABC and DEF) are different from each other, the user terminal 100 may provide the same user of the same device (e.g., Galaxy S8) with the same service. As another example, even though the devices (e.g., Galaxy S7 and Galaxy S8) are different from each other, the same app (e.g., gallery app) may be installed in the user terminal 100. As such, in the case where the user terminal 100, of which the telecommunications company or the type is different, receives a user input that says, "view a Hawaii photo", the user terminal 100 may select a path rule by using the same path rule set.

Referring to FIG. 19C, when the state information of the user terminal 100 is updated, the intelligence server 200 may update the state information in a database (e.g., the PR DB 231). For example, the execution manager module 153 of the user terminal 100 may transmit the updated state information of a state information database 160 to the intelligence agent 151. In the case where the intelligence server 200 is capable of receiving the state information of the user terminal 100 (or in the case where the intelligence server 200 opens a session), the intelligence agent 151 may transmit the updated state information to the intelligence server 200. The NLU module 220 of the intelligence server 200 may receive the updated state information and may update the state information of the user terminal 100 through the path planner module 230. As such, even though not receiving the state information from the user terminal 100, the intelligence server 200 may generate the path rule corresponding to the user input by using the state information of the user terminal 100 stored in the database (e.g., the PR DB 231).

Figure 20:
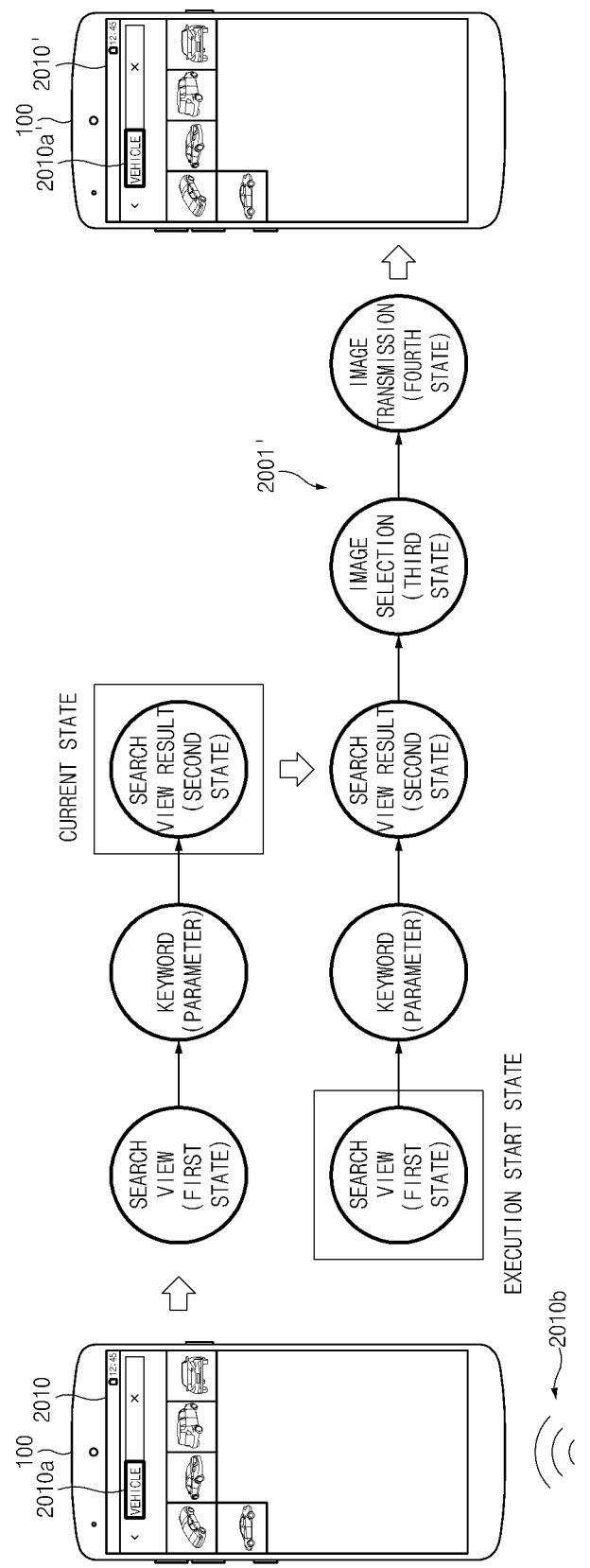
FIG. 20 is a view illustrating a method in which an intelligence server processes a user input capable of being processed as a follow-up utterance, according to an embodiment.

FIG. 20 is a view illustrating a method in which the intelligence server 200 processes a user input capable of being processed as a follow-up utterance, according to an embodiment.

Referring to FIG. 20, when having received a user input that is capable of being processed as a follow-up utterance, the intelligence server 200 may process the user input in consideration of the previous state of the user terminal 100.

According to an embodiment, the user terminal 100 may receive the user input. For example, the user terminal 100 may perform an operation based on a first path rule 2001 corresponding to the user input that says "searching for a Hawaii photo" to display a result screen 2010 on the display 120 for searching for a Hawaii 2010a. In a state where the user terminal 100 displays the result screen 2010 for searching for the Hawaii 2010a of a gallery app on the display 120, the user terminal 100 may receive a user input 2010b that says "search for a vehicle photo to send the found result to Mom". For example, the intelligence server 200 may process a user input as a root utterance in consideration of the current state (e.g., a state where the result screen for searching for a Hawaii image is displayed on the display 120) of the user terminal 100 without processing the user input 2010b as a follow-up utterance (e.g., "send the found image to Mom"). In other words, the intelligence server 200 may perform an operation corresponding to a first state (e.g., search view) included in a path rule that corresponds to a user utterance. For another example, even though processing the user input as the follow-up utterance, the intelligence server 200 may perform an operation from a state before the current state in consideration of the current state of the user terminal 100. The intelligence server 200 may set a state for performing an operation based on the parameter of the user terminal. As such, the intelligence server 200 may correctly process the user input 2010b based on the intent of a user.

According to various embodiments of the present disclosure described with reference to FIGS. 1 to 20, the user terminal 100 may generate, through the intelligence server 200, a path rule in which the states of a user terminal are arranged and may perform the operation of an app based on the path rule to provide a service. Thus, the user terminal 100 may provide a user with the processing status of a user utterance of the user terminal 100 and may receive an additional user input in a procedure of processing the user utterance to enter the additional information or to change the processing operation. In particular, when a keyword (or parameter) required to process the user utterance is insufficient, the user terminal 100 may notify the user that information is needed and may output a feedback corresponding to the insufficient state to receive necessary information from a user.

Figure 21:
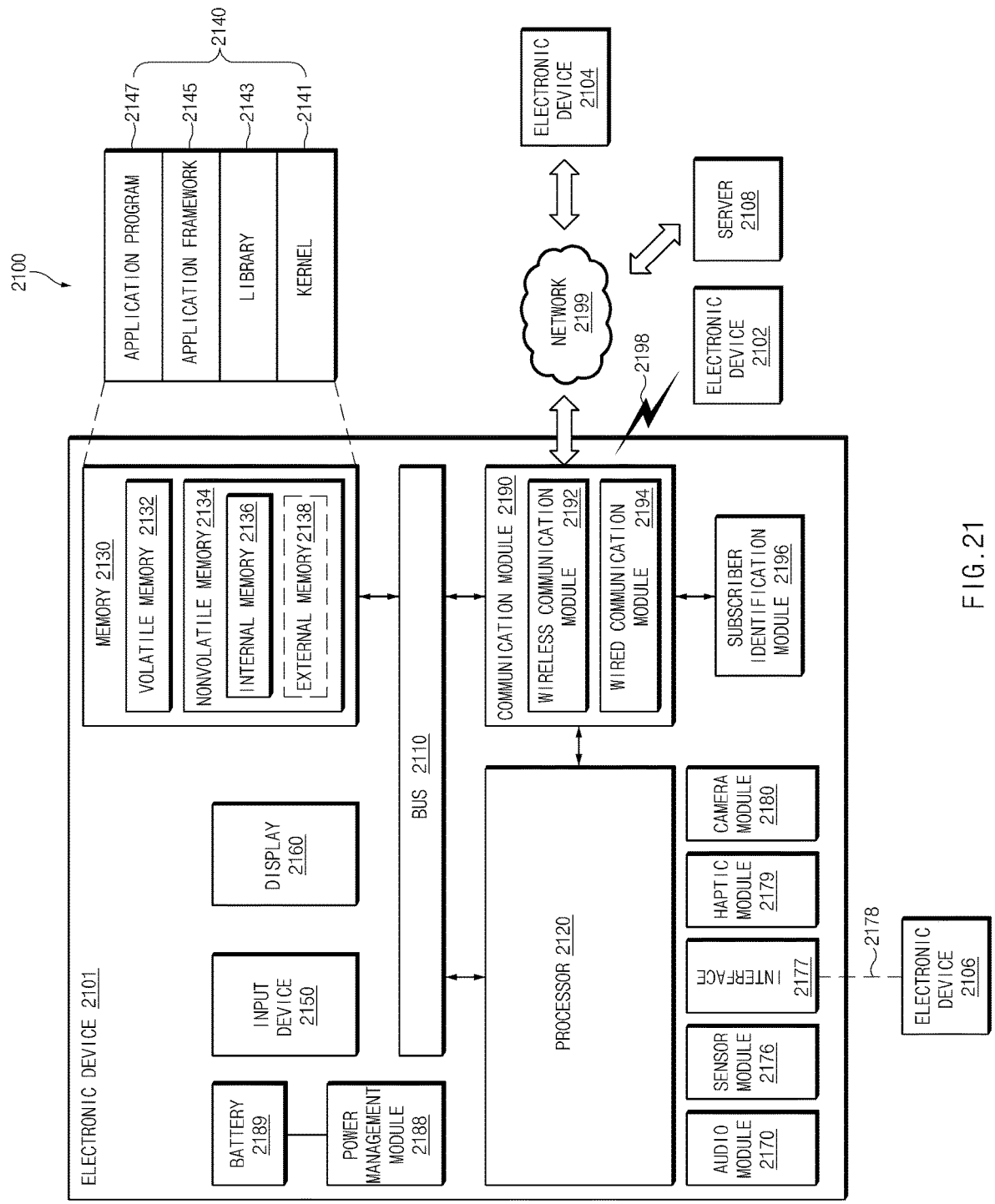
FIG. 21 illustrates a block diagram of an electronic apparatus in a network environment, according to various embodiments.

FIG. 21 illustrates an electronic device 2101 in a network environment 2100, according to various embodiments. According to various embodiments disclosed in the present disclosure, the electronic device 2101 may include various types of devices. For example, the electronic device 2101 may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the present disclosure, the term "user" used herein may refer to a person who uses the electronic device or may refer to a device (e.g., an artificial intelligence electronic device) that uses the electronic device.

Referring to FIG. 21, under the network environment 2100, the electronic device 2101 (e.g., the user terminal 100) may communicate with an electronic device 2102 through local wireless communication 2198 or may communication with an electronic device 2104 or a server 2108 (e.g., the intelligence server 200) through a network 2199. According to an embodiment, the electronic device 2101 may communicate with the electronic device 2104 through the server 2108.

According to an embodiment, the electronic device 2101 may include a bus 2110, a processor 2120 (e.g., the processor 150) a non-transitory memory 2130, an input device 2150 (e.g., a micro-phone or a mouse), a display 2160, an audio module 2170, a sensor module 2176, an interface 2177, a haptic module 2179, a camera module 2180, a power management module 2188, a battery 2189, a communication module 2190, and a subscriber identification module 2196. According to an embodiment, the electronic device 2101 may not include at least one (e.g., the display 2160 or the camera module 2180) of the above-described elements or may further include another element(s).

For example, the bus 2110 may interconnect the above-described elements 2120 to 2190 and may include a circuit for conveying signals (e.g., a control message or data) between the above-described elements.

The processor 2120 may include one or more of a central processing unit (CPU), an application processor (AP), a graphic processing unit (GPU), an image signal processor (ISP) of a camera or a communication processor (CP). According to an embodiment, the processor 2120 may be implemented with a system on chip (SoC) or a system in package (SiP). For example, the processor 2120 may drive an operating system (OS) or an application to control at least one of another element (e.g., hardware or software element) connected to the processor 2120 and may process and compute various data. The processor 2120 may load a command or data, which is received from at least one of other elements (e.g., the communication module 2190), into a volatile memory 2132 to process the command or data and may store the process result data into a nonvolatile memory 2134.

The non-transitory memory 2130 may include, for example, the volatile memory 2132 or the nonvolatile memory 2134. The volatile memory 2132 may include, for example, a random access memory (RAM) (e.g., a dynamic RAM (DRAM), a static RAM (SRAM), or a synchronous dynamic RAM (SDRAM)). The nonvolatile memory 2134 may include, for example, a one-time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 2134 may be configured in the form of an internal memory 2136 or the form of an external memory 2138 which is available through connection only if necessary, according to the connection with the electronic device 2101. The external memory 2138 may further include a flash drive such as compact flash (CF), secure digital (SD), micro secure digital (Micro-SD), mini secure digital (Mini-SD), extreme digital (xD), a multimedia card (MMC), or a memory stick. The external memory 2138 may be operatively or physically connected with the electronic device 2101 in a wired manner (e.g., a cable or a universal serial bus (USB)) or a wireless (e.g., Bluetooth) manner.

For example, the non-transitory memory 2130 may store, for example, at least one different software element, such as an instruction or data associated with the program 2140, of the electronic device 2101. The program 2140 may include, for example, a kernel 2141, a library 2143, an application framework 2145 or an application program (interchangeably, "application") 2147.

The input device 2150 may include a microphone, a mouse, or a keyboard. According to an embodiment, the keyboard may include a keyboard physically connected or a keyboard virtually displayed through the display 2160.

The display 2160 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 2101.

The audio module 2170 may convert, for example, from a sound into an electrical signal or from an electrical signal into the sound. According to an embodiment, the audio module 2170 may obtain sound through the input device 2150 (e.g., a microphone) or may output sound through an output device (not illustrated) (e.g., a speaker or a receiver) included in the electronic device 2101, an external electronic device (e.g., the electronic device 2102 (e.g., a wireless speaker or a wireless headphone)) or an electronic device 2106 (e.g., a wired speaker or a wired headphone) connected with the electronic device 2101

The sensor module 2176 may measure or detect, for example, an internal operating state (e.g., power or temperature) or an external environment state (e.g., an altitude, a humidity, or brightness) of the electronic device 2101 to generate an electrical signal or a data value corresponding to the information of the measured state or the detected state. The sensor module 2176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 2176 may further include a control circuit for controlling at least one or more sensors included therein. According to an embodiment, the electronic device 2101 may control the sensor module 2176 by using the processor 2120 or a processor (e.g., a sensor hub) separate from the processor 2120. In the case that the separate processor (e.g., a sensor hub) is used, while the processor 2120 is in a sleep state, the electronic device 2101 may control at least part of the operation or the state of the sensor module 2176 by the operation of the separate processor without awakening the processor 2120.

According to an embodiment, the interface 2177 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 2178 may physically connect the electronic device 2101 and the electronic device 2106. According to an embodiment, the connector 2178 may include, for example, an USB connector, an SD card/MMC connector, or an audio connector (e.g., a headphone connector).

The haptic module 2179 may convert an electrical signal into mechanical stimulation (e.g., vibration or motion) or into electrical stimulation. For example, the haptic module 2179 may apply tactile or kinesthetic stimulation to a user.

The haptic module 2179 may include, for example, a motor, a piezoelectric element, or an electric stimulator.

The camera module 2180l may capture, for example, a still image and a moving picture. According to an embodiment, the camera module 2180 may include at least one lens (e.g., a wide-angle lens and a telephoto lens, or a front lens and a rear lens), an image sensor, an image signal processor, or a flash (e.g., a light emitting diode or a xenon lamp).

The power management module 2188, which is to manage the power of the electronic device 2101, may constitute at least a portion of a power management integrated circuit (PMIC).

The battery 2189 may include a primary cell, a secondary cell, or a fuel cell and may be recharged by an external power source to supply power at least one element of the electronic device 2101.

The communication module 2190 may establish a communication channel between the electronic device 2101 and an external device (e.g., the first external electronic device 2102, the second external electronic device 2104, or the server 2108). The communication module 2190 may support wired communication or wireless communication through the established communication channel. According to an embodiment, the communication module 2190 may include a wireless communication module 2192 or a wired communication module 2194. The communication module 2190 may communicate with the external device (e.g., the first external electronic device 2102, the second external electronic device 2104 or the server 2108) through a first network 2198 (e.g. a wireless local area network such as Bluetooth or infrared data association (IrDA)) or a second network 2199 (e.g., a wireless wide area network such as a cellular network) through a relevant module among the wireless communication module 2192 or the wired communication module 2194.

The wireless communication module 2192 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 2192 supports cellar communication, the wireless communication module 2192 may, for example, identify or authenticate the electronic device 2101 within a communication network using the subscriber identification module (e.g., a SIM card) 2196. According to an embodiment, the wireless communication module 2192 may include a communication processor (CP) separate from the processor 2820 (e.g., an application processor (AP). In this case, the communication processor may perform at least a portion of functions associated with at least one of elements 2110 to 2196 of the electronic device 2101 in substitute for the processor 2120 when the processor 2120 is in an inactive (sleep) state, and together with the processor 2120 when the processor 2120 is in an active state. According to an embodiment, the wireless communication module 2192 may include a plurality of communication modules, each supporting only a relevant communication scheme among cellular communication, short-range wireless communication, or a GNSS communication scheme.

The wired communication module 2194 may include, for example, include a local area network (LAN) service, a power line communication, or a plain old telephone service (POTS).

For example, the first network 2198 may employ, for example, Wi-Fi direct or Bluetooth for transmitting or receiving instructions or data through wireless direct connection between the electronic device 2101 and the first external electronic device 2102. The second network 2199 may include a telecommunication network (e.g., a computer network such as a LAN or a WAN, the Internet or a telephone network) for transmitting or receiving instructions or data between the electronic device 2101 and the second electronic device 2104.

According to embodiments, the instructions or the data may be transmitted or received between the electronic device 2101 and the second external electronic device 2104 through the server 2108 connected with the second network. Each of the external first and second external electronic devices 2102 and 2104 may be a device of which the type is different from or the same as that of the electronic device 2101. According to various embodiments, all or a part of operations that the electronic device 2101 will perform may be executed by another or a plurality of electronic devices (e.g., the electronic devices 2102 and 2104 or the server 2108). According to an embodiment, in the case that the electronic device 2101 executes any function or service automatically or in response to a request, the electronic device 2101 may not perform the function or the service internally, but may alternatively or additionally transmit requests for at least a part of a function associated with the electronic device 2101 to any other device (e.g., the electronic device 2102 or 2104 or the server 2108). The other electronic device (e.g., the electronic device 2102 or 2104 or the server 2108) may execute the requested function or additional function and may transmit the execution result to the electronic device 2101. The electronic device 2101 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a non-transitory memory device (e.g., the non-transitory memory 2130).

The term "module" used in this specification may include a unit implemented with hardware, software, or firmware. For example, the term "module" may be interchangeably used with the term "logic", "logic block", "component", "circuit", and the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the non-transitory memory 2130) in the form of a program module. The instruction, when executed by a processor (e.g., the processor 2120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
   a housing;
   a touch screen display disposed inside the housing and exposed through a first portion of the housing;
   a microphone disposed inside the housing and exposed through a second portion of the housing;
   at least one speaker disposed inside the housing and exposed through a third portion of the housing;
   a wireless communication circuit disposed inside the housing;
   a processor disposed inside the housing and electrically coupled to the touch screen display, the microphone, the at least one speaker, and the wireless communication circuit; and
   a memory disposed in the housing and electrically connected with the processor, wherein the memory stores one or more instructions which, when executed, cause the processor to:
   as first operations:
   receive a first user input through at least one of the touch screen display and the microphone, wherein the first user input includes a first request for performing a first task using the electronic apparatus and an anaphora;
   transmit first data associated with the first user input to an external server through the wireless communication circuit;
   receive a first response from the external server through the wireless communication circuit, wherein the first response includes a first sequence of states of the electronic apparatus for performing the first task, a first identifier associated with the first sequence and a parameter of a specific state in the first sequence, wherein the specific state is a next state of the state including an object indicated by the anaphora; and
   after receiving the first response, perform the first task by sequentially displaying, on the touch screen display, screens corresponding to each of the states of the first sequence;
   as second operations:
   display a user interface (UI) and a text input box on the touch screen display when performing the first task;
   receive a second user input through the microphone while displaying the UI, wherein the second user input includes at least one parameter for filling the text input box;
   transmit second data associated with the second user input to the external server through the wireless communication circuit;
   receive a second response from the external server through the wireless communication circuit, wherein the second response includes the at least one parameter and a second identifier without a second sequence of states of the electronic apparatus; and
   fill the text input box displayed on the touch screen display with the at least one parameter.

2. The electronic apparatus of claim 1, wherein the one or more instructions stored in the memory, when executed, cause the processor to:
   generate a request for the at least one parameter, wherein the request is generated before receiving the second user input through at least one of the touch screen display and the at least one speaker while displaying the UI.

3. The electronic apparatus of claim 1, wherein the one or more instructions stored in the memory, when executed, cause the processor to:
   recognize the second identifier when receiving the second response; and
   fill the text input box with the at least one parameter in response to recognizing the second identifier.

4. The electronic apparatus of claim 1, wherein, the one or more instructions stored in the memory, when executed, cause the processor to:
   recognize the first identifier when receiving the first response; and
   sequentially perform operations corresponding to the states of the electronic apparatus that are included in the first sequence, wherein the operations are sequentially performed in response to recognizing the first identifier.

5. The electronic apparatus of claim 1, wherein the one or more instructions stored in the memory, when executed, cause the processor to:
   maintain the electronic apparatus in a first state, wherein the first state corresponds to one of the states in the first sequence; and
   receive the second user input in the first state in which the electronic apparatus is maintained.

6. The electronic apparatus of claim 5,
   wherein the instructions stored in the memory, when executed, cause the processor to:
   maintain the state of the electronic apparatus in the first state when the at least one parameter is not included in the first response, wherein the at least one parameter is needed for the operation that corresponds to each of the respective states included in the first sequence; and
   change the state of the electronic apparatus to another state included in the first sequence when filling the text input box with the at least one parameter included in the second response.

7. The electronic apparatus of claim 6, wherein the first response includes information about the at least one parameter, wherein the information is indicative of whether the at least one parameter is needed to perform the operation,
   wherein the one or more instructions stored in the memory, when executed, cause the processor to:
   determine whether to maintain the electronic apparatus in the first state based on the information about the at least one parameter.

8. An intelligence system comprising:
   a display;
   a communication circuit;
   a microphone;
   a speaker;
   a first processor electrically coupled to the display, the communication circuit, the microphone, and the speaker;
   a user terminal electrically coupled to the first processor and including a first memory for storing first instructions;
   a communication interface;
   a second processor electrically coupled to the communication interface; and
   a server electrically coupled to the second processor and including a second memory for storing second instructions,
   wherein the first instructions and the second instructions cause the first processor and the second processor to:
   display, by the user terminal, a user interface (UI) including a text input box on the display;

receive, by the user terminal, a first user input through the microphone while displaying the UI, wherein the first user input includes a first parameter filled in the text input box;
transmit, by the user terminal, first data associated with the first user input to the server through the communication circuit;
generate, by the server, a first identifier associated with the first data;
extract, by the server, the first parameter from the first data;
tag, by the server, the first parameter with the first identifier;
provide, by the server through the communication interface, a first response to the user terminal, wherein the first response includes the first parameter tagged with the first identifier;
fill, by the user terminal, the text input box displayed on the display with the first parameter after receiving the first response;
receive, by the user terminal, a second user input through at least one of the display and the microphone before displaying the UI, wherein the second user input includes a first request for performing a first task using the user terminal and an anaphora;
transmit, by the user terminal, second data associated with the second user input to the server through the communication circuit;
generate, by the server, a first sequence of states of the user terminal for performing the first task;
generate, by the server, a second identifier associated with the first sequence;
provide, by the server through the communication interface, a second response to the user terminal, wherein the second response includes the first sequence, the second identifier, and a second parameter of a specific state in the first sequence, wherein the specific state is a next state of the state including an object indicated by the anaphora; and
after receiving the second response, by the user terminal, perform the first task by sequentially displaying, on the display, screens corresponding to each of the states of the first sequence.

9. The intelligence system of claim 8, wherein the first instructions and the second instructions cause the first processor and the second processor to:
generate, by the server, a request for the first parameter while the UI is displayed on the display of the user terminal;
provide, by the server through the communication interface, the request and data to the user terminal; and
output, by the user terminal, the request through at least one of the speaker and the display of the user terminal before receiving the first user input.

10. The intelligence system of claim 8, wherein the first instructions and the second instructions cause the first processor and the second processor to:
recognize, by the user terminal, the first identifier when receiving the first response; and
fill the text input box with the first parameter.

11. The intelligence system of claim 8, wherein the first instructions and the second instructions cause the first processor and the second processor to:
when receiving the second response, recognize the second identifier by the user terminal and sequentially perform operations corresponding to the states of the user terminal included in the first sequence.

12. The intelligence system of claim 8, wherein the first instructions and the second instructions cause the first processor and the second processor to:
maintain, by the user terminal, a first state corresponding to one of the states included in the first sequence; and
receive, by the user terminal, the first user input while the user terminal is maintained in the first state.

13. The intelligence system of claim 12,
wherein the first instructions and the second instructions cause the first processor and the second processor to:
maintain, by the user terminal, the state of the user terminal in the first state when a second parameter is not included in the second response, wherein the second parameter is needed for the operation that corresponds to each of the respective states included in the first sequence; and
change the state of the user terminal to another state included in the first sequence when filling the text input box with the second parameter included in the second response.

14. The intelligence system of claim 13, wherein the second response includes information about the second parameter, wherein the information is indicative of whether the second parameter is needed to perform the operation, and
wherein the first instructions and the second instructions cause the first processor and the second processor to:
maintain, by the user terminal, the first state based on the information about the second parameter.

15. An electronic apparatus comprising:
a housing;
a touch screen display positioned inside the housing and exposed through a first portion of the housing;
a microphone positioned inside the housing and exposed through a second portion of the housing;
at least one speaker positioned inside the housing and exposed through a third portion of the housing;
a communication circuit positioned inside the housing;
a processor positioned inside the housing and electrically connected to the touch screen display, the microphone, the at least one speaker, and the communication circuit; and
a memory positioned in the housing and electrically connected with the processor,
wherein the memory stores instructions that, when executed, cause the processor to:
as first operations:
receive a first user input through at least one of the touch screen display and the microphone, wherein the first user input includes a first request for performing a first task using the electronic apparatus and an anaphora;
transmit first data associated with the first user input to an external server through the communication circuit;
receive a first response from the external server through the communication circuit, wherein the first response includes a first sequence of states of the electronic apparatus for performing the first task, a first identifier associated with the first sequence and a parameter of a first state which is a specific state in the first sequence, wherein the first state is a next state of the state including an object indicated by the anaphora, wherein the first sequence includes the first state and a second state of the electronic apparatus, and wherein the second state is a specific state in the first sequence; and
after receiving the first response, perform the first task by sequentially displaying, on the touch screen display, screens corresponding to each of the states of the first sequence;

as second operations:
  display a user interface (UI) on the touch screen display for receiving a second user input in the second state of the electronic apparatus that is included in the first sequence;
  receive the second user input through at least one of the microphone and the touch screen display while displaying the UI; and
  allow the electronic apparatus to have a second state included in the first sequence based on the second user input.

16. The electronic apparatus of claim 15, wherein the second state is to delete, add, or transmit information stored in the memory.

17. The electronic apparatus of claim 15, wherein the second user input includes information about whether to perform an operation corresponding to the second state of the electronic apparatus that is included in the first sequence.

18. A method of controlling an electronic apparatus, the method comprising:
  receiving, through at least one of a display and a microphone, a first user input including a first request for performing a first task using the electronic apparatus and an anaphora;
  transmitting first data associated with the first user input to an external server through a communication circuit;
  receiving, from the external server through the communication circuit, a first response including a first sequence of states of the electronic apparatus for performing the first task, a first identifier associated with the first sequence and a parameter of a specific state in the first sequence, wherein the specific state is a next state of the state including an object indicated by the anaphora;
  after receiving the first response, performing the first task by sequentially displaying, on the display, screens corresponding to each of the states of the first sequence;
  displaying a user interface (UI) and a text input box on the display when performing the first task a text input box;
  receiving, through the microphone, while displaying the UI, a second user input including at least one parameter for filling the text input box;
  transmitting second data associated with the second user input to the external server through the communication circuit;
  receiving, from the external server through the communication circuit, a second response including the at least one parameter and a second identifier without a second sequence of states of the electronic apparatus for performing a task; and
  filling the text input box displayed on the display with the at least one parameter.

19. The method of claim 18, further comprising:
  generating a request for the at least one parameter through at least one of a speaker and the display before receiving the second user input while displaying the UI.

* * * * *